(12) United States Patent
Guttag

(10) Patent No.: US 7,924,274 B2
(45) Date of Patent: Apr. 12, 2011

(54) MASKED WRITE ON AN ARRAY OF DRIVE BITS

(75) Inventor: Karl M. Guttag, Plano, TX (US)

(73) Assignee: Syndiant, Inc., Dallas, TX (US)

( * ) Notice: Subject to any disclaimer, the term of this patent is extended or adjusted under 35 U.S.C. 154(b) by 1205 days.

(21) Appl. No.: 11/383,056

(22) Filed: May 12, 2006

(65) Prior Publication Data

US 2006/0274002 A1    Dec. 7, 2006

Related U.S. Application Data

(62) Division of application No. 10/849,195, filed on May 20, 2004, now Pat. No. 7,071,908.

(60) Provisional application No. 60/471,731, filed on May 20, 2003, provisional application No. 60/568,253, filed on May 6, 2004.

(51) Int. Cl.
*G09G 5/00* (2006.01)

(52) U.S. Cl. .................................. 345/204; 345/210

(58) Field of Classification Search .................. 345/57, 345/84–90, 100, 173, 581, 582, 587, 619, 345/691, 204, 210; 359/292, 290; 219/121.6; 365/158, 189.02, 210, 49.17; 348/771
See application file for complete search history.

(56) References Cited

U.S. PATENT DOCUMENTS

| | | | |
|---|---|---|---|
| 3,644,906 A * | 2/1972 | Weinberger | 365/49.17 |
| 3,707,622 A | 12/1972 | Hatano et al. | |
| 3,787,851 A | 1/1974 | Hughes | |
| 3,801,831 A | 4/1974 | Dame | |
| 3,963,911 A | 6/1976 | Franks | |
| 4,039,862 A | 8/1977 | Dingwall et al. | |
| 4,483,229 A * | 11/1984 | Tsukamoto et al. | 84/605 |
| 4,486,670 A | 12/1984 | Chan et al. | |
| 4,601,055 A | 7/1986 | Kent | |
| 4,618,929 A | 10/1986 | Miller et al. | |
| 4,621,339 A | 11/1986 | Wanger et al. | |
| 4,638,309 A * | 1/1987 | Ott | 345/84 |
| 4,667,300 A | 5/1987 | Guilfoyle | |
| 4,680,579 A * | 7/1987 | Ott | 348/755 |
| 4,694,342 A | 9/1987 | Klees | |
| 4,695,650 A | 9/1987 | Walba et al. | |
| 4,697,247 A | 9/1987 | Grinberg et al. | |
| 4,704,702 A | 11/1987 | Goutzoulis | |
| 4,720,819 A | 1/1988 | Pinkham et al. | |
| 4,742,552 A | 5/1988 | Andrews | |

(Continued)

FOREIGN PATENT DOCUMENTS

EP    0793 214 A1    9/1997

(Continued)

OTHER PUBLICATIONS

Colorado MicroDisplay, Inc. (CMD) White Paper: "Which Microdisplay is Right for your Application?" copyright 1998, 99. 1-9.

(Continued)

*Primary Examiner* — Prabodh M Dharia

(74) *Attorney, Agent, or Firm* — Vedder Price P.C.; Mark J. Guttag

(57) ABSTRACT

The present invention provides a various methods, systems and devices for controlling light modulating elements and/or spatial light modulators. In some embodiments of the present invention, a recursive feedback method is used to control light modulating elements and/or spatial light modulators.

4 Claims, 27 Drawing Sheets

U.S. PATENT DOCUMENTS

| | | | |
|---|---|---|---|
| 4,773,038 A | 9/1988 | Hillis et al. | |
| 4,830,444 A | 5/1989 | Cloonan et al. | |
| 4,935,880 A | 6/1990 | Kelleher et al. | |
| 4,939,575 A | 7/1990 | Childers | |
| 4,959,811 A | 9/1990 | Szczepanek | |
| 4,962,542 A | 10/1990 | Klees | |
| 4,978,950 A | 12/1990 | Capps | |
| 5,068,603 A | 11/1991 | Mahoney | |
| 5,068,914 A | 11/1991 | Klees | |
| 5,096,279 A | 3/1992 | Hornbeck et al. | |
| 5,101,270 A | 3/1992 | Boone et al. | |
| 5,103,499 A | 4/1992 | Miner et al. | |
| 5,129,058 A | 7/1992 | Mifune et al. | |
| 5,136,530 A | 8/1992 | Li et al. | |
| 5,172,259 A | 12/1992 | Cloonan et al. | |
| 5,173,947 A | 12/1992 | Chande et al. | |
| 5,175,858 A | 12/1992 | Hammerstrom | |
| 5,184,325 A | 2/1993 | Lipouski | |
| 5,203,016 A | 4/1993 | Belcher et al. | |
| 5,210,826 A | 5/1993 | Takeda et al. | |
| 5,231,388 A | 7/1993 | Stoltz | |
| 5,255,100 A * | 10/1993 | Urbanus | 348/441 |
| 5,258,934 A | 11/1993 | Agranat et al. | |
| 5,272,658 A | 12/1993 | Eulenberg et al. | |
| 5,307,056 A | 4/1994 | Urbanus | |
| 5,317,652 A | 5/1994 | Chatterjee | |
| 5,321,639 A | 6/1994 | Krishnamoorthy et al. | |
| 5,334,861 A | 8/1994 | Pfiester et al. | |
| 5,339,090 A | 8/1994 | Crossland et al. | |
| 5,339,116 A | 8/1994 | Urbanus et al. | |
| 5,396,641 A | 3/1995 | Iobst et al. | |
| 5,420,604 A | 5/1995 | Scheffer et al. | |
| 5,446,865 A | 8/1995 | Corcoran et al. | |
| 5,448,431 A | 9/1995 | Kobayashi | |
| 5,485,173 A | 1/1996 | Scheffer et al. | |
| 5,497,172 A | 3/1996 | Doherty et al. | |
| 5,499,062 A | 3/1996 | Urbanus | |
| 5,517,347 A | 5/1996 | Sampsell | |
| 5,542,001 A | 7/1996 | Reiffin | |
| 5,546,102 A | 8/1996 | Scheffer et al. | |
| 5,557,734 A | 9/1996 | Wilson | |
| 5,576,873 A | 11/1996 | Crossland et al. | |
| 5,581,272 A | 12/1996 | Conner et al. | |
| 5,581,773 A | 12/1996 | Glover | |
| 5,585,816 A | 12/1996 | Scheffer et al. | |
| 5,594,473 A | 1/1997 | Miner et al. | |
| 5,602,999 A | 2/1997 | Hyatt | |
| 5,606,707 A | 2/1997 | Tomassi et al. | |
| 5,623,281 A * | 4/1997 | Markandey et al. | 345/108 |
| 5,657,036 A | 8/1997 | Markandy et al. | |
| 5,657,099 A | 8/1997 | Doherty et al. | |
| 5,663,749 A * | 9/1997 | Farris et al. | 348/771 |
| 5,670,977 A | 9/1997 | Chiu et al. | |
| 5,673,028 A | 9/1997 | Levy | |
| 5,677,778 A | 10/1997 | Kanterakis et al. | |
| 5,689,677 A | 11/1997 | MacMillan | |
| 5,726,718 A * | 3/1998 | Doherty et al. | 348/771 |
| 5,729,245 A | 3/1998 | Gove et al. | |
| 5,748,556 A | 5/1998 | Iyengar | |
| 5,767,828 A | 6/1998 | McKnight | |
| 5,771,060 A | 6/1998 | Nelson | |
| 5,808,690 A | 9/1998 | Rich | |
| 5,815,641 A | 9/1998 | Marshall | |
| 5,818,607 A | 10/1998 | Nakamura et al. | |
| 5,818,788 A | 10/1998 | Kimura et al. | |
| 5,821,910 A | 10/1998 | Shay | |
| 5,841,681 A | 11/1998 | Chen et al. | |
| 5,844,795 A | 12/1998 | Johnston et al. | |
| 5,851,611 A | 12/1998 | Guttag | |
| 5,852,425 A | 12/1998 | Bird et al. | |
| 5,861,861 A | 1/1999 | Nolan et al. | |
| 5,864,703 A | 1/1999 | Van Hook et al. | |
| 5,900,886 A | 5/1999 | Shay | |
| 5,933,588 A * | 8/1999 | Easwar et al. | 358/1.17 |
| 5,959,598 A | 9/1999 | McKnight | |
| 5,966,332 A | 10/1999 | Takano | |
| 5,977,940 A * | 11/1999 | Akiyama et al. | 345/94 |
| 5,990,982 A | 11/1999 | Gove et al. | |
| 5,991,465 A | 11/1999 | Anderson et al. | |
| 6,005,558 A | 12/1999 | Hudson et al. | |
| 6,016,211 A | 1/2000 | Szymanski et al. | |
| 6,018,754 A | 1/2000 | Chen et al. | |
| 6,023,263 A * | 2/2000 | Wood | 345/581 |
| 6,031,510 A | 2/2000 | Drake et al. | |
| 6,041,389 A | 3/2000 | Rao | |
| 6,046,719 A | 4/2000 | Dingwall | |
| 6,061,049 A | 5/2000 | Pettitt et al. | |
| 6,064,404 A | 5/2000 | Aras et al. | |
| 6,064,423 A | 5/2000 | Geng | |
| 6,067,065 A | 5/2000 | Worley, III et al. | |
| 6,067,256 A | 5/2000 | Yamashita et al. | |
| 6,107,979 A | 8/2000 | Chiu et al. | |
| 6,112,218 A | 8/2000 | Gandhi et al. | |
| 6,115,726 A | 9/2000 | Ignjatovic | |
| 6,118,500 A | 9/2000 | Kunzman | |
| 6,128,525 A * | 10/2000 | Zeng et al. | 600/476 |
| 6,140,983 A | 10/2000 | Quanrud | |
| 6,144,356 A | 11/2000 | Weatherford et al. | |
| 6,151,011 A | 11/2000 | Worley, III et al. | |
| 6,157,207 A | 12/2000 | Eaton et al. | |
| 6,157,394 A | 12/2000 | Anderson et al. | |
| 6,157,558 A | 12/2000 | Wong | |
| 6,157,658 A * | 12/2000 | Toyoyama et al. | 370/505 |
| 6,188,377 B1 | 2/2001 | Campbell et al. | |
| 6,188,426 B1 * | 2/2001 | Nakamura | 347/239 |
| 6,222,518 B1 | 4/2001 | Ikeda et al. | |
| 6,225,991 B1 | 5/2001 | McKnight | |
| 6,243,072 B1 | 6/2001 | McKnight | |
| 6,285,360 B1 | 9/2001 | Li | |
| 6,295,054 B1 | 9/2001 | McKnight | |
| 6,300,963 B1 | 10/2001 | Urbanus et al. | |
| 6,313,882 B1 | 11/2001 | Limberg et al. | |
| 6,326,980 B1 | 12/2001 | Worley, III | |
| 6,329,987 B1 | 12/2001 | Gottfried et al. | |
| 6,332,056 B1 | 12/2001 | Gedi et al. | |
| 6,332,209 B1 | 12/2001 | Eroz et al. | |
| 6,333,656 B1 | 12/2001 | Schober | |
| 6,339,417 B1 | 1/2002 | Quanrud | |
| 6,346,430 B1 | 2/2002 | Raj et al. | |
| 6,348,991 B1 | 2/2002 | Smith et al. | |
| 6,363,470 B1 | 3/2002 | Laurenti et al. | |
| 6,369,832 B1 | 4/2002 | McKnight | |
| 6,373,497 B1 | 4/2002 | McKnight et al. | |
| 6,373,753 B1 | 4/2002 | Proebsting | |
| 6,373,779 B1 | 4/2002 | Pang et al. | |
| 6,441,811 B1 | 8/2002 | Sawada et al. | |
| 6,449,396 B1 | 9/2002 | Loce et al. | |
| 6,452,589 B1 | 9/2002 | McKnight | |
| 6,456,301 B1 | 9/2002 | Huang | |
| 6,480,259 B1 | 11/2002 | Wong et al. | |
| 6,493,467 B1 | 12/2002 | Okuda et al. | |
| 6,515,926 B1 | 2/2003 | Parris et al. | |
| 6,518,945 B1 | 2/2003 | Pinkham | |
| 6,522,436 B2 | 2/2003 | Roberts et al. | |
| 6,525,709 B1 * | 2/2003 | O'Callaghan | 345/98 |
| 6,552,740 B1 | 4/2003 | Wong et al. | |
| 6,563,617 B2 | 5/2003 | Kanterakis et al. | |
| 6,563,743 B2 * | 5/2003 | Hanzawa et al. | 365/189.02 |
| 6,573,951 B1 | 6/2003 | Hewlett et al. | |
| 6,574,043 B2 | 6/2003 | Ramanujan | |
| 6,587,371 B1 | 7/2003 | Hidaka | |
| 6,590,852 B1 * | 7/2003 | McCormick, Jr. | 369/112.23 |
| 6,597,372 B2 | 7/2003 | Huang | |
| 6,621,615 B2 | 9/2003 | Kruschwitz et al. | |
| 6,633,180 B2 | 10/2003 | Duesman | |
| 6,636,165 B2 | 10/2003 | Freidhof | |
| 6,646,710 B2 | 11/2003 | Suzuki et al. | |
| 6,650,138 B2 | 11/2003 | Zuravleff | |
| 6,707,516 B1 | 3/2004 | Johnson et al. | |
| 6,717,097 B1 * | 4/2004 | Sandstrom et al. | 219/121.6 |
| 6,717,222 B2 | 4/2004 | Zhang | |
| 6,736,512 B2 | 5/2004 | Balogh | |
| 6,757,779 B1 | 6/2004 | Nataraj et al. | |
| 6,762,873 B1 | 7/2004 | Coker et al. | |
| 6,778,462 B1 | 8/2004 | Castagnetti et al. | |
| 6,781,717 B1 | 8/2004 | Easwar et al. | |
| 6,801,213 B2 | 10/2004 | Bergstrom et al. | |

| | | | |
|---|---|---|---|
| 6,803,885 B1 | 10/2004 | Guttag et al. | |
| 6,804,406 B1 | 10/2004 | Chen | |
| 6,809,734 B2 | 10/2004 | Suzuoki et al. | |
| 6,912,201 B1 * | 6/2005 | Yoshida et al. | 370/248 |
| 6,999,521 B1 | 2/2006 | Azadet et al. | |
| 7,061,794 B1 | 6/2006 | Sabharwal et al. | |
| 7,088,324 B2 | 8/2006 | Sakaguchi et al. | |
| 7,098,493 B2 * | 8/2006 | Van Der Zaag et al. | 257/295 |
| 7,116,595 B2 * | 10/2006 | Hidaka | 365/207 |
| 7,271,790 B2 | 9/2007 | Hudson et al. | |
| 7,283,105 B2 | 10/2007 | Dallas et al. | |
| 7,286,104 B2 | 10/2007 | Sempel et al. | |
| 7,302,111 B2 * | 11/2007 | Olsson et al. | 382/266 |
| 7,385,582 B2 | 6/2008 | Hudson | |
| 7,406,210 B2 | 7/2008 | Handley et al. | |
| 2001/0038363 A1 | 11/2001 | Campbell | |
| 2001/0040538 A1 | 11/2001 | Quanrud | |
| 2001/0040566 A1 | 11/2001 | Pinkham et al. | |
| 2001/0043177 A1 | 11/2001 | Houston | |
| 2002/0000967 A1 | 1/2002 | Huston et al. | |
| 2002/0000982 A1 | 1/2002 | Takagi | |
| 2002/0000994 A1 | 1/2002 | Bergstrom et al. | |
| 2002/0036634 A1 | 3/2002 | Pinkham et al. | |
| 2002/0041264 A1 | 4/2002 | Quanrud | |
| 2002/0069318 A1 | 6/2002 | Chow et al. | |
| 2002/0097215 A1 | 7/2002 | Huang | |
| 2002/0101396 A1 | 8/2002 | Huston et al. | |
| 2002/0120741 A1 | 8/2002 | Webb et al. | |
| 2002/0152305 A1 | 10/2002 | Jackson et al. | |
| 2002/0158891 A1 | 10/2002 | Huang | |
| 2002/0176146 A1 | 11/2002 | De Vaan et al. | |
| 2003/0016213 A1 | 1/2003 | Huang | |
| 2003/0034941 A1 | 2/2003 | Janssen et al. | |
| 2003/0038651 A1 | 2/2003 | Zuravleff | |
| 2003/0038763 A1 | 2/2003 | Zuravleff | |
| 2003/0058263 A1 | 3/2003 | Huang | |
| 2003/0058543 A1 | 3/2003 | Sheedy et al. | |
| 2003/0086145 A1 * | 5/2003 | DeSimone et al. | 359/290 |
| 2003/0090478 A1 | 5/2003 | McKnight | |
| 2003/0103046 A1 | 6/2003 | Rogers et al. | |
| 2003/0107578 A1 | 6/2003 | Willis et al. | |
| 2003/0122789 A1 * | 7/2003 | Sharma | 345/173 |
| 2003/0137501 A1 | 7/2003 | Richards | |
| 2003/0151599 A1 | 8/2003 | Bone | |
| 2003/0156083 A1 | 8/2003 | Willis | |
| 2003/0156121 A1 | 8/2003 | Willis | |
| 2003/0160803 A1 | 8/2003 | Willis | |
| 2003/0160804 A1 | 8/2003 | Willis et al. | |
| 2003/0169612 A1 | 9/2003 | Hu | |
| 2003/0174117 A1 | 9/2003 | Crossland et al. | |
| 2003/0189658 A1 | 10/2003 | Morris et al. | |
| 2003/0197669 A1 | 10/2003 | Marshall | |
| 2003/0201986 A1 | 10/2003 | Willis et al. | |
| 2003/0210257 A1 | 11/2003 | Hudson et al. | |
| 2003/0212948 A1 | 11/2003 | Eroz et al. | |
| 2003/0214478 A1 | 11/2003 | Yoo et al. | |
| 2003/0214617 A1 | 11/2003 | Bierhuizen et al. | |
| 2004/0001039 A1 | 1/2004 | Shino et al. | |
| 2004/0004753 A1 | 1/2004 | Pan | |
| 2004/0008556 A1 * | 1/2004 | Hidaka | 365/210 |
| 2004/0036707 A1 | 2/2004 | Willis | |
| 2004/0046752 A1 | 3/2004 | Willis et al. | |
| 2004/0071022 A1 | 4/2004 | Wald et al. | |
| 2004/0075669 A1 * | 4/2004 | Bronstein et al. | 345/619 |
| 2004/0125283 A1 | 7/2004 | Huang | |
| 2004/0141365 A1 * | 7/2004 | Perner et al. | 365/158 |
| 2004/0159636 A1 * | 8/2004 | Sandstrom et al. | 219/121.6 |
| 2004/0233150 A1 * | 11/2004 | Guttag et al. | 345/87 |
| 2004/0243657 A1 | 12/2004 | Goren et al. | |
| 2004/0263502 A1 * | 12/2004 | Dallas et al. | 345/204 |
| 2005/0002257 A1 | 1/2005 | Mizugaki et al. | |
| 2005/0007785 A1 | 1/2005 | Jorgensen | |
| 2005/0036412 A1 | 2/2005 | Sako | |
| 2005/0094244 A1 | 5/2005 | Richards | |
| 2005/0134613 A1 | 6/2005 | Hui | |
| 2006/0007912 A1 | 1/2006 | Chen | |
| 2006/0039492 A1 | 2/2006 | Azadet et al. | |
| 2006/0267054 A1 | 11/2006 | Martin et al. | |
| 2008/0063084 A1 | 3/2008 | Xue et al. | |
| 2008/0080782 A1 * | 4/2008 | Olsson et al. | 382/266 |
| 2008/0088613 A1 | 4/2008 | Hudson et al. | |
| 2008/0100633 A1 | 5/2008 | Dallas et al. | |

FOREIGN PATENT DOCUMENTS

| | | |
|---|---|---|
| KR | 2002039800 A | 5/2002 |
| WO | WO0079510 A1 | 12/2000 |
| WO | WO 2004/104790 | 12/2004 |

OTHER PUBLICATIONS

W.P. Bleha, JVC Digital Image Technology Center White Paper: "D-ILA™ Projector Technology: The Path to High Resolution Projection Displays", pp. 1-9.

www.silicondisplay.com website, Feb. 6, 2002, "The Digital LCoS Breakthrough".

Childers, et al., "SVP: Serial Video Processor", IEEE 1990 Custom Integrated Circuits Conference, p. 17.3.1 to 17.3.4.

Non Final Office Action dated Mar. 2, 2010 in U.S. Appl. No. 11/382,818.

Non Final Office Action dated Mar. 8, 2010 in U.S. Appl. No. 11/382,776.

Non Final Office Action dated Apr. 15, 2010 in U.S. Appl. No. 11/383,046.

Non Final Office Action dated May 21, 2010 in U.S. Appl. No. 11/382,825.

Final Office Action dated Jul. 20, 2010 in U.S. Appl. No. 11/382,818.

Final Office Action dated Jul. 20, 2010 in U.S. Appl. No. 11/382,776.

Non-Final Office Action dated Jun. 10, 2010 in U.S. Appl. No. 11/382,771.

Abstract of IEEE Conference Paper, Publication Date Dec. 1, 1994.

* cited by examiner

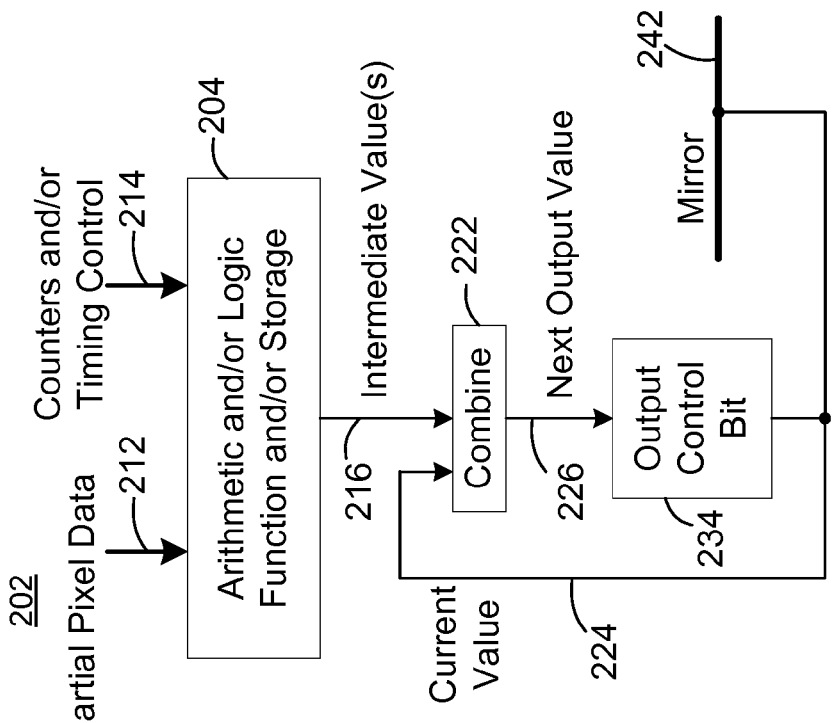
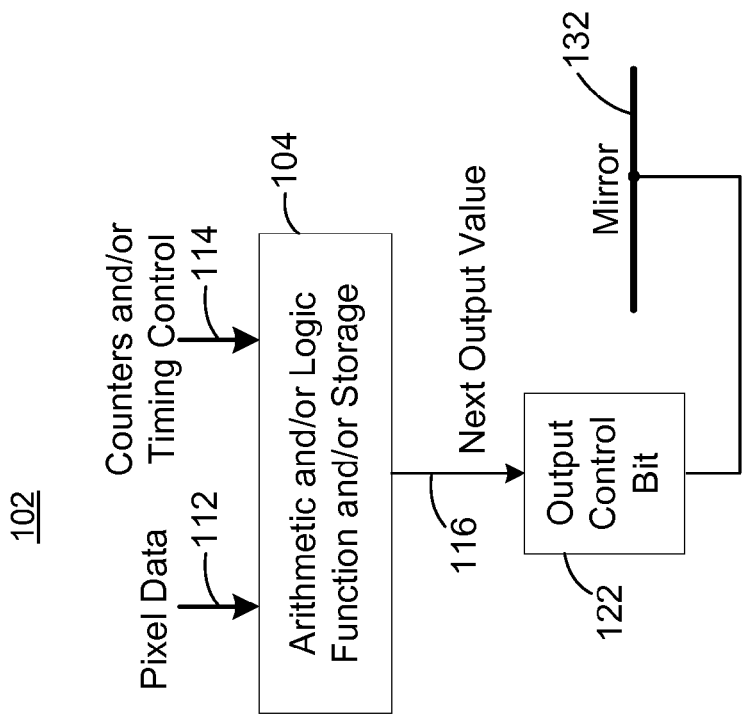

| Count | Read Bits 210 | | Decision to turn off Display-Bit |
|---|---|---|---|
| 0 | 000 | Read Bits 2,1,0 | If all three are not 0, turn on output |
| 1 | 001 | Read Bits 2,1 | If both 0, turn off output |
| 2 | 010 | Read Bits 2,0 | If both 0, turn off output |
| 3 | 011 | Read Bit 2 | If 0, turn off output, bit 2 memory is free |
| 4 | 100 | Read Bits 1,0 | If both zero, turn off output |
| 5 | 101 | Read Bit 1 | If 0, turn off output, bit 1 memory is free |
| 6 | 110 | Read Bit 0 | If 0, turn off output, bit 0 memory is free |
| 7 | 111 | No reads | turn off output |

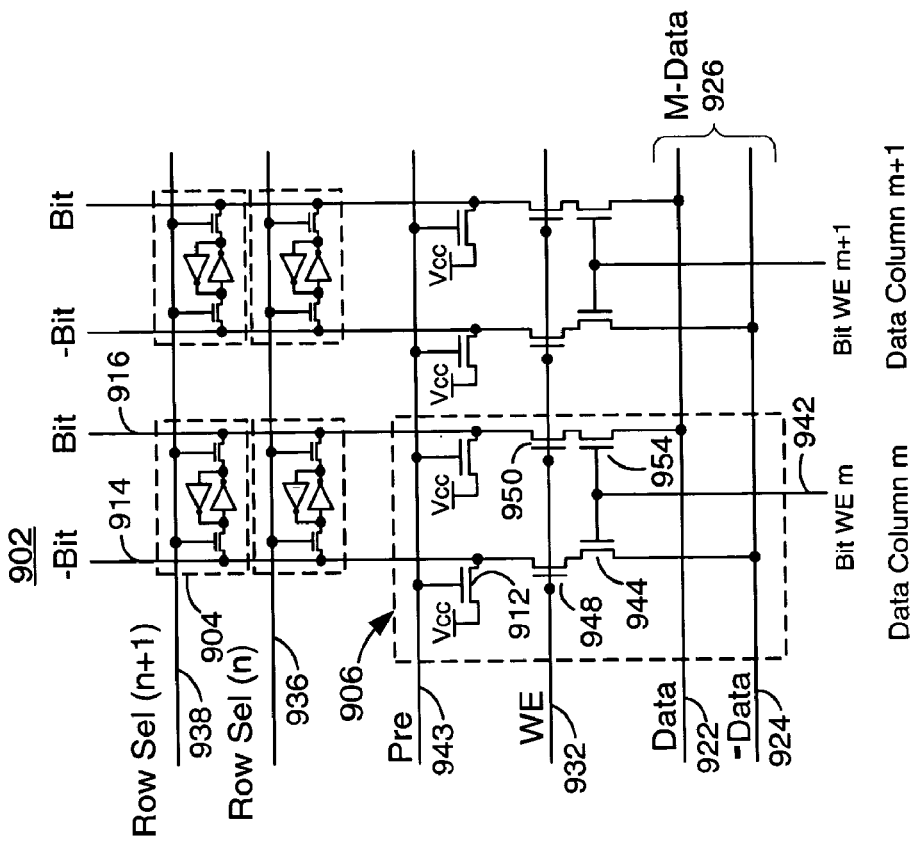
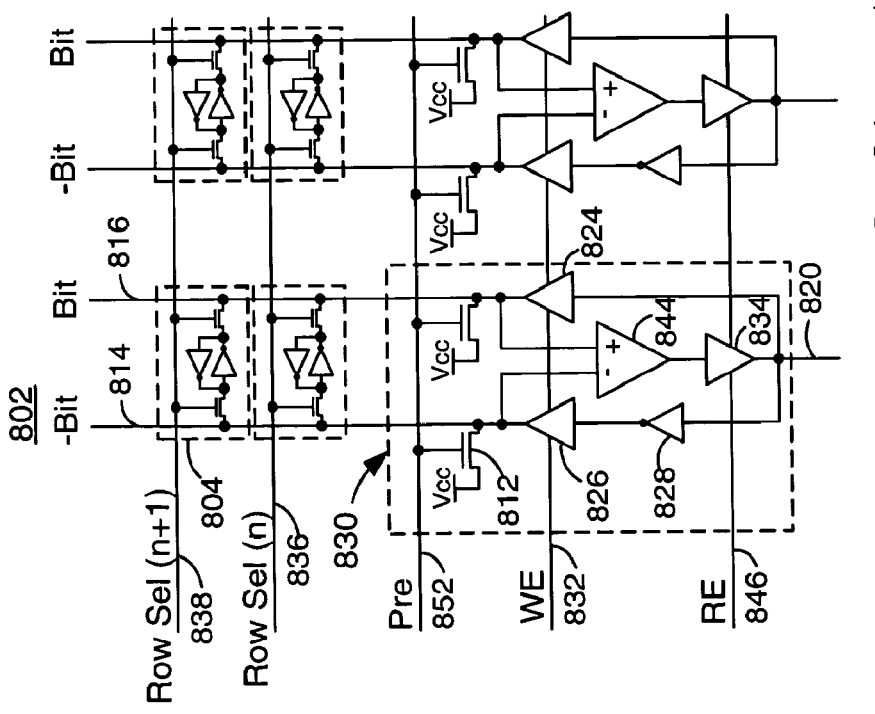

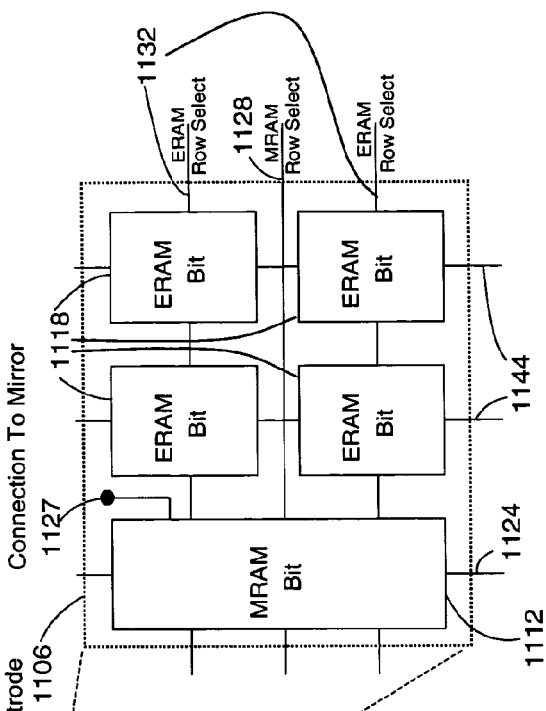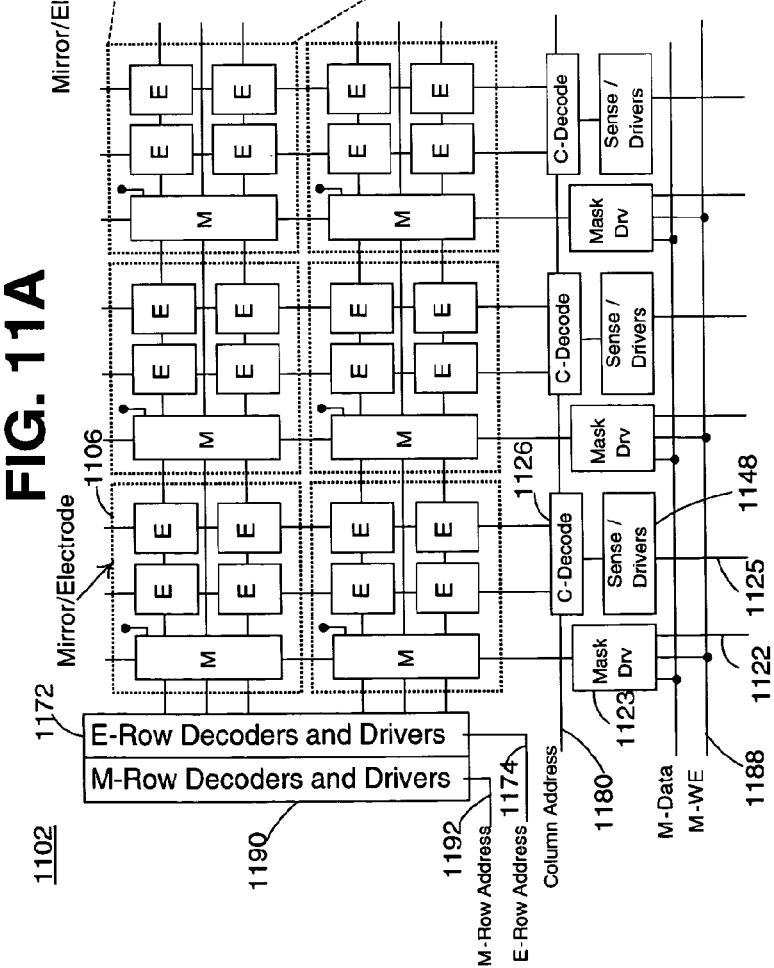

Simple 2-LS Bit Count and 2-MS-Bit Split Count Example With LS-Bit Time = 4 Clocks and 17 Clocks Between Lines Corrected

| | LS MRAM | | | MS MRAM | | | | | | LS ERAM Reads | | | MS ERAM Reads | | | | | | | |
|---|---|---|---|---|---|---|---|---|---|---|---|---|---|---|---|---|---|---|---|---|
| Count # | 3 | 2 | 1 | 0 | 0 | 1 | 2 | 3 | | 3 | 2 | 1 | 0 | 1 | 2 | 3 | | LSB Time= | 4 | |
| Binary Count | 11 | 10 | 01 | 00 | 00 | 01 | 10 | 11 | | | | | | | | | | Line Time= | 17 | |
| Binary T Weight | 0 | 4 | 8 | 12 | 13 | 28 | 44 | 60 | | | | | | | | | | | | |
| Adjusted Time | 0 | 4 | 8 | 12 | 13 | 28 | 44 | 60 | | | | | | | | | | | | |
| Offset | 0 | 0 | 0 | 0 | 0 | 0 | 0 | 0 | | 0 | 0 | 0 | 0 | 1 | 1 | 0 | Write Pattern | Write Conflict | Read Pattern | Read Conflict |
| Set/Reset Disp. | S | S | S | R | S | R | R | R | | | | | | | | | | | | |
| TIME (Clocks) | | | | | | | | | | | | | | | | | | | | |
| -2 | | | | | | | | | | | | | 0 | | | | | 0 | 1000000 | |
| -1 | | | | | | | | | | | | | 1 | | | | | 0 | 1000000 | |
| 0 | 0 | | | | | | | | | | | | | | | | | 1000000 | 0 | |
| 1 | | | | | | | | | | | | | | | | | | 0 | 0 | |
| 2 | | | | | | | | | | | | | | | | | | 0 | 0 | |
| 3 | | | | | | | | | | | | | | | | | | 0 | 100000 | |
| 4 | | 0 | | | | | | | | | | | | | | | | 1000000 | 0 | |
| 5 | | | | | | | | | | | | | | | | | | 0 | 0 | |
| 6 | | | | | | | | | | | | | | | | | | 0 | 0 | |
| 7 | | | | | | | | | | | | 0 | | | | | | 0 | 10000 | |
| 8 | | | 0 | | | | | | | | | | | | | | | 100000 | 0 | |
| 9 | | | | | | | | | | | | | | | | | | 0 | 0 | |
| 10 | | | | | | | | | | | | | | 2 | | | | 0 | 1000 | |
| 11 | | | | | | | | | | | | | | 3 | | | | 0 | 1000 | |
| 12 | | | | 0 | | | | | | | | | | | | | | 10000 | 0 | |
| 13 | | | | | 0 | | | | | | | | | | | | | 1000 | 0 | |
| 14 | | | | | | | | | | | | | | | | | | 0 | 0 | |
| 15 | | | | | | | | | | 0 | | | | | | | | 0 | 1000000 | |
| 16 | | | | | | | | | | 1 | | | | | | | | 0 | 1000000 | |
| 17 | 1 | | | | | | | | | | | | | | | | | 10000000 | 0 | |
| 18 | | | | | | | | | | | | | | | | | | 0 | 0 | |
| 19 | | | | | | | | | | | | | | | | | | 0 | 0 | |
| 20 | | | | | | | | | | | | 1 | | | | | | 0 | 100000 | |
| 21 | | 1 | | | | | | | | | | | | | | | | 1000000 | 0 | |
| 22 | | | | | | | | | | | | | | | | | | 0 | 0 | |
| 23 | | | | | | | | | | | | | | | | | | 0 | 0 | |
| 24 | | | | | | | | | | | | | 0 | | | | | 0 | 10000 | |
| 25 | | | 1 | | | | | | | | | | | | | | | 100000 | 0 | |
| 26 | | | | | | | | | | | | | | | 3 | | | 0 | 100 | |
| 27 | | | | | | | | | | | | | | 2 | | | | 0 | 1000 | |
| 28 | | | | 0 | | | | | | | | | | | 3 | | | 100 | 1000 | |
| 29 | | | | | 1 | | | | | | | | | | | | | 1000 | 0 | |
| 30 | | | | | | 1 | | | | | | | | | | | | 1000 | 0 | |
| 31 | | | | | | | | | | | | | | | | | | 0 | 0 | |
| 32 | | | | | | | | | | 0 | | | | | | | | 0 | 1000000 | |
| 33 | | | | | | | | | | 1 | | | | | | | | 0 | 1000000 | |
| 34 | 2 | | | | | | | | | | | | | | | | | 10000000 | 0 | |
| 35 | | | | | | | | | | | | | | | | | | 0 | 0 | |
| 36 | | | | | | | | | | | | | | | | | | 0 | 0 | |
| 37 | | | | | | | | | | | | 1 | | | | | | 0 | 100000 | |
| 38 | | 2 | | | | | | | | | | | | | | | | 1000000 | 0 | |
| 39 | | | | | | | | | | | | | | | | | | 0 | 0 | |
| 40 | | | | | | | | | | | | | | | | | | 0 | 0 | |
| 41 | | | | | | | | | | | | | 0 | | | | | 0 | 10000 | |
| 42 | | | 2 | | | | | | | | | | | | | 2 | | 100000 | 10 | |
| 43 | | | | | | | | | | | | | | | 3 | | | 0 | 100 | |
| 44 | | | | | | | 0 | | | | | | | 2 | | | | 10 | 1000 | |
| 45 | | | | | 1 | | | | | | | | | 3 | | | | 100 | 1000 | |
| 46 | | | | 2 | | | | | | | | | | | | | | 10000 | 0 | |
| 47 | | | | | 2 | | | | | | | | | | | | | 1000 | 0 | |
| 48 | | | | | | | | | | | | | | | | | | 0 | 0 | |
| 49 | | | | | | | | | | 0 | | | | | | | | 0 | 1000000 | |
| 50 | | | | | | | | | | 1 | | | | | | | | 0 | 1000000 | |
| 51 | 3 | | | | | | | | | | | | | | | | | 10000000 | 0 | |
| 52 | | | | | | | | | | | | | | | | | | 0 | 0 | |
| 53 | | | | | | | | | | | | | | | | | | 0 | 0 | |
| 54 | | | | | | | | | | | | 1 | | | | | | 0 | 100000 | |
| 55 | | 3 | | | | | | | | | | | | | | | | 1000000 | 0 | |
| 56 | | | | | | | | | | | | | | | | | | 0 | 0 | |
| 57 | | | | | | | | | | | | | | | | | | 0 | 0 | |
| 58 | | | | | | | | | | | | | 0 | | | | | 0 | 10000 | |
| 59 | | | 3 | | | | | | | | | | | | | 2 | | 100000 | 10 | |
| 60 | | | | | | | | | | | | | | | 3 | | | 1 | 100 | |
| 61 | | | | | | | 1 | | | | | | | 2 | | | | 10 | 1000 | |
| 62 | | | | | | 2 | | | | | | | | 3 | | | | 100 | 1000 | |
| 63 | | | | | | | 3 | | | | | | | | | | | 10000 | 0 | |

Simple 2-LS Bit Count and 2-MS-Bit Split Count Example With LS-Bit Time = 4 Clocks and 13 Clocks Between Lines Corrected

| | LS MRAM | | | MS MRAM | | | | | | LS ERAM Reads | | | MS ERAM Reads | | | | | | | |
|---|---|---|---|---|---|---|---|---|---|---|---|---|---|---|---|---|---|---|---|---|
| Count # | 3 | 2 | 1 | 0 | 0 | 1 | 2 | 3 | | 3 | 2 | 1 | 0 | 1 | 2 | 3 | | LSB Time= | 4 | |
| Binary Count | #### | #### | #### | #### | #### | #### | #### | #### | | | | | | | | | | Line Time= | 13 | |
| Binary T Weight | 0 | 4 | 8 | 12 | 13 | 28 | 44 | 60 | | | | | | | | | | | | |
| Adjusted Time | 0 | 4 | 8 | 12 | 14 | 29 | 45 | 61 | | | | | | | | | | | | |
| Offset | 0 | 0 | 0 | 0 | 1 | 1 | 1 | 1 | | 0 | 0 | 0 | 0 | 1 | 0 | 0 | 0 | Write Pattern | Write Conflict | Read Pattern | Read Conflict |
| Set/Reset Disp. | S | S | S | R | S | R | R | R | | | | | | | | | | | | |
| TIME (Clocks) | | | | | | | | | | | | | | | | | | | | |
| -2 | | | | | | | | | | 0 | | | | | | | | 0 | | 1000000 |
| -1 | | | | | | | | | | 1 | | | | | | | | 0 | | 1000000 |
| 0 | 0 | | | | | | | | | | | | | | | | | 10000000 | | 0 |
| 1 | | | | | | | | | | | | | | | | | | 0 | | 0 |
| 2 | | | | | | | | | | | | | | | | | | 0 | | 0 |
| 3 | | | | | | | | | | | | 1 | | | | | | 0 | | 100000 |
| 4 | | 0 | | | | | | | | | | | | | | | | 1000000 | | 0 |
| 5 | | | | | | | | | | | | | | | | | | 0 | | 0 |
| 6 | | | | | | | | | | | | | | | | | | 0 | | 0 |
| 7 | | | | | | | | | | | | | 0 | | | | | 0 | | 10000 |
| 8 | | | 0 | | | | | | | | | | | | | | | 100000 | | 0 |
| 9 | | | | | | | | | | | | | | | 2 | | | 0 | | 1000 |
| 10 | | | | | | | | | | | | | | | 3 | | | 0 | | 1000 |
| 11 | | | | | | | | | | 0 | | | | | | | | 0 | | 1000000 |
| 12 | | | | 0 | | | | | | 1 | | | | | | | | 10000 | | 1000000 |
| 13 | 1 | | | | | | | | | | | | | | | | | 10000000 | | 0 |
| 14 | | | | | 0 | | | | | | | | | | | | | 1000 | | 0 |
| 15 | | | | | | | | | | | | | | | | | | 0 | | 0 |
| 16 | | | | | | | | | | | | 1 | | | | | | 0 | | 100000 |
| 17 | | 1 | | | | | | | | | | | | | | | | 1000000 | | 0 |
| 18 | | | | | | | | | | | | | | | | | | 0 | | 0 |
| 19 | | | | | | | | | | | | | | | | | | 0 | | 0 |
| 20 | | | | | | | | | | | | | 0 | | | | | 0 | | 10000 |
| 21 | | | 1 | | | | | | | | | | | | | | | 100000 | | 0 |
| 22 | | | | | | | | | | | | | | | 2 | | | 0 | | 1000 |
| 23 | | | | | | | | | | | | | | | 3 | | | 0 | | 1000 |
| 24 | | | | | | | | | | 0 | | | | | | | | 0 | | 1000000 |
| 25 | | | | | 1 | | | | | 1 | | | | | | | | 10000 | | 1000000 |
| 26 | 2 | | | | | | | | | | | | | | | | | 10000000 | | 0 |
| 27 | | | | | | 1 | | | | | | | | | | | | 1000 | | 0 |
| 28 | | | | | | | | | | | | | | | | 3 | | 0 | | 100 |
| 29 | | | | | | | 0 | | | | | 1 | | | | | | 100 | | 10000 |
| 30 | | 2 | | | | | | | | | | | | | | | | 1000000 | | 0 |
| 31 | | | | | | | | | | | | | | | | | | 0 | | 0 |
| 32 | | | | | | | | | | | | | | | | | | 0 | | 0 |
| 33 | | | | | | | | | | | | | 0 | | | | | 0 | | 10000 |
| 34 | | | 2 | | | | | | | | | | | | | | | 100000 | | 0 |
| 35 | | | | | | | | | | | | | | | 2 | | | 0 | | 1000 |
| 36 | | | | | | | | | | | | | | | 3 | | | 0 | | 1000 |
| 37 | | | | | | | | | | 0 | | | | | | | | 0 | | 1000000 |
| 38 | | | | | | 2 | | | | 1 | | | | | | | | 10000 | | 1000000 |
| 39 | 3 | | | | | | | | | | | | | | | | | 10000000 | | 0 |
| 40 | | | | | | | 2 | | | | | | | | | | | 1000 | | 0 |
| 41 | | | | | | | | | | | | | | | | 3 | | 0 | | 100 |
| 42 | | | | | | | | 1 | | | | 1 | | | | | | 100 | | 100000 |
| 43 | | 3 | | | | | | | | | | | | | | | | 1000000 | | 0 |
| 44 | | | | | | | | | | | | | | | 2 | | | 0 | | 10 |
| 45 | | | | | | | | 0 | | | | | | | | | | 10 | | 0 |
| 46 | | | | | | | | | | | | | 0 | | | | | 0 | | 10000 |
| 47 | | | 3 | | | | | | | | | | | | | | | 100000 | | 0 |
| 48 | | | | | | | | | | | | | | | 2 | | | 0 | | 1000 |
| 49 | | | | | | | | | | | | | | | 3 | | | 0 | | 1000 |
| 50 | | | | | | | | | | 0 | | | | | | | | 0 | | 1000000 |
| 51 | | | | | | | 3 | | | 1 | | | | | | | | 10000 | | 1000000 |
| 52 | 4 | | | | | | | | | | | | | | | | | 10000000 | | 0 |
| 53 | | | | | | | 3 | | | | | | | | | | | 1000 | | 0 |
| 54 | | | | | | | | | | | | | | | | 3 | | 0 | | 100 |
| 55 | | | | | | | 2 | | | | | 1 | | | | | | 100 | | 100000 |
| 56 | | 4 | | | | | | | | | | | | | | | | 1000000 | | 0 |
| 57 | | | | | | | | | | | | | | | 2 | | | 0 | | 10 |
| 58 | | | | | | | | 1 | | | | | | | | | | 10 | | 0 |
| 59 | | | | | | | | | | | | | 0 | | | | | 0 | | 10000 |
| 60 | | | 4 | | | | | | | | | | | | | | | 100000 | | 0 |
| 61 | | | | | | | | 0 | | | | | | | 2 | | | 1 | | 1000 |
| 62 | | | | | | | | | | | | | | | 3 | | | 0 | | 1000 |
| 63 | | | | | | | | | | 0 | | | | | | | | 0 | | 1000000 |

| Pixel Value | Binary Bits 9-6 | P1 | P2 | Number Reads |
|---|---|---|---|---|
| 0 | 0000 | 0 | 0 | 2 |
| 1 | 0001 | 0 | 1 | 2 |
| 2 | 0010 | 0 | 1 | 2 |
| 3 | 0011 | 0 | 1 | 1 |
| 4 | 0100 | 1 | 0 | 2 |
| 5 | 0101 | 1 | 1 | 2 |
| 6 | 0110 | 1 | 1 | 2 |
| 7 | 0111 | 1 | 1 | 1 |
| 8 | 1000 | 1 | 0 | 2 |
| 9 | 1001 | 1 | 1 | 2 |
| 10 | 1010 | 1 | 1 | 2 |
| 11 | 1011 | 1 | 1 | 1 |
| 12 | 1100 | 1 | 0 | 1 |
| 13 | 1101 | 1 | 1 | 1 |
| 14 | 1110 | 1 | 1 | 1 |
| 15 | 1111 | 1 | 1 | 0 |
|  |  |  |  |  |
| Total Zeros | 32 |  | Total | 24 |

FIG. 27

Simple Dual Time Base Example (3-LS and 2-MS Example)

| Input Value | First Time Base (Simple Binary) | | | | | | Second Time Base | | | | | | Delta | |
|---|---|---|---|---|---|---|---|---|---|---|---|---|---|---|
| | MS | LS | Time | Bit Position | Time Value | Cumm. Value | Time | MS | LS | Bit Position | Time Value | Cumm. Value | First-Second | % Diff |
| 0 | 0 | 0 | 0.000 | LS=0 | 0 | 0.000 | 0.000 | 0 | 0 | LS=0 | 0 | 0.000 | 0.000 | 0.0 |
| 1 | 0 | 1 | 0.032 | LS=1 | 0.032 | 0.032 | 0.035 | 0 | 1 | LS=1 | 0.035 | 0.035 | -0.003 | -9.4 |
| 2 | 0 | 2 | 0.065 | LS=2 | 0.033 | 0.065 | 0.070 | 0 | 2 | LS=2 | 0.035 | 0.070 | -0.005 | -7.7 |
| 3 | 0 | 3 | 0.097 | LS=3 | 0.032 | 0.097 | 0.105 | 0 | 3 | LS=3 | 0.035 | 0.105 | -0.008 | -8.2 |
| 4 | 0 | 4 | 0.129 | LS=4 | 0.032 | 0.129 | 0.139 | 0 | 4 | LS=4 | 0.034 | 0.139 | -0.010 | -7.8 |
| 5 | 0 | 5 | 0.161 | LS=5 | 0.032 | 0.161 | 0.174 | 0 | 5 | LS=5 | 0.035 | 0.174 | -0.013 | -8.1 |
| 6 | 0 | 6 | 0.194 | LS=6 | 0.033 | 0.194 | 0.209 | 0 | 6 | LS=6 | 0.035 | 0.209 | -0.015 | -7.7 |
| 7 | 0 | 7 | 0.226 | LS=7 | 0.032 | 0.226 | 0.209 | 0 | 6 | LS=7 | 0.035 | 0.244 | 0.017 | 7.4 |
| 8 | 1 | 0 | 0.258 | MS=0 | 0.000 | 0.000 | 0.244 | 0 | 7 | MS=0 | 0.000 | 0.000 | 0.014 | 5.4 |
| 9 | 1 | 1 | 0.290 | MS=1 | 0.258 | 0.258 | 0.279 | 1 | 0 | MS=1 | 0.279 | 0.279 | 0.011 | 3.8 |
| 10 | 1 | 2 | 0.323 | MS=2 | 0.258 | 0.516 | 0.314 | 1 | 1 | MS=2 | 0.261 | 0.540 | 0.009 | 2.8 |
| 11 | 1 | 3 | 0.355 | MS=3 | 0.258 | 0.774 | 0.349 | 1 | 2 | MS=3 | 0.251 | 0.791 | 0.006 | 1.7 |
| 12 | 1 | 4 | 0.387 | | | | 0.384 | 1 | 3 | | | | 0.003 | 0.8 |
| 13 | 1 | 5 | 0.419 | | | | 0.418 | 1 | 4 | | | | 0.001 | 0.2 |
| 14 | 1 | 6 | 0.452 | | | | 0.453 | 1 | 5 | | | | -0.001 | -0.2 |
| 15 | 1 | 7 | 0.484 | | | | 0.488 | 1 | 6 | | | | -0.004 | -0.9 |
| 16 | 2 | 0 | 0.516 | | | | 0.523 | 1 | 7 | | | | -0.007 | -1.4 |
| 17 | 2 | 1 | 0.548 | | | | 0.540 | 2 | 0 | | | | 0.008 | 1.5 |
| 18 | 2 | 2 | 0.581 | | | | 0.575 | 2 | 1 | | | | 0.006 | 1.0 |
| 19 | 2 | 3 | 0.613 | | | | 0.610 | 2 | 2 | | | | 0.003 | 0.5 |
| 20 | 2 | 4 | 0.645 | | | | 0.645 | 2 | 3 | | | | 0.000 | 0.0 |
| 21 | 2 | 5 | 0.677 | | | | 0.679 | 2 | 4 | | | | -0.002 | -0.3 |
| 22 | 2 | 6 | 0.710 | | | | 0.714 | 2 | 5 | | | | -0.004 | -0.6 |
| 23 | 2 | 7 | 0.742 | | | | 0.749 | 2 | 6 | | | | -0.007 | -1.0 |
| 24 | 3 | 0 | 0.774 | | | | 0.784 | 2 | 7 | | | | -0.010 | -1.3 |
| 25 | 3 | 1 | 0.806 | | | | 0.791 | 3 | 0 | | | | 0.015 | 1.9 |
| 26 | 3 | 2 | 0.839 | | | | 0.826 | 3 | 1 | | | | 0.013 | 1.5 |
| 27 | 3 | 3 | 0.871 | | | | 0.861 | 3 | 2 | | | | 0.010 | 1.1 |
| 28 | 3 | 4 | 0.903 | | | | 0.896 | 3 | 3 | | | | 0.007 | 0.8 |
| 29 | 3 | 5 | 0.935 | | | | 0.930 | 3 | 4 | | | | 0.005 | 0.5 |
| 30 | 3 | 6 | 0.968 | | | | 0.965 | 3 | 5 | | | | 0.003 | 0.3 |
| 31 | 3 | 7 | 1.000 | | | | 1.000 | 3 | 6 | | | | 0.000 | 0.0 |

…

MASKED WRITE ON AN ARRAY OF DRIVE BITS

CROSS-REFERENCE TO RELATED APPLICATIONS

This application is a divisional of U.S. application Ser. No. 10/849,195, filed May 20, 2004, now U.S. Pat. No. 7,071,908 issued Jul. 4, 2006, which in turn claims priority from U.S. Provisional Patent Application No. 60/471,731, entitled "Digital Backplane," filed May 20, 2003, and U.S. Provisional Patent Application No. 60/568,253, entitled "Recursive Feedback Digital Backplane," filed May 6, 2004. The entire disclosure and contents of the above-identified U.S. application and U.S. Provisional Applications are incorporated herein by reference.[1]

BACKGROUND

1. Field of the Invention

The present invention relates to a digital backplane and various methods, systems and devices for controlling a digital backplane, light modulating elements and spatial light modulators.

2. Related Art

The concept of digital LCoS devices has been known for well over 10 years. The U.S. Pat. No. 5,959,598 to McKnight gives an example of many of the basic digital LCoS concepts and is included herein by reference. U.S. Pat. No. 6,650,138 to Zuravleff shows another variation of this "master-slave" mirror drive arrangement. Both these patents use a feed forward drive method. Both of these patents show a two storage bit structure in which one of the storage bits is directly shifted to the next bit for display and thus the two bits of storage are inexorably linked together and connected to a specific output. However, the methods described in these patents require considerable bandwidth.

U.S. Published Patent Application Document No. 2003/0160803 to Willis shows a spatial light modulator microdisplay which uses a "feed forward" drive method. In this application, an N-bit pixel value is compared to a N-bit counter and the result of that comparison is used to drive a display mirror of an LCoS device. Willis shows an N-bit wide comparison occurring $2^N$ times in order to control the bit with each comparison requiring all N-bits. Willis shows needing at least N-bits of memory storage on the display device to affect the PWM control. This means that N-bits must some how be sent/connect to an N-bit wide comparator $2^N$ times in order to control the PWM waveform.

SUMMARY

It is one object of the present invention to use recursive feedback to drive an LCoS device using a minimal amount of bandwidth.

It is a further object of the present invention to avoid requiring a multi-bit wide comparison to control an output.

It is yet a further object of the present invention to use fewer than N-Bits on one or more comparisons to reduce the need to fetch data.

It is yet a further object of the present invention to use significantly fewer than $2^N$ comparisons to determine a PWM waveform with $2^N$ different widths.

According to a first broad aspect of the present invention, there is provided a device comprising: electrode means comprising at least one electrode for controlling a light modulating element of an array of light modulating elements; and recursive feedback control means for controlling at least one pulse width using recursive feedback, the pulse width driving the electrode means.

According to a second broad aspect of present invention, there is provided a method comprising the following steps: (a) controlling at least one pulse width using recursive feedback; and (b) driving an electrode means using the pulse width to thereby control a light modulating element of an array of light modulating elements.

According to a third broad aspect of present invention, there is provided a system comprising: means for controlling at least one pulse width using recursive feedback; and means for driving an electrode means using the pulse width to thereby control a light modulating element of an array of light modulating elements.

According to a fourth broad aspect of present invention, there is provided a device comprising: an array of storage bits for controlling an array of outputs; and updating means for conditionally updating the storage bits.

According to a fifth broad aspect of present invention, there is provided a method comprising: forming a plurality of single pulses by performing two series of count steps for each of the plurality of single pulses, and controlling an array of light modulating elements using a respective single pulse of the plurality of single pulses for each light modulating element of the array.

According to a sixth broad aspect of present invention, there is provided a system comprising: means for forming a plurality of single pulses by performing two series of count steps for each of the plurality of single pulses, and means for controlling an array of light modulating elements using a respective single pulse of the plurality of single pulses for each light modulating element of the array.

According to a seventh broad aspect of present invention, there is provided a device comprising: an array of light modulating elements; and means for generating pulse widths for each of the light modulating elements using bit serial processing.

According to a eighth broad aspect of present invention, there is provided a method comprising: providing an array of light modulating elements; and generating pulse widths for each of the light modulating elements using bit serial processing.

According to a ninth broad aspect of present invention, there is provided a system comprising: an array of light modulating elements; and means for generating pulse widths for each of the light modulating elements using bit serial processing.

According to a tenth broad aspect of present invention, there is provided a device comprising: a substrate; an array of electrodes for controlling light modulating elements, the electrodes being located on the substrate; and an array of bit serial processing elements for controlling the light modulating elements, the bit processing elements being located on the substrate.

According to an eleventh broad aspect of present invention, there is provided a device comprising: a two-dimensional array of light modulating elements; output bits for controlling each of the light modulating elements; reading means for reading one bit position of pixel values for a one-dimensional array of light modulating elements of the two-dimensional array of light modulating elements; and means for computing a one-dimensional array of control signals for the output bits based on one or more sets one-bit positions of the pixel values, wherein the control signals are capable of being used to control a next value of each of the output bits to thereby control each of the light modulating elements.

According to a twelfth broad aspect of present invention, there is provided a method comprising the following steps: (a) inputting partially or fully encoded pixel values for an array of light modulating elements using digital processing to convert the pixel values to pulse widths; and (b) controlling a plurality of light modulating elements of the array of light modulating elements using a series of instructions to control multiple data path elements.

According to a thirteenth broad aspect of present invention, there is provided a system comprising: means inputting partially or fully encoded pixel values for an array of light modulating elements using digital processing to convert the pixel values to pulse widths; and means for controlling a plurality of light modulating elements of the array of light modulating elements using a series of instructions to control multiple data path elements.

According to a fourteenth broad aspect of present invention, there is provided a method comprising: controlling at least one pulse width using a recursive feedback process; and controlling an array of electrodes using the at least one pulse width, wherein the recursive feedback process is performed using bit serial processing.

According to a fifteenth broad aspect of present invention, there is provided a system comprising: means controlling at least one pulse width using a recursive feedback process; and means for controlling an array of electrodes using the at least one pulse width, wherein the recursive feedback process is performed using bit serial processing.

According to a sixteenth broad aspect of present invention, there is provided a method comprising the following steps: (a) providing available memory on a spatial light modulator; and (b) reallocating the available memory for data on the spatial light modulator, wherein space allocated is based on the length of time that the data needs to stay resident on the spatial light modulator and wherein the data is processed to control electrodes on the spatial light modulator.

According to a seventeenth broad aspect of present invention, there is provided a system comprising: means for providing available memory on a spatial light modulator; and means for reallocating the available memory for data on the spatial light modulator, wherein space allocated is based on the length of time that the data needs to stay resident on the spatial light modulator and wherein the data is processed to control electrodes on the spatial light modulator.

According to an eighteenth broad aspect of present invention, there is provided a device comprising: a backplane comprising an instruction memory for holding instructions for controlling at least one pulse width on each light modulating element of a spatial light modulator.

According to a nineteenth broad aspect of present invention, there is provided a device comprising: a backplane for a spatial modulator; a plurality of pointers to bit position array on the backplane; and pointer controller means for controlling the plurality of pointers.

According to a twentieth broad aspect of present invention, there is provided a method comprising: storing a first group of bit positions of a plurality of pixels in bit position arrays on a backplane, the first group of bit positions comprising a contiguous group of bit positions; storing at least one second group of bit positions on the backplane, the second group of bit positions corresponding to a subset of the plurality of pixels; and combining on the backplane the first group and the at least one second group to thereby control a pulse width of one or more light modulating elements, wherein the second group of bit positions is stored for a shorter period of time on the backplane than the first group of bit positions is stored on the backplane.

According to a twenty-first broad aspect of present invention, there is provided a system comprising: means for storing a first group of bit positions of a plurality of pixels in bit position arrays on a backplane, the first group of bit positions comprising a contiguous group of bit positions; means for storing at least one second group of bit positions on the backplane, the second group of bit positions corresponding to a subset of the plurality of pixels; and means for combining on the backplane the first group and the at least one second group to thereby control a pulse width of one or more light modulating elements, wherein the second group of bit positions is stored for a shorter period of time on the backplane than the first group of bit positions is stored on the backplane.

According to a twenty-second broad aspect of present invention, there is provided a method comprising: storing a first group of bit positions of a plurality of pixels in bit position arrays on a backplane, the first group of bit positions comprising a contiguous group of bit positions; storing at least one summary bit of the plurality of pixel value on the backplane, and combining on the backplane the first group and the at least one summary bit to thereby control a pulse width of one or more light modulating elements, wherein the summary bit is stored for a shorter period of time on the backplane than the first group of bit positions is stored on the backplane.

According to a twenty-third broad aspect of present invention, there is provided a system comprising: means for storing a first group of bit positions of a plurality of pixels in bit position arrays on a backplane, the first group of bit positions comprising a contiguous group of bit positions; means for storing at least one summary bit of the plurality of pixel value on the backplane, and means for combining on the backplane the first group and the at least one summary bit to thereby control a pulse width of one or more light modulating elements, wherein the summary bit is stored for a shorter period of time on the backplane than the first group of bit positions is stored on the backplane.

According to a twenty-fourth broad aspect of present invention, there is provided a device comprising: an array of circuits comprising: means for voltage level shifting; a selectable logic function based on a memory bit; and means for controlling one or more light modulating elements, wherein a constant voltage source is used for the array of circuits.

According to a twenty-fifth broad aspect of present invention, there is provided a method comprising: determining a pulse wave form for each line of a two-dimensional array of drive bits using a recursive feedback process, wherein each drive bit in the array of drive bits is in an initialized state; and turning all of the drive bits to an off state to thereby produce a blanking interval between fields for an image, wherein control of each of the pulse wave forms is staggered in time.

According to a twenty-sixth broad aspect of present invention, there is provided a system comprising: means for determining a pulse wave form for each line of a two-dimensional array of drive bits using a recursive feedback process, wherein each drive bit in the array of drive bits is in an initialized state; and means for turning all of the drive bits to an off state to thereby produce a blanking interval between fields for an image, wherein control of each of the pulse wave forms is staggered in time.

According to a twenty-seventh broad aspect of present invention, there is provided a device comprising: a spatial light modulator comprising an array of master-slave bit pairs, wherein for each master-slave bit pair a master bit includes means for selectively driving a corresponding slave bit, and wherein both the master bit and the corresponding slave bit are capable of being randomly accessed.

According to a twenty-eighth broad aspect of present invention, there is provided a method comprising: providing an m bit input pixel value; and mapping the m bit input pixel value into a non-binary weighted single pulse using time based remapping to thereby control a light modulating element of a spatial light modulator.

According to a twenty-ninth broad aspect of present invention, there is provided a system comprising: means for providing an m bit input pixel value; and means for mapping the m bit input pixel value into a non-binary weighted single pulse using time based remapping to thereby control a light modulating element of a spatial light modulator.

According to a thirtieth broad aspect of present invention, there is provided a device comprising: a backplane controller including means for sequencing a series of instructions, wherein the instructions control memory accesses to data that is used to control one or more pulse widths on a spatial light modulator.

According to a thirty-first broad aspect of present invention, there is provided a method comprising: mapping an input pixel value for each pixel of an array of pixels to a first output pixel value using a first time base to generate first pulse width; and mapping the input pixel value to a second output pixel value using a second time base to generate a second pulse width to thereby reduce the worse case phase difference in adjacent pixels of a spatial light modulator, wherein the adjacent pixels of the array of pixels have respective input pixel values that differ by 1 LS-bit.

According to a thirty-second broad aspect of present invention, there is provided a system comprising: means for mapping an input pixel value for each pixel of an array of pixels to a first output pixel value using a first time base to generate first pulse width; and means for mapping the input pixel value to a second output pixel value using a second time base to generate a second pulse width to thereby reduce the worse case phase difference in adjacent pixels of a spatial light modulator, wherein the adjacent pixels of the array of pixels have respective input pixel values that differ by 1 LS-bit.

According to a thirty-third broad aspect of present invention, there is provided a device comprising: an MRAM array of MRAM storage bits for a spatial light modulator, the MRAM storage bits being arranged in MRAM columns; and bit lines for each of the MRAM columns, wherein the bit lines support a first and a second driver on opposite sides of the array, wherein the MRAM storage bits are for a spatial light modulator.

According to a thirty-fourth broad aspect of present invention, there is provided a device comprising: an array of drive bits; and means for performing a masked write to the drive bits.

BRIEF DESCRIPTION OF THE DRAWINGS

The present invention will be described in conjunction with the accompanying drawings, in which:

FIG. 1 is a flow chart illustrating a prior feed forward control process;

FIG. 2 is a flow chart illustrating a recursive feedback control process in accordance with one embodiment of the present invention;

FIG. 8 shows a logical representation of a simplified 2 row by 2 column SRAM;

FIG. 9 shows a 2 row by 2 column array that demonstrates a simplified write mask SRAM design in accordance with one embodiment of the present invention;

FIG. 11A illustrates in simplified form a memory array circuit in accordance with an embodiment of the present invention;

FIG. 11B illustrates in expanded form a set of components of the memory array of FIG. 11A for a single mirror/electrode;

FIG. 18 is a table illustrating a simplified example of a backplane control processing sequencing according to one embodiment of the present invention;

FIG. 19 is a table illustrating a simplified example of a backplane control processing sequencing according to one embodiment of the present invention;

FIG. 20 is a table illustrating a simplified example of a backplane control processing sequencing according to one embodiment of the present invention;

FIG. 21 is a table illustrating a simplified example of a backplane control processing sequencing according to one embodiment of the present invention;

FIG. 25 is a table providing an example of how summary bits are produced;

FIG. 27 is a table illustrating simplified example of a method to change the time base between fields to break up transitions that cause the worst case "out of phase" lateral fields in a smoothly ramping (stepping by 1) image;

DETAILED DESCRIPTION

Figures 3, 4:
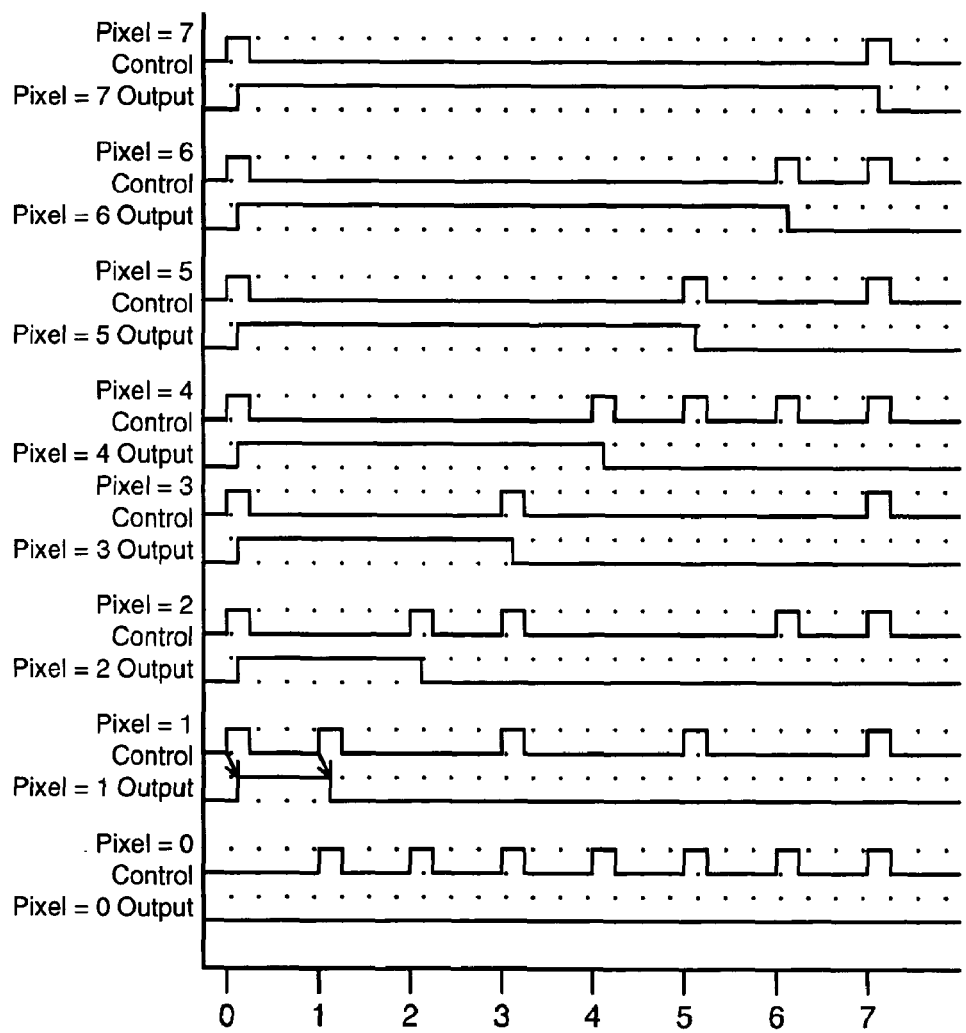
FIG. 3 is a table outlining a recursive feedback method in accordance with one embodiment of the present invention.
FIG. 4 is a simplified timing diagram for the control method shown in the table of FIG. 3.

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated.

For the purposes of the present invention, a value or property is "based" on a particular value, property, the satisfaction of a condition, or other factor, if that value is derived by performing a mathematical calculation or logical decision using that value, property or other factor. For example, a "next output value" may be based on a "current output value", a line of an SRAM may be pulled down, or not, based on the output bit of an inverter, etc. In the context of the present invention, it should be understood that some storage structure and/or memory circuits will support a new value being based on its old value without having to physically read or write the bit to logic for making the calculation or decision, and in this case the feedback is considered to be "implicit" feedback.

For the purposes of the present invention, the term "array of storage bits" refers to a memory.

For the purposes of the present invention, the term "available memory" refers to memory on a device that is not currently needed by some other process performed by the device.

For the purposes of the present invention, the term "backplane" refers to a substrate that is used to build logic and control functions for a display device. A backplane may be made of a semiconductor material, such as silicon, GaAs, etc. and it would include transistors that are deposited or grown on a substrate such the well known formation of transistors on a glass or other insulating substrate.

For the purposes of the present invention, the term "binary weighted of time" refers to means that successively higher bit positions in a pixel's value represent a doubling of time. Thus for example if bit position 0 (the least significant bit position) represents an amount of time T, then bit position 1 will be 2T long, bit position 2 will be 4T long, and so forth.

For the purposes of the present invention, the term "bit plane buffer" refers to storing all or part of a bit plane in a physical memory location. A bit plane buffer, may or may not store the bit plane in the same array order as it is seen in a visual display. In some embodiments of the present invention, the ERAM will store one or more bit plane buffers. In some embodiments these bit plane buffers will be also circular buffers.

For the purposes of the present invention, the term "bit plane" refers to taking on bit position from an array of pixels to form an bit array that is of the same dimensions as pixel array but with only one bit per element of the array. A "bit plane" may be either physically separated in the case of "bit-plane organized" data or it may be used to refer to the concept of a bit position within an array of pixels. A "bit plane" may also be an array of bits that correspond to an array of pixels and the bit value may be based on some computation of the original pixel. In some embodiments a series of "summary bits" is generated that may be treated as a bit plane.

For the purposes of the present invention, the term "bit position" refers to a bit location within an ordered group of bits.

For the purposes of the present invention, the term "bit recursive feedback" refers to using a single bit of storage at or near the output or a duplicate copy thereof as a one bit input to help form the next output.

For the purposes of the present invention, the term "bit recursive feedback" refers to recursive feedback where the value being fed back is a single bit. The feedback may be either a signal, a memory read, or as is the case of some embodiments of the present invention, an implicit feedback where the next state of the bit is based on the previous state without having to physically read or feedback the old value.

For the purposes of the present invention, the term "bit serial processing" refers to a method where a multi-bit computation is performed as a series of one-bit wide operations where the result(s) from previous operations may be used as inputs to the next operation. Bit serial processing may store each bit of precision at a different memory address. To control the massive number of outputs using bit serial processing a technique known as Single Instruction, Multiple Data Stream (SIMD) processing may be employed.

For the purposes of the present invention, the term "bit serial processor" refers to a device that carries out bit serial processing.

For the purposes of the present invention, the term "bit serial processing element" or "bit serial PE" refers to the data processing portion of a bit serial processor.

For the purposes of the present invention, the term "bit-parallel SIMD" refers to is a SIMD processors that have data paths that operate on multiple bits per cycle. Examples of bit-parallel SIMD processors are described and shown in U.S. Pat. Nos. 4,773,038 and 5,864,703, the entire contents and disclosures of which are hereby incorporated by reference.

For the purposes of the present invention, the term "bit-plane organized data" refers storing each bit position of an array of pixels (each bit plane) in a physically separate location. For simplicity of writing when it is clear that the reference is to bit-planned organized data, these will simply be referred to as "bit planes."

For the purposes of the present invention, the term "bit-position array" refers to a subset of the bit positions for a group of pixels.

For the purposes of the present invention, the term "bits/sec/pin" refers to bits per second per pin and is the metric that may be used to give the speed of the bus. For Double data Rate Synchronous DRAM (DDRAM) busses bit/sec/pin is twice the clock rate.

For the purposes of the present invention, the term "bit-serial SIMD" refers to SIMD processors that have one bit wide data paths within the PEs. In their simplest form bit-serial SIMD processors work on one bit of precision per cycle. Examples of bit-serial SIMD processors are described and shown in U.S. Pat. Nos. 4,621,339; 5,210,826; 5,581,773 and 6,493,467, the entire contents and disclosures of which are hereby incorporated by reference.

For the purposes of the present invention, the term "buffer" refers to a data storage structure where bits are saved temporarily. Often a buffer needs to support bits going in and out at the same time and may be a dual port RAM or some form of double buffering. One or more buffers may also be used to take in data bits at one width and data rate and output the data bits at a different rate and/or data width. The term "buffer" includes references to the temporary storage or delays of single bit values or control signals.

For the purposes of the present invention, the term "circular buffer" refers to a memory accessing method with a read pointer and a write pointer, wherein both the read and write pointer are reset to the top of the buffer if the pointers exceed the end of the buffer length. A memory pointer moves in a circular buffer fashion when the memory pointer is used to point to a circular buffer and the memory pointer is controlled so memory operations stay within the bounds of the circular buffer.

For the purposes of the present invention, the term "column" is used with respect to a memory organized bit lines. Often there are two bit lines per "column" of memory. Often there is a column decoder which functions to multiplex a plurality columns to form a single output. Compared to most typical memory, the there will be a large number of outputs many of the on-backplane memories which will result in little or in some case no column decoding.

For the purposes of the present invention, the term "conditionally updating" refers to either "conditionally setting," or "conditionally resetting" a storage bit. The storage bit may be part of a memory array. "Conditionally updating" may be used interchangeably with the term "conditionally writing" for the purposes of the present invention. At least some common memories such as a conventional SRAM or Dynamic RAM (DRAM) only support unconditional writing that can only set a given bit to a 1 or a 0 regardless of it current state. A memory that supports condition updating has the ability to control whether or not a given bit is written. A "masked write" is one implementation of a "conditional update." Conditionally resetting may also be referred to as "conditionally clearing."

For the purposes of the present invention, the term "contiguous bit positions" refers to bit positions that have sequential weighting. What it is most common for bits to be associated with a binary weighting, the weighting of the bits may be other than binary in terms of the way they affect the output of a spatial light modulator or the control thereof.

For the purposes of the present invention, the term "count stage" or "pulse stage" refers to a digitally controlled pulse width can go up or down at a finite number of points. The evaluation of at each of these points is referred to as a stage. There may be multiple clock cycles on the backplane and multiple operations that go into computing the pulse for a given stage.

For the purposes of the present invention, the term "count step" refers to one step of a multi-step process where each step controls or potentially controls a transition of a pulse high or low. A count step may be performed using in one or more cycles using an individual logical or arithmetic operation or a series of logical or arithmetic operations.

For the purposes of the present invention, the term "current count" refers, conceptually, to the current position in a pulse width that is being determined. While the current count may be thought of as a physical count or counter, the current count may just be a conceptual point in a sequencing device or program. In the case of one embodiment of the present invention there is no physical "count" but rather there is a stage of a program that causes certain events so that the "physical count" and compare operation is replaced by a program sequence.

For the purposes of the present invention, the term "data cycles" to the time it takes to transfer one bit of data on one data line. In the case of some data busses such as those associated with "double data rate" such as DDRAM, the data is sampled on the leading and trailing edge of a clock cycle and thus making two "data cycles" for every clock cycle. For the purposes of the present invention, the rate at which data is sampled will be call the data cycle.

For the purposes of the present invention, the term "dedicated panel frame buffer" or "dedicated backplane frame buffer" refers to a frame buffer that includes memory locations that only provide data on a backplane.

For the purposes of the present invention, the term "deductive pulse width control" refers to method for controlling a pulse wherein only some of the bits of a pixel's value bits need to be looked at on most cycles. Such a deductive pulse width control may be made possible by the recursive feedback support. An example of deductive pulse width control is described below with respect to FIGS. 3 and 4.

For the purposes of the present invention, the term "display element" is a general term to describe a single element of a multidimensional display. This element may be a small mirror in the case of LCoS or a DLP™ device, or it may be a single Light Emitting Diode (LED), or even an element of a print out of from a printer.

For the purposes of the present invention, the term "drive output bit" or "drive bit" refers a storage bit that is used to drive an electrode that controls an output, such as the output of a spatial light modulator. A drive bit is a storage bit upon which an output of a device is based, either directly or through other circuitry has an output of the device based on it. For example, drive output bit may drive an electrode through additional circuitry including logic circuitry and voltage level shifting so that the electrode is based on the drive output bit. An output of a device may be purely visual such as the control of reflected or emitted light. In some embodiments of the present invention, a reflective mirror is used both as an electrode and an optical mirror while in other embodiments of the present invention, such as when driving LEDs, the electrode may not also be an optical mirror. An MRAM is a collection of drive output bits, as well as possibly other storage bits, organized into a memory array.

For the purposes of the present invention, the term "driving an electrode" refers to driving an electrode either directly or through other circuitry. The circuitry used in driving an electrode may include logic functions.

For the purposes of the present invention, the term "explicit recursive feedback" refers to a recursive feedback process wherein feedback signal or feedback data is based on a separate feedback signal or a memory read operation.

For the purposes of the present invention, the term "feed forward" refers to computations that are made without feeding back results from prior stages. A common feed forward function used in displays is to compare a count to the value of pixel.

For the purposes of the present invention, the term "field sequential color" refers to a visual display apparatus presenting in sequence the various colors required to form a color image. Often using a fast spinning color wheel with different color filters, the various colors flash on the display device. With field sequential color, essentially a single color illuminates the spatial light modulator at a time. Due to the way the human visual system behaves, it has been found it requires higher field rates to keep a person from perceiving an effect known as color breakup.

For the purposes of the present invention, the term "field sequential color" with no pre-qualifiers refers to a spatial light modulator that is illuminated by single color fields scrolling across a light modulator such as would occur with a segmented rotating color wheel.

For the purposes of the present invention, the term "flashing sequential" refers to the situation where a spatial light modulator is either illuminated by or generates a field without the light scrolling. This would be the case for example, if the spatial light modulator is illuminated by a series of LEDs in various colors where only one color is turned on at a time. A flashing sequential display process may also be used for monochrome displays and/or constant illumination displays.

For the purposes of the present invention, the term "gamma correction" refers to mapping input pixel values to output pixel values. In display devices, it is common to not want a linear change in the input value to have a linear response on the display. Additionally other display characteristics are adjusted by the "gamma correction."

For the purposes of the present invention, the term "heterogeneous bit-position array" refers to a bit-position array in which the bit positions are more than one bit position.

For the purposes of the present invention, the term "homogeneous bit-position array" refers to a bit-position array in which all of the bit positions are only one bit position.

For the purposes of the present invention, the term "horizontal lines" is a term that is relative to the image as viewed. When describing a displayed image, in the descriptions of the present invention below the terms vertical and horizontal lines are used. In the descriptions of the present invention below, the terms "columns" and "rows" refer to memory structures. In some embodiments, the ROWs in the MRAM and/or ERAM may run in the same direction as the horizontal "lines" (as would typically occur for example in a top to bottom raster scanning display) of the image generated and in other embodiments the columns of the MRAM and ERAM may run in the direction of the horizontal "line" (as in the case of a "horizontal scanning" display).

For the purposes of the present invention, the term "implicit recursive feedback" refers to a recursive feedback process in which the feedback data is not based on a separate feedback signal nor on a memory read operation. Examples of implicit recursive feedback include an output based on a masked write operation, a set-reset type of storage function, a D flip-flop with an inhibited clocking means, etc.

For the purposes of the present invention, the term "implicit recursive feedback" or simply "implicit feedback" refers to the situation where a current output value has an effect on the next output value but where the storage device for the output value is such that the bit does not have to be physically read or wired out. An example of implicit recursive feedback would be a set, reset flip flop. A set-reset flip flop may be set to a 1, or reset to a 0, or importantly, if neither a set nor reset signal is applied the state will remain the same. This option for the bit to be optionally set, reset, or left alone facilitates a form of virtual recursive feedback. In one embodiment of the present invention, a memory structure that uses ordinary RAM storage bits for high density but supports this ability with the column driver circuitry to support a "masked write" will support this virtual recursive feedback.

For the purposes of the present invention, the term "inherently testable" refers to a circuit or an array of circuits that may be tested without requiring the use of special test circuitry within each element of the circuit or array of circuits. For example, an SRAM bit is inherently testable.

For the purposes of the present invention, the term "instruction" is used to mean a set of control bits held at one or more addresses in one or more memories that are used to control one or more data processing operations as are common in stored program computers such as a microprocessor or microcomputer. The memory that contains the instructions is commonly referred to as the instruction memory. A series of addresses in the instruction memory cause "series of instructions" to be fetched for use to control data processing. The sequencing of instructions may be controlled by a counter often known as a program counter (PC) to fetch instructions in a numerical order by address location and/or some form of conditional or unconditional jumping or branching operation. The bits in an instruction may be used without decoding to cause a given control action or often they are decoded, used as addresses into a memory, or otherwise manipulated to generate the final control signals that act to give the processing action desired. As is well known in the art, instructions can be held in random access memory (RAM) in which case they can be downloaded at any time, or they could be "burned" ROM, Flash memory or other types of storage devices that don't require downloading once programmed and may or may not be reprogrammable.

For the purposes of the present invention, the term "input pixel value" refers to the numerical value associated with a pixel before the value is corrected or adjusted to compensate for the various system and device response characteristics.

For the purposes of the present invention, the term "intermediate output bit" refers to an output bit that is not a drive output bit.

For the purposes of the present invention, the term "light modulating element" refers to a means for controlling the properties of a light source. For example, a light modulating element may control a light emitting source such as an, phosphor dot, LED, etc., may control the way light is reflected by a mirror device, may control the polarization of light such as in an LCD device, etc.

For the purposes of the present invention, the term "liquid crystal display device" or "LCD device" refers to the conventional meaning of the term LCD device as well as to related such as LCOS devices.

For the purposes of the present invention, the term "masked write" refers to a write operation in which some bit or group of bits is enabled or disabled from writing based on a separate mask value. In one embodiment of the present invention, the masking is supported on a bit-by-bit basis. In one embodiment of the present invention, the data written is common broadcasted in some operations and the control of the outputs is based on whether various bits are enabled to be written. This in effect treats the storage bits as a "Set Reset" (SR) flip flop, that may be set, reset, or left unmodified. A masked write is one way to implement a conditional update. An example of a RAM with masked write capability is shown in FIG. 9.

For the purposes of the present invention, the term "masked write" refers to a write operation in which some bit or group of bits is enabled or disabled from writing based on a separate mask value. In one embodiment of the present invention, the masking is supported on a bit-by-bit basis. In one embodiment of the present invention, the data written is common broadcasted in some operations and the control of the outputs is based on whether various bits are enabled to be written. This in effect treats the storage bits as a "Set Reset" (SR) flip flop, that may be set, reset, or left unmodified. A masked write is one way to implement a conditional update. An example of a RAM with masked write capability in shown in FIG. 9.

For the purposes of the present invention, the term "master-slave" refers to a two bit storage circuit wherein there in there is a "master bit" that takes data in and then at some later time transfers it to a "slave bit." Master-slave bits have been common in some forms of digital backplanes for LCoS. In prior digital LCoS devices using master-slave bits to control the mirror/electrode, only the "master bit" of a master-slave bit pair may be randomly accessed and the "slave bit" will drive the mirror/electrode. Some embodiments of the present invention may use master-slave bits in the memory array that includes the driver bits (the "MRAM array") and other embodiments will not need or use master-slave bits for the driver bits. In some embodiments it may be desirable to randomly access either the "master bit" or the "slave bit" were the slave bit is a driver bit and the master bit can at times be used as general purpose storage For the purposes of the present invention, the term "microdisplays" refers to any of a class of display devices that are sufficiently small to require some form of magnification for human viewing for their intended use in a product.

Figure 7:
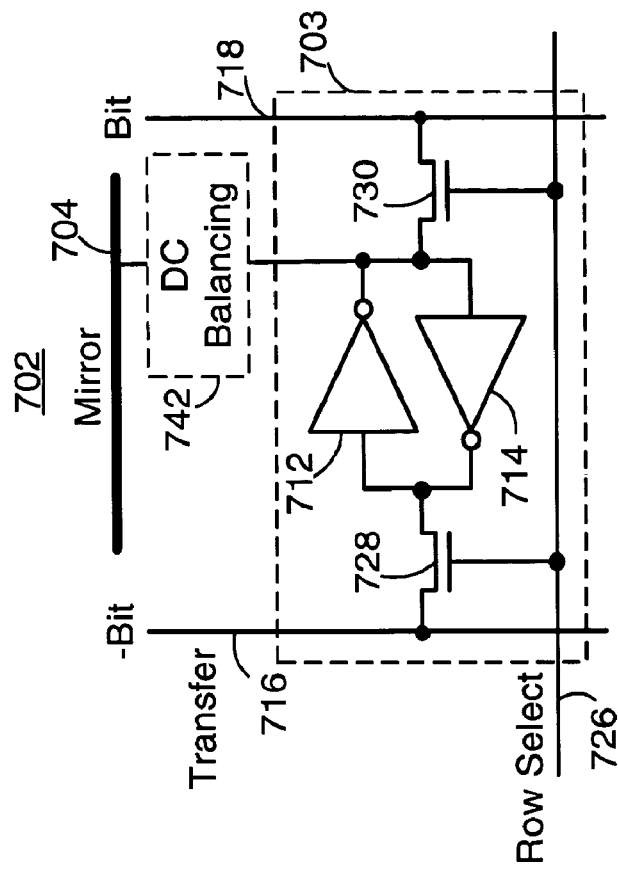
FIG. 7 shows an SRAM bit connected to a mirror.

For the purposes of the present invention, the term "mirror bit cell" refers to a device including a mirror bit and a mirror driven by the mirror bit. A mirror bit cell may include other features such as inverters, bit lines, a row select, a DC balancing block 742, etc. An example of a mirror bit cell according to one embodiment of the present invention is shown in FIG. 7 and is describe below.

For the purposes of the present invention, the term "mirror bit" refers to a drive bit used to drive a mirror. The output control bit of FIG. 2 is an example of a mirror bit of the present invention. Another example of an output control bit of the present invention is the SRAM bit of the mirror bit cell of FIG. 7.

For the purposes of the present invention, the terms "mirror" or "electrode" may each sometimes be used to refer to: a mirror driven by an electrode, an electrode that drives a mirror and/or the combination of a mirror and the electrode that drives the mirror. For example, a phrase such as "controlling a mirror" may also refer to "controlling an electrode that drives a mirror."

For the purposes of the present invention, the term "MRAM bit" refers a storage bit and any drive circuitry associated with the storage bit. For many purposes, the terms "MRAM bit" and "drive bit" may be used interchangeably. When an MRAM bit is used to drive a mirror, the terms "MRAM bit" and "mirror bit" may be used interchangeably.

For the purposes of the present invention, the term "non-circular buffer" refers to any memory accessing method that is not a circular buffer.

For the purposes of the present invention, the term "ordered group of bits" refers to a group bits wherein the position of each bit within the group of bits relates to a numerical value or other weighting such as length of time associated with the bit. The bits of an ordered group of bits may or may not be stored contiguously. For example, an ordered group of bits may have all the bits of one position for a number of elements, such as pixels, stored in one area of memory and other bit positions stored in other areas of memory. A pixel is an example of an ordered group of bits.

For the purposes of the present invention, the term "output bit" refers to a logical storage device that stores the state of a logic circuit. The term output bit also refers to a mirror copy of an output bit, an inversion of an output bit, etc. In the case of a drive output bit or drive bit, the mirror copy of the output bit may be an ordinary bit without the ability to drive an electrode based on the bit. It is anticipated that in some embodiments a mirror copy of the drive bit may be used to compute the next state of a drive output bit using recursive feedback.

For the purposes of the present invention, the term "output pixel value" refers to the numerical value of a pixel after any modifications to the input pixel value to adjust for any system and device responses.

For the purposes of the present invention, the term "packed pixel" or "packed data" refers a way of storing an "ordered group of bits" where in all the bits are store "packed" into a single location in memory. For example, an 8-Bit packed pixel will be stored in a single 8-Bit byte in memory.

For the purposes of the present invention, the term "Panel Interface (PIF)" refers to a device that interfaces between, incoming video data, a DRAM or Double data Rate input DRAM (DDRAM) used for temporary storage or as an external data buffer.

For the purposes of the present invention, the term "panel" display device including a backplane. In the case of LCoS, a panel may be formed from a backplane by forming a sealed chamber on top of the backplane and filling the chamber with a liquid crystal material. The terms "backplane" and "panel" will be used interchangeably to refer to the spatial light modulator.

For the purposes of the present invention, the term "pixel electrode" refers to one or more electrical connections that drive a pixel. For some display devices only a single electrode will be driven, but for other devices it may be necessary to drive two or more electrodes to affect the output, such as driving the true and complement value on two electrodes.

For the purposes of the present invention, the term "pixel value" refers to the numerical value associated with a pixel. When used without a pre-qualifier as "input or output" a pixel value refers to the current value of the pixel.

For the purposes of the present invention, the term "pixel" or "picture element" is a group of bits on which an element of a light modulator is based. Conceptually, a series of pixels flows through a system and are processed in order to drive an element of the display. The term "physical pixel" will be use to refer to the physical/viewable output in an array of light modulating output elements (the "dots" of a display). The output may be a spatial light modifier that affects the way light is reflected as with an LCoS display or a DLP™ display, or may be used to drive a light emitting devices such as an LED. The value of the "pixel" may be modified and the number of bits in the group represented by the pixel may be modified.

For the purposes of the present invention, the term "plane splitting" refers to the process of taking a series of multi-bit pack data (such as a packed pixel) quantities and splitting off the bits of one or more bit position within the series and repacking the split off bits into multi-bit data quantities that only have the bits of one bit position for a the series of data quantities. Plane splitting is a way to take "pack pixel" arrays and convert them into "bit plane organized" arrays. Plane splitting may be done on the whole array or only on some subset of the array. Plane splitting is one of many ways in which incoming pixel data may be reformatted (reorganized) for more efficient data processing or display manipulation.

For the purposes of the present invention, the term "pulse width" refers to the duration or length of a pulse. One example of how pulse widths may be controlled in accordance with one embodiment of the present invention is illustrated in FIG. 4. As can be seen in FIG. 4, the output pulse width for each pixel value is different. For example, the output pulse width for pixel value 2 is twice as great as the output pulse width for pixel value 1, the output pulse width for pixel value 3 is three times as great as the output pulse width for pixel value 1, etc.

A given "pulse width" is the duration in time between a single up and then down transition or a single down and then up transition.

For the purposes of the present invention, the term "Read-Modify-Write" refers to a processes were a memory bit or bits are read, a computation is made based on those bit(s) and then written to the same location. While this is can support more general operations than a masked write, it generally takes longer. The masked write process used in a control method of one embodiment of the present invention provides the same functionality without needing the extra steps of reading and modifying for a set of operations used in some embodiments of the present invention.

For the purposes of the present invention, the term "reallocation" refers to storing a new value in a given memory location based on no longer needing that memory location for a previous value that was stored at that location.

For the purposes of the present invention, the term "row" refers to a memory organized row. A row of bits refers to all bits driven by a single row driver.

For the purposes of the present invention, the term "scrolling sequential color" refers to illuminating a spatial light modulator with color bands of different colors, usually separated by dark bands, that scroll across a spatial light modulator.

For the purposes of the present invention, the term "Set-Reset Flip Flop" refers to the well known in the art storage bit circuit that has a separate "Set" input that forces its output to a logical 1 and a "Reset" input that forces its output to a logical 0. If neither the Set nor Reset signal is active, then the output stays the same as it was originally.

For the purposes of the present invention, the term "Single Instruction Stream Multiple data Stream (SIMD) Processing" describes a class of processing that has taken many forms. The basic concept is that that there is a single source of control instructions (Single Instruction Stream) that issues a common memory addresses and execution operations to multiple sets of data processing logic (Multiple data streams). The advantage of SIMD processing is that a single instruction controller and address generation logic can control many data operations. There are a large number of variations on the basic concept.

For the purposes of the present invention, the term "single pulse" refers not only to a single pulse, but to two or more pulses that are sufficiently close together to behave substantially as a signal pulse.

For the purposes of the present invention, the term "spatial color" refers to a system wherein a color is given by a series of spatially separate colors, generally including at least the 3 primary colors of Red, Green, and Blue. An example of spatial color is the Red, Green, and Blue dots on a CRT television display. Spatial color may also be used with microdisplays by using small color filters over various display elements.

For the purposes of the present invention, the term "spatial light modulator" refers to a one, two or multi-dimensional array of light modulating elements that control or modify incoming or emitted light. For example, a spatial light modulator may change the direction of the incoming or emitted light, the intensity of the incoming or emitted light, the polarity of the incoming or emitted light, the wavelength of the incoming or emitted light, the focus of incoming or emitted light, etc.

For the purposes of the present invention, the term "subset" refers to the conventional meaning of the term subset. For example, a subset of an array of circuits may include all of the circuits of the array of circuits.

For the purposes of the present invention, the term "summary bit" refers to a combination of one or more bit positions for a given pixel. For example, two or more bit positions of a pixel may be OR'ed together to form a summary bit, two or more bit positions may be inverted and then OR'ed together to form a summary bit, two or more bit positions may be AND'ed together to form a summary bit, two or more bit positions may be inverted and then AND'ed together to form a summary bit. A summary bit may also be a unary single bit position or the inverse of a single bit position.

For the purposes of the present invention, the term "time base remapping" refers to using non-binary weighting of the timing control to weight the time of pulse width (s) based on incoming pixel values either instead of or in conjunction with remapping the pixel values from an input pixel value to an output pixel value such as is done with a "gamma table."

For the purposes of the present invention, the term "time base" refers to how the backplane converts an ordered set of bits into the time weighting of a pulse. Using a binary weighted time base where each bit position of an ordered set of bits takes on a binary weighting is one example. The backplane that is the subject of the present invention in some embodiments may be flexibly programmed to handle non-binary weighted time bases, or even have a time base that changes.

For the purposes of the present invention, the term "time base" refers to how an output pixel value translates into the time that an output pixel is turned on or off. Also, that the time base is not necessarily linear such that a linear change in the output value may have a linear or non-linear affect on the time a pixel is outputted. Furthermore, in some embodiments of the invention, more than one time base may be used.

For the purposes of the present invention, the term "variable allocation" refers to assigning use to parts of a single memory space where the use of the memory space is not fixed to a particular purpose by hardware or software.

For the purposes of the present invention, the term "variable number" refers to a number that is not fixed.

For the purposes of the present invention, the term "vertical lines" refers to a vertical display line. In the descriptions below the term vertical lines or VL is to avoid confusion with the memory organization. However, there may or may not be a one for one correspondence with "lines" in a display and rows in one of the memories.

For the purposes of the present invention, the term "computer system" refers to any type of computer system that implements software including an individual computer such as a personal computer, mainframe computer, mini-computer, etc. In addition computer system refers to any type of network of computers, such as a network of computers in a business, the Internet, personal data assistant (PDA), devices such as a cell phone, a television, a videogame console, a compressed audio or video player such as an MP3 player, a DVD player, a microwave oven, etc.

For the purposes of the present invention, the term "deductive counting" and "deductive compares" refers to a control process were the control of a pulse with can used less than all the bits of the value of the pulse due to recursive feedback. The deductive "counting" or "compare" process may not have a physical count/value that is being compared against, but rather the "count/value" a conceptual step in a process.

For the purposes of the present invention, the term "disable" refers to putting an output signal or data into a high impedance state. Generally this is done so that one or more signals can share a common data set of data lines, often a bus structure. Generally only one set of signals will be enabled while all other signals are disabled to the same data line on a data bus.

For the purposes of the present invention, the term "drive bit" refers to a storage bit, often in a two-dimensional memory array, on which the drive of an electrode is based.

For the purposes of the present invention, the term "ERAM" or "Execution RAM" or "execution memory" refers to an array of memory bits that are on the spatial light modulator backplane that are at least in part used to compute the output of the backplane. The bits may also be used for other purposes. The ERAM generally supports normal read and write operations but may be much wider than typical memory arrays to support SIMD processing including bit serial SIMD processing. It is anticipated that in some embodiments, the so called MRAM and ERAM bits may be part of a single memory array structure with a single set of addressing. In other embodiments, the addressing of the MRAM and ERAM may be separate but the bits of each array may be interspersed in the physical lay out of the transistors. In other embodiments some or all the ERAM storage bits may be physically separate from the MRAM bits.

For the purposes of the present invention, the term "floating node" refers to nodes that in the intended use can at some point be totally not driven at all, such as with a bus with multiple drivers that can be put in a high impedance state or nodes where as some point the node driven to neither a high or low state. The circuitry associated with the level shifter with logic functionality (as described below in reference to FIGS. 29, 30, and 31) has functionality where in if these "floating nodes" are solidly driven to ground, the circuitry behaves one way, and if these nodes are allow to "float" they may be driven to up to an intermediate level (a level less than Vcc) by an N-Channel transistor.

For the purposes of the present invention, the term "implicit feedback" and "implicit recursive feedback" refer to operations were the next output value is dependent on the current output value but wherein there is no physical wire or read operation required. An Set-Reset flip flop, for example, supports "implicit feedback" in that if neither the Set or Reset input is active, then the output stays in it same state and thus is based on its previous state if neither Set or Reset is activated in a given state.

For the purposes of the present invention, the term "MRAM" refers to memory array that has in it storage bits that are "drive bits" (see the definition of "drive bits") in it. In some cases the MRAM may have a mixture of "drive bits" and storage bits that are not drive bits.

For the purposes of the present invention, the term "recursive feedback" refers to a process in which the next state of an output is based on a function that includes the prior state of the output. The output may be a mirror copy of an output bit, may be inverted, etc. Also, that there may be additional drive circuitry and even some logical modification of the value between the output and the electrodes that drive the circuitry. In recursive feedback, results from one stage are fed back and combined with new inputs to compute the next value. In the descriptions of the embodiments below, this term is often used to mean feeding the output storage bit or a function of the output storage bit back to combine with new inputs. This function may include a separate bit that is separate from the output storage bit that stores a function of the output storage bit. "Bit recursive feedback" is recursive feedback where the output of a given element is based on a single bit. For the purposes of the present invention, the term "recursive feedback" refers to any process where a new output state is based at least in part on the old output state. The feedback may be physical in terms of a wire or a memory read operation, or it may be "implicit" due to the way the data storage structure and control operates. An example of implicit recursive feedback is shown in FIG. 2.

For the purposes of the present invention, the term "visual display device" or "visual display apparatus" includes any type of visual display device or apparatus such as a CRT monitor, LCD screen, LEDs, a projected display, a printer for printing out an image such as a picture and/or text, etc. A visual display device may be a part of another device such as a computer monitor, television, projector, telephone, laptop computer, watch, microwave oven, electronic organ, automatic teller machine (ATM) etc.

Description

The present invention relates to a method and system for controlling a one or two-dimensional array of electrodes of a digital backplane. In one embodiment of the present invention, the number of electrodes may be many hundreds of thousands into the millions integrated on a semiconductor substrate. Due to the large number of electrodes in such an embodiment, the cost of generating the control of each electrode becomes significant and would generally discourage persons of ordinary skill in the art from pursuing such a method or system.

In one embodiment of the present invention, the electrode may be a mirror that both reflects light and creates an electric field that causes liquid crystal to modify the polarization of polarized light. Using a semiconductor CMOS substrate, such as silicon, GaAs, etc. to control the Liquid Crystal in this way is known as Liquid Crystal on Silicon or LCoS. In other embodiments, this electric field may be used to control a micro-mirror as in the case of a Texas Instrument's DLP™ device.

In one embodiment of the present invention, the electrode may be controlled in a digital on or off manner as compared to being controlled by an analog level. DLP™ stands for Digital Light Processing and as the name implies, the control of the light is "digital" and is controlled by a series of on or off pulses. It should be understood that other forms of display devices including those that emit light controlled by a semiconductor substrate may also use the techniques of the present invention. One such example would be Organic Light Emitting Diodes (OLED) devices where small LEDs would be controlled by the electrode.

Prior digital Microdisplays takes some combination of the pixel value and a Count to determine the new value of the electrode without regards to the current state of the output storage bit. This type of processing is a "feed forward" function. However prior to the present invention no one has provided a way have the next state of the output be in some way dependent on the current state of the output.

In one embodiment of the present invention, recursive feedback is used to significantly save memory on a digital backplane, the bandwidth to the backplane and inside the backplane, and processing hardware when generating pulse width modulated signals on the display electrodes.

The general concept of digital LCoS devices has been known for well over 10 years. U.S. Pat. No. 5,959,598 to McKnight, gives an example of many of the basic digital LCoS concepts and the entire contents and disclosure of this patent is hereby incorporated by reference. U.S. Pat. No. 6,650,138 to Zuravleff shows another variation of this "master slave" mirror drive arrangement and the entire contents and disclosure of this patent is hereby incorporated by reference. Both of the above patents describe using a feed forward drive method. Both show a two storage bit structure in which one of the storage bits is directly shifted to the next bit for display and thus the two bits of storage are inexorably linked together and connected to a specific output.

It is one object of the present invention to use recursive feedback to lower the bandwidth compared to this method. Furthermore in one embodiment of the present invention, rather than using a 2-Bit shift register function, all the storage will be in RAM like bit arrays so that no two bits of storage are directly linked together.

U.S. Patent Application Document No. 2003/0160803 to Willis), the entire contents and disclosure of which is hereby incorporated by reference, shows a spatial light modulator microdisplay which uses a "feed forward" design. In this application, an N-bit pixel value is compared to a N-bit counter and the result of that comparison is used to drive a display mirror of an LCoS device. They show an N-bit wide comparison occurring $2^N$ times in order to control the bit with each comparison requiring all N-bits. They show needing at least N-bits of memory storage on the display device to affect the PWM control. This means that N-bits must some how be sent/connect to an N-bit wide comparator $2^N$ times in order to control the PWM waveform.

It will be a further object of the present invention to avoid requiring a multi-bit wide comparison to control an output. It will be a further object of the present invention to use fewer than N-Bits on one or more of the comparisons to reduce the need to fetch data. It will further be an object of the present invention to use significantly fewer than $2^N$ comparisons to determine a PWM waveform with $2^N$ different widths.

U.S. Pat. No. 6,326,980 to Worley, the entire contents and disclosure of which is hereby incorporated by reference, shows another LCoS spatial light modulator with a feed forward operation. In this case, they creates a series of "equally weighted" and "binary weighted" pulses. Consistent with a feed forward drive, these pulses directly determine the value on the light modulating electrode. Also, while the equally weighted pulses are used to form a single pulse, the binary weighted pulses can cause one or more additional pulses. In other words, this method will not generate a single pulse for all N-bits if it is employed.

It is a further object of the present invention to provide pulse drive method be capable of generating a single pulse or a constant number of pulses. U.S. Pat. No. 6,326,980 does show in FIGS. 15 and 18 a process for reading only some of the bits of an external frame buffer and logically combining them, but then they are combined in what is described as a parallel rather than bit, serial operation. However, the combination is done outside the display device itself in an external controller rather than in the display device itself. Due the process being a feed forward one, more bits have to be read and logically combined than would be required by the recursive feedback methods of this new invention.

PCT Patent Application No. WO0079510A1 to Guttag, the entire contents and disclosure of which is hereby incorporated by reference, shows a spatial light modulator on a semiconductor substrate. PCT Patent Application No. WO0079510A1 shows in FIG. 10 a display bit formed of 2 latches where the data of the first latch may be shifted to the second latch. The application discusses reading from the memory array, operating on the bits and writing back to the memory. The only operation described is for the inversion of the value in the memory for the purpose of DC Balancing the LC material. While the bit one set may be inverted by this process, there is no description of how to control the width of the drive pulse on the bit. So while this operation involves the reading of the output state, this operation does not use other data to combine with the output bit. More specifically, PCT Patent Application No. WO0079510A1 does not show how to control width of the output pulse by combining the current state of the output bit with other data.

It is an object of the present invention to provide a recursive process that may generate a pulse width and not just invert a bit. It is a further object of the present invention to show how to recursively use the current display bit to generate a pulse width that uses the current state of the output bit without having to first physically read the state of the output bit.

U.S. Application Document No. 2003/0103046 to Rogers describe another example of a "feed forward" drive method and the entire contents and disclosure of this application is hereby incorporated by reference. Similarly to U.S. Pat. No. 6,326,980, the present invention may use a set of equally weighted pulses for the most significant bits, but instead of a series of binary weighted pulses as in U.S. Pat. No. 6,326,980, it breaks the image into regions that feed a series of shared counters. It will be noted that the control from these counters is also a "feed forward" process and that the counts are done in parallel (multiple bits) and not bit serially as will be done in one embodiment of the present invention. A further object of the present invention will be to generate a single pulse drive method that does not require the generation of "equal" or "fixed" time pulses. Another object of the present invention will be to significantly save processing hardware, memory storage, and memory bandwidth over prior digital backplane control methods by using recursive feedback.

U.S. Application Document No. 2003/0103046, the entire contents and disclosure of which is hereby incorporated by reference, also appears to break the display into large block regions that act with different timing which would to those skilled in the art be a potential source of display uniformity problems and other artifacts.

U.S. Application Document No. 2003/0210257 to Hudson, the entire contents and disclosure of which is hereby incorporated by reference, shows yet another feed forward way to digitally drive an LCoS display device. Even with the complexities of this scheme, it does not appear to support a single pulse width.

In one embodiment, the electrode may be controlled in a digital on or off manner as compared being controlled by an analog voltage level. In one embodiment, the electric field may be used to digitally control a micro-mirror, similar to the way that an electric field is used to control a micro-mirror in Texas Instrument's DLP™ device. DLP™ stands for Digital Light Processing and as the name implies, the control of the light is "digital" and is controlled by a series of on or off pulses. It should be understood that the present invention may be used with other forms of display devices including those that emit light controlled by a semiconductor substrate. For example, the present invention may be used with Organic Light Emitting Diodes (OLED) devices where small LEDs are controlled by the electrode.

Current digital microdisplays use some combination of the pixel value and a count to determine the new value of the electrode without regards to the current state of the output storage bit. This type of processing is a "feed forward" function. In contrast, the present invention employs recursive feedback i.e. the current state of the output is used to generate the next state of the output.

In one embodiment, recursive feedback is used to significantly save memory on a digital backplane, the bandwidth to the backplane and inside the backplane, and processing hardware when generating pulse width modulated signals on display electrodes.

Furthermore in one embodiment of the present invention, rather than using a 2-Bit shift register function, all the storage will be in RAM like bit arrays so that no two bits of storage are directly linked together.

The present invention provides the ability of controlling large arrays of electrodes in general and specifically of controlling large arrays of display elements that modulate light. The light modulation may be caused by changing the way the image elements transmit or reflect light or it may be by controlling light emitting elements such as Light Emitting Diodes (LEDs) or the like. The methods for driving the electrodes and the ways these concepts may be extended to driving large arrays of electrodes described below.

For digital microdisplay devices the output is generally held in a latch or storage bit. This control bit in turn is used to control the output. In the case of one embodiment of the present invention, the output is a charge on a mirror that controls Liquid Crystal material. It should be understood by one skilled in the art that there may be additional logic between the output storage bit and the mirror, in the case of LCoS, this additional logic may be used to invert the bit as part of a well known need of LC material to be "DC balanced." It should also be understood that the drive output bit take various forms, including a static RAM bit, a Dynamic RAM bit, or may have more than one bit in a master/slave configuration as shown in U.S. Pat. No. 6,326,980 to Worley, the entire contents and disclosure of which is hereby incorporated by reference.

In prior method of controlling outputs for microdisplay devices the value of the output is determined by some combination of the pixel value with counters and timing control. The result of this combination is use to generate the next output without regard to the current output.

In one embodiment of the present invention, a pixel value is combined with counters and/or timing control to generate one or more intermediate values. These intermediate value(s) in and of themselves are not sufficient to generate the next output value. This intermediate result is then combined with the current drive output bit to create the next output value.

As described below, the recursive feedback method of the present invention may be used to significantly reduce the data rate and/or the amount of logic and/or the amount of memory necessary to affect the control of an array of outputs (in one embodiment of the present invention, on a display device). The fundamental reason for the significant savings is due to the current drive output bit having accumulated information in it that may be used instead of needing more bits from the original pixel value.

U.S. Patent Application Document No. 2003/0160803, the entire contents and disclosure of which is hereby incorporated by reference, describes as single pulse method using a single count. Basically the pulse started at time=0 and the pulse ended when the count reaches the pixel value. U.S. Pat. No. 6,326,980 to Worley, the entire contents and disclosure of which is hereby incorporated by reference, describes breaking the control of a pulse into a series of equally weighted pulses that are used to form a single output pulse representing the most significant bits using and a series of binary weighted pulses for the least significant bits of the pulse value using a feed forward drive method. U.S. Patent Application Document No. 2003/0103046, the entire contents and disclosure of which is hereby incorporated by reference, describes using the equal pulse method of the Worley patent and then uses a counter or compare method control the LS bits in order to form a single pulse.

A disadvantage of a single count with a feed forward compare method is that it requires $2^N$ counts/compares of N-bits each or $2^N$ times N ($N\times2^N$) total bits to be compared. The methods described in the Worley patent and in U.S. Patent Application Document No. 2003/0103046 both require equal pulse generation. It will be understood by those skilled in the art, that generating these equal pulses requires higher bandwidth than using encoded data and this why the equal pulse concept may not be used for the least significant bits as the bandwidth would be too high. If there are M-bits that have an "equal pulse" there are $2^M$ equally weighted pulses that have to be generated.

It will also be noted that in the methods described in the Worley patent and in U.S. Patent Application Document No. 2003/0103046 that the equally weighted pulses of the MS-bits are shown preceding the control of the LS-bits of the pulse(s) and in these methods the order of MS versus LS operation would probably have little if any advantage. In contrast, embodiments of the present invention, described below may provide a cost advantage in processing the LS bits first.

FIG. 1 illustrates a prior feed forward control process 102. In step 104 pixel data 212 and counters and/or timing control input 214 are used to produce an intermediate value 116 by employing arithmetic and/or logic functions and/or storage. In step 122 an output control bit uses next output value 116 to drive a mirror 132.

FIG. 2 illustrates a recursive feedback control process 202 in accordance with one embodiment of the present invention. In step 204 partial pixel data 212 and counters and/or timing control input 214 are used to produce one or more intermediate values 216 by employing arithmetic and/or logic functions and/or storage. In step 222 one or more intermediate values 216 are combined with a current value 224 to produce a next output value 226. In step 234 an output control bit uses next output value 226 to drive a mirror 242 and current value 224 is given the value of next output value 226.

By comparing the processes in FIGS. 1 and 2, it is possible to see important differences in the way a feed forward process (FIG. 1) and the way a recursive feedback process (FIG. 2) control an output.

With the recursive approach of the present invention, the current state of an output is used to reduce the number of pixel value bits that will be needed. For example, the table of FIG. 3 outlines a recursive feedback method of one of the embodiments of the present invention. The counts from 0 to 7 are shown along with their binary representations 000 to 111 with the right most bit value being bit 0 and the leftmost bit being bit 2.

FIG. 4 shows a simplified timing diagram for the control method shown in the table of FIG. 3. Shown in the diagram of FIG. 4 are a pair of waveforms for the control and resulting output for each of the 8 possible (0 to 7) pixel values. The pixel control is generated based on a given count shown on the X axis of the diagram. The logic that generates the control is shared to generate the control for many pixels and so the output value only has to be as long as necessary to affect the control and this is indicated by the pulsing of the comparisons in the control waveform. In a real world system there is also be some delay between the generation of the control information and the effect the control information will have on the output and this is indicated by the slight delay between a control signal and the effect on the output.

The bottom pair of waveforms in FIG. 4 shows the control and output for the control method assuming the pixel value is 0 (binary 000). Following through the table of FIG. 3, at count zero since all 3 bits are 0, the output will not be turned on. On count 1 hardware will test for if bits 2 and 1 are zero and since both are 0, hardware will generate a control pulse that will cause the output to be driven off. But note that since the output is already zero, this additional setting of the output to zero has no affect on the output (the output remains zero). These "redundant" off pulses will happen for counts 2 though 7 as well. These redundant pulses are "don't cares" because these pulses have the same effect whether the pulses happen or not. The advantage of allowing "don't cares" pulses is that fewer bits have to be accessed to form the control.

In FIG. 4, the next pair of waveforms above those for the pair for the 0 value shows the control for the pixel value of 1 (binary 001). On count 0, one of the bits, bit 0, will be a 1 so the table indicates to turn on the output. So the output goes up/on after count 0. At count 1, both bits 2 and 1 are 0 so a pulse is generated that will cause the output to turn off. It will also be seen that on count 2, which looks at bits 2 and 0, since bit 0 is a one, the test will fail and no pulse will be generated. The output will stay in its current state. Then on count 3, on bit 2 is tested and since for the binary pixel value 001, it is zero, a pulse is generated. But since the only affect of this pulse would be to turn off an output that is already off, it has no net effect. Following through the table FIG. 3, at count 5, which reads only bit 1, which is zero for a pixel value of 1 (binary 001), another redundant pulse is generated which has no effect on the output.

Referring to the table of FIG. 3, it may be observed that bit 2 is not looked/used in counts 4 to 7. Thus if storage is at a premium, it is no longer necessary to keep this bit available after the comparison for count 3 is made or about 1⁄2 the time. Similarly bit 1 is last looked at in the caparison for Count 5 and is not used in counts 6 and 7, and bit 0 is last looked at in count 6. In one embodiment of the present invention, memory used to store bits is continually reallocated to minimize the total storage requirement.

Looking at the rest of the timing diagram of FIG. 4, it will be seen that there are redundant pulses generated only after the output is already zero. An advantage of allowing these redundant pulses is that fewer pixel input bits are required to decide on the generation of at a given time and it this in turn will result in the need for less storage on the display device.

The previous discussion has describe a method of the present invention in terms of a series of "counts", but in practice there may never a physical comparison to a counter as done for Example in Patent Application Document No. 2003/0160803 (application Ser. No. 10/086,010), the entire contents and disclosure of which is hereby incorporated by reference. Various bits are looked at a given point in time, but they are not compared to a counter but which bits are looked at are based on a sequence of operations. In more advanced embodiments of the invention, the "count" becomes more of an abstraction rather than a physical value.

For the cases for the table in FIG. 3, the bits that are looked at a given count, correspond to the zeroes in the count. For example for count 2 (binary 010), bits 2 and 0 are looked at. Since it steps through all the counts from 0 to 7, over the 8 counts, the number of 0's will be exactly half the total number of bits. Also, while the method of the present invention is used to control a pulse of any width, the only logical operation needed is a logical OR or a logical NAND (Inversion of an logical AND which is equivalent to a Inversions of all inputs followed by a logical OR). There is no need for a arithmetic comparison as in Patent Application 2003/0160803, nor even an equal compare that would require a series of XORs of each bit to a count followed by an OR. This simplicity of the operations required to perform this test will be advantageous due to the very large number of pulses that will be controlled for a high resolution display.

It will be obvious to those skilled in the art that the process described may be extended to any number of bits of pixel size values and corresponding series of pulse widths. On average, only half the bits need to be looked at for any given count, so that, for example, an 8-Bit pixel value size, on average only 4 bits will be looked at to determine the intermediate value as is shown in FIG. 2. This intermediate value will then be combined with the current value to control the pulse width Looking at the table in FIG. 3, it will be seen that the process skips around from bit location to bit location. For example on count 0 it needs all 3 bits. On count 1 it needs bits 2 and 1. On count 2 it needs bits 2 and 0. In one embodiment of the present invention, the bits are be stored in a large array of bits and fetching bits that are not needed will end up wasting bandwidth which in turn would mean higher clock rates.

To avoid wasting bandwidth, a technique known as bit serial processing may be employed. Bit serial processing stores each bit of precision at a different memory address. To control the massive number of outputs using bit serial processing a technique known as Single Instruction, Multiple Data Stream (SIMD) processing maybe employed one embodiment of the present invention.

In some embodiments of the present invention, a recursive feedback process is used in which an array of outputs that are stored, the "current outputs" are used in determining the next state of the outputs, the "next outputs." In some embodiments of the present invention, a very large number of outputs are controlled so it is important in such an embodiment to have an efficient means of storage while supporting the recursive feedback.

Figure 5:
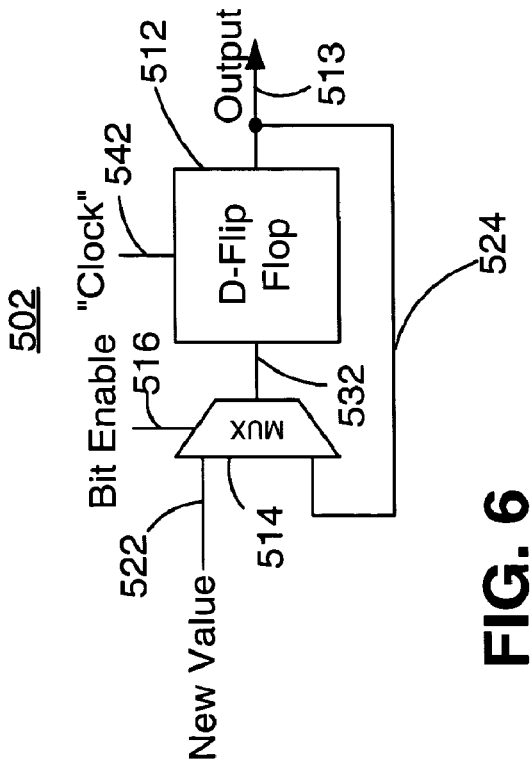
FIG. 5 is a diagram in simplified form illustrating a circuit employing explicit recursive feedback.

There are many possible ways to implement recursive digital feedback in accordance with an embodiment of the present invention. FIG. 5 illustrates a circuit 502 using explicit recursive feedback in which a Clocked "D" (delay) flip flop 512 output 513 feeds back through a multiplexer 514. An enable bit 516 controls multiplexer 514 to choose between a new input value 522 or an old output from D-flip flop 512, indicated by data line 524, to D-flip flop 512. Enable bit 516 may be, for example, an "intermediate value" shown in FIG. 2. Multiplexer 514 selects the old output if enable bit 516 is 0 and new input value 522 if enable bit 516 is 1. Connection 532 indicates an output 532 of multiplexer 514 that become an input of D-flip-Flop 512. A clock pulse 542 causes the input of D-flip flop 512 to become a new output 513 of Flip-Flop 512 as is well known in the art. A feedback signal, indicated by data line 524, of new output 105 is input back in to multiplexer 514 as an old D-flip flop output 513. Feedback signal 524 corresponds to explicit feedback for the circuit 502.

The D-flip flop and the multiplexer used in the embodiment of FIG. 5 may be any suitable D-flip flop or multiplexer. In one embodiment, the new value of FIG. 5 may be one a control signal, such as one of the control signals shown in FIG. 2. Also the enable bit in of FIG. 5 may be the result of some logical and arithmetic operation on some part of the pixel data and timing and control signals shown such as the "intermediate value(s)" shown in FIG. 2 and described above. For spatial light modulator there will be an array of outputs. Thus, some embodiments of the present invention will support processing many bits of output. In particular in some embodiments a large number of output bits may be processed in parallel.

Figure 6:
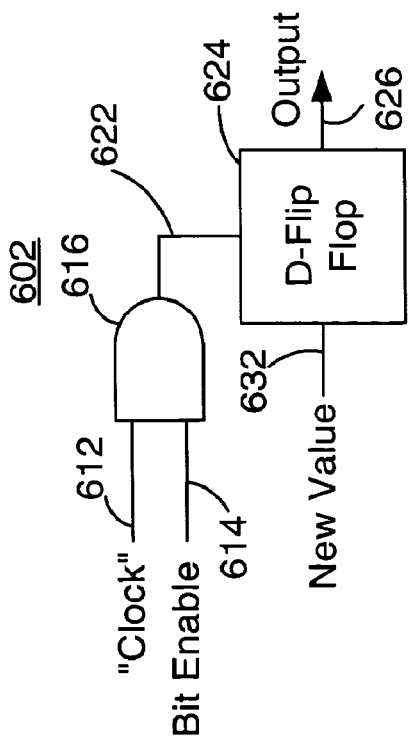
FIG. 6 is a diagram in simplified form illustrating a circuit that is functionally equivalent of the circuit in FIG. 5 for many purposes that employs implicit recursive feedback.

It will be understood by those skilled in the art, that the clock signal of FIG. 5 does not need to be a continuous clock, but may be a clock that is enabled or gated. FIG. 6 illustrates a circuit 602 employing implicit feedback that is functionally equivalent to the circuit of FIG. 5 for most purposes, but that is implemented differently. A clock pulse 612 and enable bit 614 go to an AND gate 614 to generate a clock input, indicated by connection 622, to a D-flip flop 624. The arrangement of circuit 602 has the effect of preventing D-flip flop 624 from changing if enable bit 614 is zero. Thus output 626 of D-flip flop will either be a new value 632 if enable bit 614 is a 1 or will stay the old value if enable bit 614 is a zero. Another way of viewing the circuit 602 is that clock 612 is as an unconditional write enable to the D-flip flop 624 and bit Enable 614 acts as a "bit mask" to enable or mask off the writing.

Thus the logic of FIG. 6 performs the same function as the logic of FIG. 5. In the logic of FIG. 5, the recursive feedback is explicit with the output feeding back as a feedback signal to the multiplexer logic. In contrast, in the logic illustrated in FIG. 6 the feedback is implicit. While the implicit feedback is less general, it may be significantly more cost effective for many applications.

In prior circuits that employ feed forward methods, the main determination is what to write (a one or zero), whereas with implicit recursive feedback method, such as employed in embodiments of the present invention, a determination is made whether to write with the data/value that is written being pre-determined before any comparison or other computation.

While the concepts of the present invention may be implemented with Clock D-flip flops, others forms of storage are often much more cost effective for the large amounts of storage that may be required for a spatial light modulator, currently many thousands to millions of outputs. Thus in one embodiment of the present invention, a more cost effective method using an arrayed structure of Static RAM (SRAM) bits is employed. However, it will be understood that types of memory other than Static RAM may be used to implement embodiments of the present invention. Also, although a SRAM has a variety of capabilities, some embodiments of the present invention takes advantage of a relatively little used capability of SRAM, namely to use "masked write" drive circuitry external to the array of bits that makes the each of bits behave like Set-Reset flip flops or the Circuit of FIG. 6.

FIG. 7 shows a mirror bit cell 702 which has a common 6 Transistor (6-T) SRAM bit 703 connected to a mirror 704 controlled by electrodes (not shown). SRAM bit 703 may also be referred to as a drive output bit since SRAM bit 703 is connected to circuitry that drives a mirror. SRAM bit 703 uses cross-coupled inverters 712 and 714 to store the bit value. The write process of SRAM bit generally begins with bit lines 714 and 716 both precharged. To write a value into SRAM bit 703, one of either bit line 716 (–bit) or 718 (bit) is first pulled down by drive circuits (not shown) outside the array of SRAM bits (not shown). Then a row select 726 is turned on allowing bit lines 716 and 718 to drive into SRAM bit 703 through transfer gates 728 and 730 and thus writing to SRAM bit 703. Mirror bit cell 702 may optionally include a DC balancing block 742 indicated by ghost lines.

In an SRAM bit such as the SRAM bit shown in FIG. 7, on read operations, both bit lines are typically precharged before attempting to read or write to the bit. The electrical design of the SRAM bit, including inverters and transfer gates, is such that the SRAM bit will not change state if both bit lines are precharged, and whichever inverter in the SRAM bit is outputting a zero will pull down the bit line connected to that inverter through the transfer gates. Generally, circuitry external to the array will sense which bit line is being pulled down or the different in the bit lines when doing a "read" operation.

Also, there may be other logic or transistors in an implementation between the drive output bit and a mirror or the electrodes that control a mirror. For example, there may be logic that selectively inverts the value that drives the mirror to support the DC balancing requirement of LC material as indicated by the DC balancing block in FIG. 7.

FIG. 8 shows a logical representation of a simplified 2 row by 2 column SRAM 802 including drive circuitry that is generally external to the array of bits. Four SRAM bits 804 are shown organized in 2 rows and 2 columns. Precharge transistors 812 pull up all the bit lines (–Bit) 814 and bit lines (Bit) 816. On write operations, the data on the common data-in/data-out line 820 is sent to a three state buffer (One, Zero, or float) 824 and to three state buffer 826 through an inverter 828 of a read/write circuit 830 indicated by a dashed rectangle. A single write enable (WE) signal 832 turns on three-state buffers 826 and 824 of all the selected columns (column decoding is not shown in this simple example) causing the binary value on data line 820 to be driven on bit lines 814 and 816 due to inverter 828. On write operations, the read signal of off has the effect of disabling/tri-stating read output buffer 834. A single row select line (n) such as 836 or 838 in this simple example will be turned on via row Decoding and drive Circuitry (not shown) and one of the bit lines 814 or 816 for each bits connected to that row select line will be driven low by drives 826 or 824 for each column which in turn will cause the selected bits to be written based on the bit lines. During write operations, read output buffer 834 is tri-stated (floated) so that data may be driven in on data line 820.

On read operations, the bits are precharged via the precharge transistors 812, the write enable is off thus tri-stating the write buffers 826 and 824, and one row select is on. All bits on a row will pull down one of the two bit lines for each column based on the state of a bit that is selected by the row select for that column. The "sense amplifier" 844 detects which of the two bit lines in each column is being driven lower by the row selected bit in that column and the output of sense amp 844 is connected to the input of the data out buffer 834 which on read operations with read Enable (RE) 846 turned on, will drive out on the common data-in/data-out line 820. Commonly, one of the sense amplifiers may amplify the difference between the corresponding bit and –bit and will output a strong binary level. The three level buffers will then be enabled by the read enable to drive the data out on the data lines.

FIG. 8 is a simplified example both in terms of the number of bits and the circuitry shown. For example, only the SRAM bit is shown, but other devices or circuits such as a logic, an electrode, a mirror, etc. may be connected to the storage bit as shown in FIG. 7. Also it will be understood by those skilled in the art that there are many ways to implement a RAM array and the associated buffering. Also a "column decoder" is well known to those skilled in the art is not shown for simplicity and may be used in a RAM array.

FIG. 9 shows a small 2 row by 2 column array 902 that demonstrates a simplified write mask SRAM design that supports a masked write of an embodiment of the present invention. Four SRAM bits 904 are shown organized in 2 rows and 2 columns. A masked write driver 906 is shown by a dashed rectangle. Precharge transistors 912 pull up all the bit lines (–Bit) 914 and bit lines (Bit) 916 for all the column that may be written. A data line 922 and its logical inverse –Data line 924 broadcasts a value to some or all of the columns of array 902. Taken together, Data 922 and –Data 924 resent a single M-Data value 926. Array 902 also includes a single write enable (WE) signal 932, a row select line (n) 936, a row select line (n+1) 938, a per bit write enable 942, and a preset signal 943 (Pre).

In masked write SRAM 902, what would be the data in for a normal SRAM becomes a series of bit write enables 942 when taken together form a "bit mask" that enables a write operation on a bit by bit basis. Write enable 932 is still broadcast to control the timing of the possible write, but unless per bit write enable 942 is also on, then the M-data 926 represented on Data line 922 and –Data line 924 will not be able to pull down either bit line 914 nor 916 through transistors 944 and 948 in the case of bit lie 914 nor transistors 926 and 950 in the case of bit line 916. If per bit write enable 942 is off, then transistors 944 and 954 will both be off so that even though write enable 932 is on thus turning on transistors 948 and 948 the neither of bit lines 914 and 916 will pull down. Since neither bit 914 or 916 line pulls down, a given SRAM bit 904 "sees" what looks like a read cycle. This is referred to as a "dummy read" since bits lines 914 and 916 may be driven as in a read cycle of FIG. 8, but there is no output.

Bit WE, write enable 942, for each column turns an "unconditional" write of each column into a "conditional" write per column. Also the "true" data signal 922 may be viewed as a "Set" signal and the "false"–Data signal 924 may be viewed as a "Reset" signal that is enabled by bit WE (or enable bit) 942. The circuitry of FIG. 8 may also be viewed as extending the concepts of FIG. 6 for a single bit, in an efficient manner for controlling an array of bits.

As shown FIG. 9, while the output in the flow diagram of FIG. 9 shows the output bit going out of the output bit, into a "combine" block, and back into the output bit, some bit storage array structures, such as many RAM structures can support this "combining operation" without needing explicit combining hardware by what is known as a "masked write" operation. Additional functions such as those for DC Balancing are not shown in FIG. 9 but may be employed in embodiments of the present invention.

It will be understood by those skilled in the art that there are many different ways to buffer and drive the data signals of the Data line and –Data line. For example a single data signal may be driven with and the inversion would be generated locally within each drive bit. For generality and simplicity in other figures only a single M-Data Line is shown, but it should be understood that many embodiments may be implemented with a pair of lines as shown in FIG. 9.

Logic and operation of bit lines in FIG. 9 are the same as for a normal SRAM, such as the more normal SRAM shown in FIG. 8. One difference between the write mask SRAM of FIG. 9 and a normal SRAM of FIG. 8 is the difference is how the bit lines are driven. In FIG. 8, only the logic for the SRAM bits is shown, but other logic, electrodes and mirrors may be added to bit to form a display element.

It will be noted that there is no sense amp or other mechanism to read shown in FIG. 9. For the functional operation of one embodiment of the present invention, that of driving an electrode that controls a display element, there is no need to physically read the bit. The recursive feedback, comes from the way the masked write operation is performed and is in this case "implicit feedback," as was discussed with respect to FIG. 5 and FIG. 6 above. It will be understood by those skilled in the art, that logic may be added to support a read operation if it is required, for example, for testing reasons or for added functionality. It will also be understood by those skilled in the art that while a column decoder is not shown, but may be added.

Also, the logic shown in FIG. 9 is only one of many ways to implement a masked write driver and is only one example.

It will also be understood by those skilled in the art that a per bit or multiple bit "masked write" function may be supported by RAMs using other than the 6-T RAM bit of this example. An important difference with respect to a normal RAM is that a single data value is broadcast to at least some of the columns, and whether a write is performed is controlled on those columns a column by column basis, whereas in a normal RAM the write enable is broadcast and the data varies by column.

The logic shown in FIG. 9 is only one of many ways to perform a masked write. The effect of a masked write may be performed in many different ways as is known to those skilled in the art. An important part of a masked write is to be able to inhibit the writing to memory based on what is in effect data, the per bit write enables. FIG. 9 shows how by changing only the column drive circuitry, that the same storage element, a RAM bit, may be used. It will be understood by those skilled in the art, that the exact design of the storage element may be different than that of the 6-T SRAM illustrated and/or the drive circuitry shown in FIG. 9.

While a masked write is not required for the recursive feedback concept of the present invention, a masked write has the advantage of not requiring the extra step of reading the output bit in order to be effectively combined with other data. In other embodiments, the bit may be read first to explicitly perform the recursive feedback.

It will be understood that the SRAM array shown in FIG. 9 is only a simple example for illustrative purposes only. The actually array for a display may have 1000 or more rows and 1000 or more columns of bits. It should also be understood that RAM types other than those using SRAM bits may be used.

A major advantage of a masked write type RAM is that a masked write type RAM may economically support some forms of recursive feedback type methods without requiring the storage bit to be first read. Also, the storage bit itself need be no different than that of typical RAM and since for a large RAM array, the size of the bits themselves dominates the area, a masked write RAM may be built in about the same area as a conventional SRAM. Similarly masked write type drive methods may be supported on RAMs with memory bits other than SRAM bits.

While not all recursive feedback algorithms may use the write mask type SRAM shown in FIG. 9, some embodiments may use methods that can take advantage of it. In particular the recursive feedback and deductive compare methods shown in FIGS. 3 and 4 can take advantage of the masked RAM. The masked write bit Enables of FIG. 9 may be driven by the control signals shown in FIG. 4, where there are a set of control signals for a series of drive bits that are going to be conditionally modified in a single operation to a RAM supporting masked writes.

An example of one way to implement a feed forward method for an array of drive output is described in Application Document No. 2003/0160803, the entire contents and disclosure of which is hereby incorporated by reference. Assuming one again the very simple 3 bit controlled pulse of FIG. 3 using the methods taught by U.S. Patent Application Document No. 2003/0160803 to Willis, the pulse width would be formed by comparing the 3-Bit pixel value to a 3-Bit counter. For each count, all 3 bits of the pixel value are compared to all 3 bits of a counter. If the count is, for example, greater than the pixel value, then the output (mirror) is turned off. If we assume that the 3 bits of pixel value are stored in a memory or register file some place, then if the 3-Bits are read for each of the 8 counts, a total of 3×8=24 bits must be read and 8 unconditional writes are performed per pulse per drive bit. But using the Deductive Compare method of FIG. 3 combined with a masked write memory taught by some embodiments of the present invention, only 3×4=12 bits need to be read per drive output to control them.

In some embodiments of the present invention, a "dual count" method is employed where the pixel value will be processed in terms of MS-bits and LS-bit but were there is no need to generate "equally weighted pulses" as are required in prior art references mentioned earlier (U.S. Pat. No. 6,326,980 and U.S. Application Document No. 2003/0103046). In one embodiment of the present invention, both the MS and LS control will be part of a single process without needing separate and distinct hardware for MS and LS control. Furthermore in one embodiment of the present invention the split of what are considered within a pixel value to be MS and LS bits may be changed without significantly altering the hardware.

A basic concept of the dual count method of one embodiment of the present invention is to break the single count for a single N-bit count/compares as in reference '803, into two counts/compares of less than N-bits. Each of these sets of counts will form an LS Part and an MS Part of the whole count. The LS part will be associated with some set of least significant bits and the MS Part will have the remaining bits. The first stage, in some embodiments the LS Part will act as a "delay until start." The second stage, in some embodiments the MS Part, will be a "continue until" value. As is well known, an N-bit number can have $2^N$ values. By splitting a single N-bit Count into a "count" of A-bits and (N−A)-bits, the total number of "counts" to perform is then $2^A$ plus $2^{N-A}$. For any values of A and N were A<N, $(2^A+2^{N-A})<2^N$. Furthermore it should be understood that there are only A bits to compare for each of $2^A$ steps plus A−N bits to compare for each of $2^{N-A}$ stages. By controlling the start of a pulse with A-bits and controlling the end of a pulse with N−A bits, the pulse can have $2^N$ different widths, but there are less count stages required and there will be many less bits that need to be compared against.

So where for a single count method such as the method described in U.S. Patent Application Document No. 2003/0160803 there are $N \times 2^N$ bits to be compared, the method of the dual count method of the present invention requires $A \times 2^A + (N-A) \times 2^{N-A}$. So for example if N=8 and A=5 then for a single count method there are 8×28=2048 bits to be compared, there are $3 \times 2^3 + 5 \times 2^5 = 184$ bits to be compared in the dual count method of the present invention, which is a significant drop (about 11 times) in the bit comparisons that have to be done.

Furthermore, in one embodiment of the present invention, the deductive pulse width control described with respect to FIG. 3 above may be combined with this dual pulse control method to cut the number of bit compares that have to be done in half again so that only 92 bit comparisons have to be done (or about 22× less than a single pulse method) to control a pulse with N=8 and A=3. Dropping the number of bit comparisons required will greatly lower the some combination of the processing speed and processing hardware required. A minima in the number of operations occurs when A is ½ of N (if N is even or the nearest integer up or down if N is odd) so that if N=8 and A=4, the number of bit compares required would be $½(4 \times 2^4 + 4 \times 2^4) = 64$ bit compares.

Another advantage of the dual compare algorithm used in the present invention is that the algorithm can free up memory used to store the least significant bits, this may be particularly important if the storage is on the display device. The LS-Stage is counting at nominally the LS-counting rate. If the LS-stage is done first, the need for these bits may be completed rather quickly and the memory required for them may be used for other data. Consider the example of the 4/4 split of an 8-Bit pulse width. If the entire pulse width time is "W" then the LS-Bits will be completed in about W/16. Thus for $^{15}/_{16}$th of the time (assuming simple binary pulse weighting) the bits are not needed.

As described in FIG. 3 above, the MS and LS bits may also be freed up over time using the deductive counting method since at some time though the algorithm, some bits are never looked at again. The combination of Dual Compare and Deductive compare algorithms may allow the digital be used to significantly reduce the on-display storage requirement.

Figure 10:
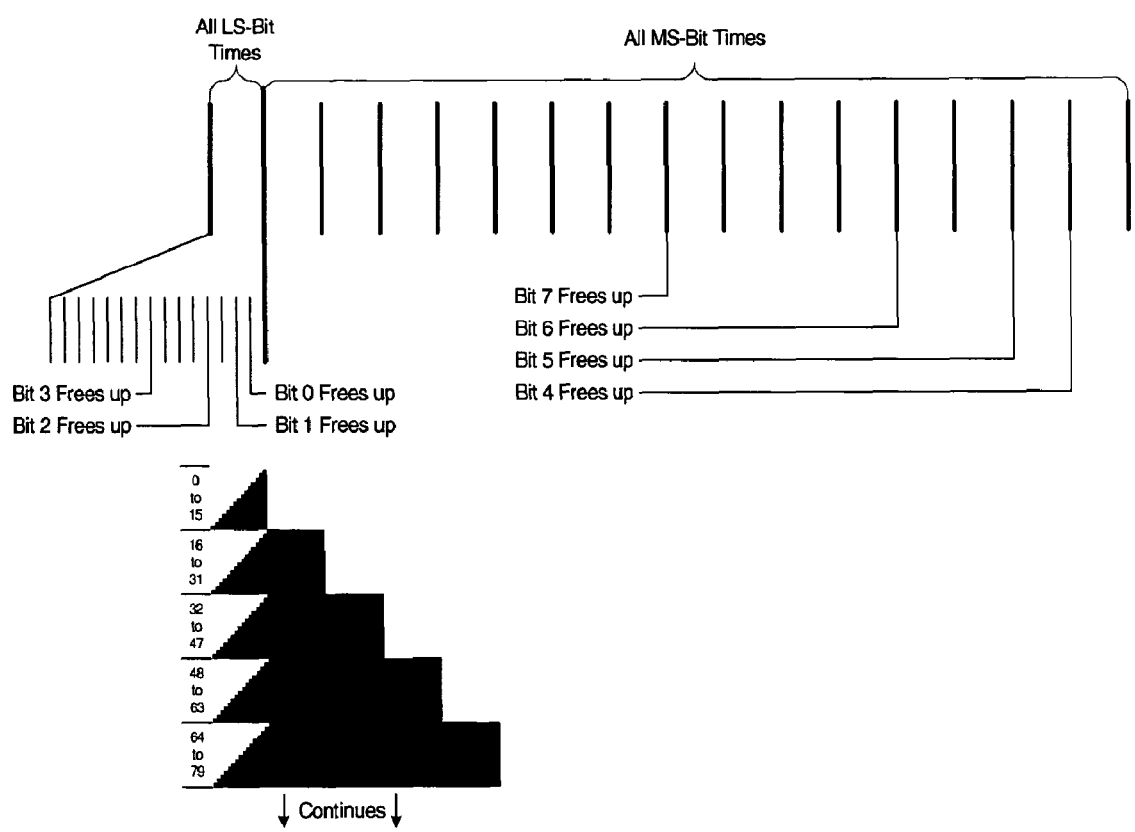
FIG. 10 is a diagram showing a dual counting with deduction process in accordance with an embodiment of the present invention.

A dual counting with deduction process in accordance with an embodiment of the present invention is shown in FIG. 10, which illustrates a 4/4 split example. Time is shown starting at the LS-bits and continuing through the MS count. The diagram shows the MS-Counting intervals with the LS-Counting intervals expanded below it for clarity. Shown on the diagram are when bits can free-up and are no longer needed for the pulse generation process. Shown below the timing diagram of FIG. 10 is how the pulse width expands with increasing pixel values.

The control of the electrodes in one embodiment of the present invention may use memory for the control of the output bits plus some amount of memory for the storage of all or partial pixel values used to control the mirrors. The amount of storage required may vary with the display requirements and the bandwidth available. One of the advantages of the present invention is the relative ease with which these trade-offs may be made.

While it is possible to use the concepts of the present invention with a single homogeneous memory for the on-display, it may be advantageous to break the memory into regions, and even use different types of memory for those bits that more directly drive the output electrodes from those that are used for computing the pulse widths.

In one embodiment of the invention, mirror RAM is used to drive output electrodes that drive mirrors. Because of the close connection between the output electrodes and the mirrors these electrodes drive, the combination of an electrode and the mirror the electrode drives is sometimes referred to in the present invention by the term "electrode/mirror". It should also be understood, that phrases such as "controlling a mirror" may also refer to "controlling an electrode that drives a mirror." For the purposes of this description, memory that more directly drives a mirror will be referred to as mirror RAM or MRAM and bits within this memory array will be called MRAM bits Also, that there may be other logic between the storage bit itself the electrode/mirror. It should also be noted that while a 6-T Static RAM is used in one embodiment of the present invention, that any other type of bit storage may be used, including bits that would not be considered to be "Static RAM bits."

For the purposes of this description, memory on a display device that is used as data in computing the pulse width on a per output basis will be referred to as the Execution RAM or ERAM. It should be understood that the ERAM may in some embodiments be a physically separate memory or may be a part of some other memory including a single memory containing bits used as ERAM.

While the MRAM and ERAM memories are discussed as being logically separate memories, they may be physically interposed in an integrated circuit layout. In one embodiment of the present invention, there is an MRAM bit under every mirror. There may be from no ERAM bit to many ERAM bits under a mirror. It should be understood that in some embodiments, that MRAM and ERAM bits may even be part of a single memory array with common ROW and/or column circuitry.

FIG. 11A illustrates in simplified form a memory array circuit 1102 with a mix of MRAM and ERAM bits of the present invention. FIG. 11B illustrates in expanded form a set of components 1106 of memory array circuit 1102 for a single mirror/electrode 1106 shown as a dashed box. In an LCoS device of one embodiment, the mirror will cover much or all of the circuitry shown in FIG. 11B. Each set of components 1106 includes one MRAM bit which includes an RAM bit such as that shown in FIG. 7 and four ERAM bits 1118 (that may be ordinary memory bits) that are arranged under a single display mirror/electrode 1106. MRAM bit enable/mask input 1122 provides bit enables to control the masked RAM drivers 1123 to drive bit line(s) 1124 of the MRAM bits 1112 on a column by column basis as explained in FIG. 9. The ERAM data input and output 1125 provides path for data from ERAM bits 1118 to be read or written via bit line(s) 1144 through the column decoder 1126 and sense amp/column drives 1148 such as are commonly found in an ordinary memory shown in FIG. 8. However, the memory of FIG. 8 does not include a column decoder.

It will be understood by those skilled in the art, that while single bit lines are shown going to MRAM and ERAM bits, they may in fact be, for example, a complementary pair of bit lines as is common in some types of memory arrays.

The MRAM bit may have other logic between its storage bit and a connection 1127 to mirror/electrode 1106, as shown for the MRAM bit in FIG. 7. While the ERAM bits may be simple storage bits they may also have additional circuitry associated with them in other embodiments.

The 6 MRAM bits 1112 shown in FIG. 11A taken together form a 3 column by two row MRAM array. Each ROW has a separate MRAM row select line 1128. The 24 ERAM bits 1118 shown in FIG. 11A form a 6 column by 4 ROW ERAM memory array. In the example of FIG. 11A, there are separate MRAM and ERAM memories that are physically interposed, but they may operate independently. Row select lines 1132 are used, in this simple example, to select a ROW of 6 MRAM bits 1118. For the MRAM array there are 3 column bit lines 1124, one for each of the columns of MRAM bits in FIG. 11A. In this example, the MRAM does not have a column decoder, but one may be used in other embodiments. There are six ERAM column bit lines 1144, one for each of the six columns of memory bits shown in FIG. 11A. Each pair of column bit lines 1144 is shown going to a 2 to 1 column Decoder 1126 as is well known in the memory art. Column decoder 1126 selects one of the pair of bit lines connect to it to be active on read or write cycles. Sense amps and drivers 1148 senses the bit lines through column decoder 1126 on reads and drives the bit lines through the column decoder 1126 on writes. The ERAM data input and output 1125 goes to the sense amps and driver circuitry 1125. Not shown in FIG. 11A, but well understood in the art, there will be read and write select lines (or their equivalents) for controlling the sense amps and drivers 1148 to control the read and write process to the ERAM bits.

In the embodiment of the present invention illustrated in FIGS. 11A and 11B, the column driver logic for MRAM bits 1112 have masked write functionality with mask drivers 1123 similar to the mask drivers discussed above. ERAM column drivers do not necessarily support masked write functionality and have set of sense amps and drivers 1148 of a conventional memory. One of the many ERAM row select lines 1132 are driven by ERAM row decoder and drivers 1172 which are addressed by an ERAM row address 1174. Column decoder 1126 uses a column address 1180 to select between the pair of bit lines shown in FIG. 11A. MRAM bits 1112 support mask write driver 1123 by supporting mask write driver logic with a common write Enable 1188 and bit enable line, bit line 1124, that acts as a per bit masked write enable, input 1122. An MRAM row decoder and drivers 1190 that are address by MRAM row address 1192 drive one of many MRAM row select lines 1128 to enable the masked write function to a given MRAM bit in a column.

It will be understood by those skilled in the art that FIG. 11A and FIG. 11B show only a simple example. The number of rows and columns and the various decoders may be varied as is well understood by those skilled in the art. This example shows the MRAM and ERAM bits physically interposed, but still kept as logically separate memories, but it will be understood by those skilled in the art that in some embodiments, they may be combined into a single logical memory array or separated into more than two logical memories. It should also be understood that the use of the masked write type memory for MRAM is only one potential embodiment of the invention. Also, in the embodiment illustrated in FIGS. 11A and 11B, there is only figuratively one "bit line" shown per column of memory bits, but this may be two lines of a differential pair as is common in some RAM designs. In the embodiment of FIGS. 11A and 11B the ERAM sense amps and drivers are assumed to be that of a conventional memory and the write and read enables are not shown.

It will be understood by one skilled in the art that the there need not be an integer number of ERAM bits per mirror, there may, for example, be one or more bits that straddle the gap between two or more mirrors. In addition to the MRAM and ERAM there may be other memories used for generating broadcasted values shared by multiple pulses and for controlling the operation of the device.

A SIMD processor generally contains three major blocks, the controller, memory and/or registers, and processing elements. The memory holds all the data and results from the processing. The processing elements or PEs is the name commonly given to the multiple data paths. In it simplest form, all the PEs do the same operations but on different data as provided by the memory associated with each PE. The controller generates all the memory addressing, control sequencing, and sends controls to the processing elements.

SIMD processors have been defined both with bit-parallel and bit-serial data paths within the PEs. The digital backplane of the present invention may make use of either a Bit-Parallel SIMD or Bit-Serial SIMD or even a combination thereof. But, a bit serial SIMD has some particular advantages for use in a digital backplane in accordance with one embodiment of the present invention.

U.S. Pat. No. 5,990,982, the entire contents and disclosure of which is hereby incorporated by reference, shows the used of a SIMD processor to do processing external to a Microdisplay, namely a Texas Instruments DMD™ display. While SIMD processing has been used previously in display systems external to the display device such as described in U.S. Pat. Nos. 5,990,982 and 6,493,467, the entire contents and disclosures of which is hereby incorporated by reference, SIMD processing is not used inside the microdisplay itself.

The term "Smart memory" generally refers to a device that has a large amount of memory and some processing or other special features connected to it. The processing is often some form of SIMD machine such as in U.S. Pat. No. 5,184,325, the entire contents and disclosure of which is hereby incorporated by reference. U.S. Pat. No. 4,720,819 shows a fast way of clearing a memory a row at a time and U.S. Pat. No. 4,959,811 shows how to put a Bit-Parallel comparator on the edge of a memory, and the entire contents and disclosures of both these patents is hereby incorporated by reference.

Figure 12:
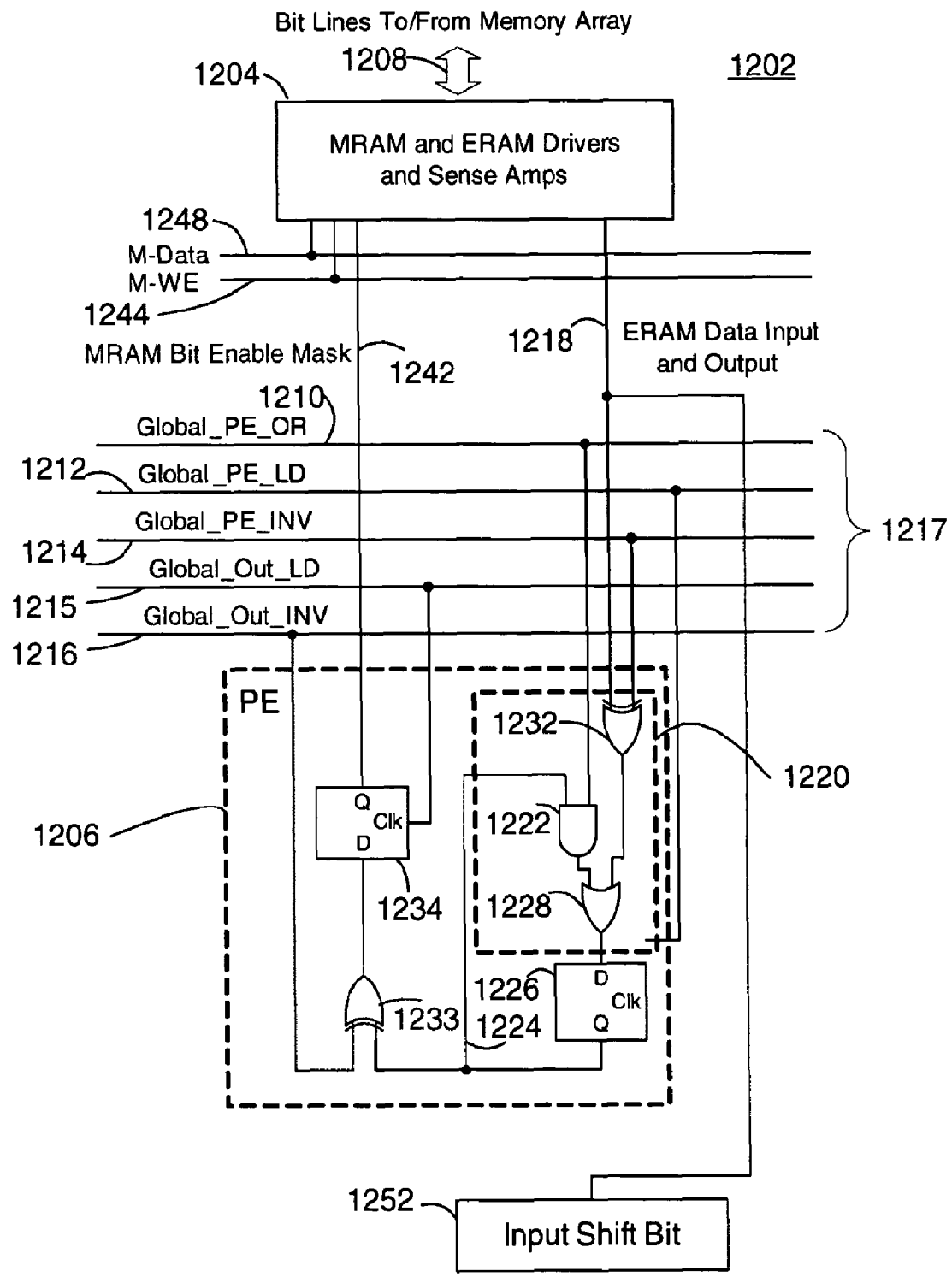
FIG. 12 illustrates in simplified form a 1-Bit wide "slice" of MRAM and ERAM input and output buffers and a processing element (PE) that supports one embodiment of the present invention.

FIG. 12 shows a 1-Bit wide "slice" 1202 of MRAM and ERAM input and output buffers 1204 and a PE (processing element) 1206 that supports one embodiment of the present invention. bit lines 1208 indicated by a two-way arrow connect a memory array (not shown) of mixed MRAM and ERAM such as is shown in FIGS. 11A and 11B to input and output buffers 1204 Global control signals 1210, 1211 and 1212, 1213 and 1214, labeled as a group 1216 are sent in one embodiment to a linear array of PEs, of which PE 1206 is an example, to control operation of each PE. In this embodiment all PEs along one edge of a given memory array (not shown) will receive the same global signals but it should be understood that in other embodiments, there may be multiple sets of global signals with different controls to various groups of PEs.

There are no cross communication signals shown in this embodiment between two or more PEs, but is well known in the SIMD processing art that cross communication between neighboring PEs can sometimes be useful. It is anticipated than in other embodiments there may be signals communicating data or other information between PEs.

ERAM of the memory array (not shown) of this embodiment acts as a conventional RAM and is addressed with row and column addresses. Compared to most common RAMs, however, the ERAM has a relatively wide output, in this embodiment, one bit per PE. The number of PEs may be more or less than the given number of MRAM outputs associated with a Line of the display running in the same direction as the columns of the MRAM and ERAM, but in this one embodiment, it will be assumed that the number of PEs is the same as the number of MRAM columns and that there is one MRAM column per Line of outputs. In other embodiments, there may be more or less PEs than there are MRAM outputs.

ERAM data line 1218 is 1-Bit of output from the ERAM. Control signal 1210, which acts as the Global PE Function control signal, selects the operation from logic block 1220 shown as a dashed box. If control signal 1210 is a zero, then the output of AND gate 1222 is a zero regardless of the state of an output 1224 of a logic block D-flip flop 1226 and thus the data on data line 1218 is OR'ed with zero by OR gate 1228 and thus the output of XOR gate 1232 passes unmodified to the input of logic block D-flip-Flop 1226. If control signal 1210 is a 1, then the output of AND gate 1222 is the same as output 1224 and thus OR gate 1228 will output the OR of the output of XOR gate 1232 and output 1224 to the input of logic block D-flip-Flop 1226. The control signal 1212 is use to select when to look at the output of OR gate 1228 and save the result. The storage D-flip flop and feedback path through AND gate 1222 and OR gate 1228 when control signal 1210 is a logical 1, will logically OR together the output of XOR gate 1232 each time the clock input signal 1212 is applied. The more bits that are to be OR'ed together the more cycles it takes, but the width of the OR may be variable. Performing a multi-bit-wide OR over multiple cycles is a form of bit serial processing.

Control signal 1214 is used to control whether the ERAM data output 1218 is inverted or not by XOR gate 1232. If the signal 1214 is a 1, then the data on output 1218 is inverted before going to OR gate 1228. Thus the logic block 1220 in conjunction with D flip flop 1226 can OR together a series of bits or their inverses coming over data lines 1218. In some embodiments of the present invention, the control of the pulse width may be computed by a series of bit serial ORs or by performing a series of bit serial Not-ORs.

It will be understood by those skilled in the art, that for some applications that the XOR gate 1232 may not be necessary. As an example, if the data that would require the logical ORs is different than that for the processing that would require the NOT-ORs then, for example, the data may be inverted before being stored in the ERAM. This pre-inversion may be done on the backplane as it is being stored, by the input buffers to the backplane, some other place on the backplane, or the data requiring inversion may be sent to the backplane inverted.

In operation of slice 1202, an address (not shown) is generated to select a location in the ERAM of the memory array (not shown) and a bit is output on data line 1218. Generally on the first cycle of a multi-cycle OR operation, control signal 1210 is zero so that the previous state of the logic block D-flip flop 1226 is ignored and on subsequent cycles, control signal 1210 is one/on to effect the logical OR of its previous state with a next input on data line 1218 or its inverse depending on control signal 1214. Control signal 1212 controls when the operation is performed and saved in logic block D-flip flop 1226. There are generally one or more cycles that will be require to compute an intermediate result stored in D-flip flop 1226. The intermediate result stored in D-flip flop 1226 at the end of the one or more cycles, may be the intermediate value 216 of the bit recursive feedback shown in FIG. 2. Some time after a bit wise OR intermediate result is completed, output 1224 of logic block D-flip flop 1226 is sent through XOR gate 1233 to the MRAM enable buffer D-flip flop 1234 and latched by clocking signal 1215 to produce the MRAM bit mask write enable 1242. The output XOR gate 1233 will either be the output of D flip flop 1226 or its inverse as controlled by Gobal_Out_INV signal 1216. It will be understood by those skilled in the ART that the combination of XORs 1232 and 1233 when controlled by signals 1214 and 1216 may be used to perform a number of different bit serial logical combinations including a logical OR and a logical AND off all bits. MRAMs broadcasted write enable 1244, in effect, selects when bit mask write enable 1242 which is the output of the MRAM enable buffer is used. The data to be written in this embodiment is the same for all MRAMs and is broadcast to all MRAM inputs on M-DATA line 1248. The data is only written in the case where both broadcast write enable 1244 and bit mask write enable 1242 are both logically a 1. What is written is controlled by a broadcasted data bit 1248. If the broadcasted data bit 1248 is a 1, then a conditional SET operation will be performed based on the state of each computed bit enable 1242. If the broadcasted data bit is a 0, then a conditional RESET operation is performed.

As will be understood by one skilled in the art, that there may be any number of ERAM read cycles between each control signal that saves the result. There may be any number of bits OR'ed together over multiple cycles with the device shown. It will be understood that the logic shown is only an example and that various other logic and data buffering may be used.

While the MRAM enable buffer D-flip flop (or bit) of processing element illustrated FIG. 12 is not always be necessary, the storage D-flip flop allows a significant degree of timing flexibility between the computations from ERAM and the writing of results. Just one bit of storage can give considerable timing flexibility by combining it with controlling when to start operations from the ERAM and being able to defer the writing to the MRAM enable buffer bits and the write enable. It is noted that a bit serial OR operation of one embodiment of the present invention can take multiple cycles with the number of cycles varying based on the current "count." when using the deductive compare method previously discussed. Without the storage D-flip flop that acts as output storage, the next operation may not start until the bit is used by the MRAM via the MRAM bit mask input. It is also understood by those skilled in the art that there may be additional bits of output storage rather than the single bit i.e. the storage D-flip flop. These multiple bits may be arranged in either a shifting arrangement or may be individually selected to provide the data/control going to the MRAM.

It is also understood by one skilled in the art that while a single input from an ERAM goes to the PE, there may, via multiplexers or other logic, be other data from another RAM that may be applied to the PE.

Also shown in FIG. 12 is one bit 1252 of an input serial in to parallel out shift register and how input shift bit 1252 may be connected to the data input. There may be many parallel bits being shifted at one time and that there may be some selector/multiplexer circuitry that the chooses between the multiple bits to be driving as an input to data line 1218. While in normal functional use, the data will generally flow from input shift bit 1252 to the ERAM of the memory array via data line 1218, it is possible that read operations from the ERAM to the input shift bit 1252 may also occur. It should also be understood that with additional circuitry, it would be possible for the PE 1206 to work on data directly from the shift bit 1252 rather than having to wait for it to be stored in the ERAM first.

In some embodiments of the present invention, it is also possible that several bits may be transferred in parallel to the ERAM though multiple data lines and multiple shift bits. In other words, there is not necessarily a one to one correspondence between the number of PEs, the shift bit, and data inputs.

It will be understood by those skilled in art that the logical function shown inside the logic block in FIG. 12 is only an example and that it would be possible to perform other logical or arithmetic operations with different logic and more control signals.

Figure 13:
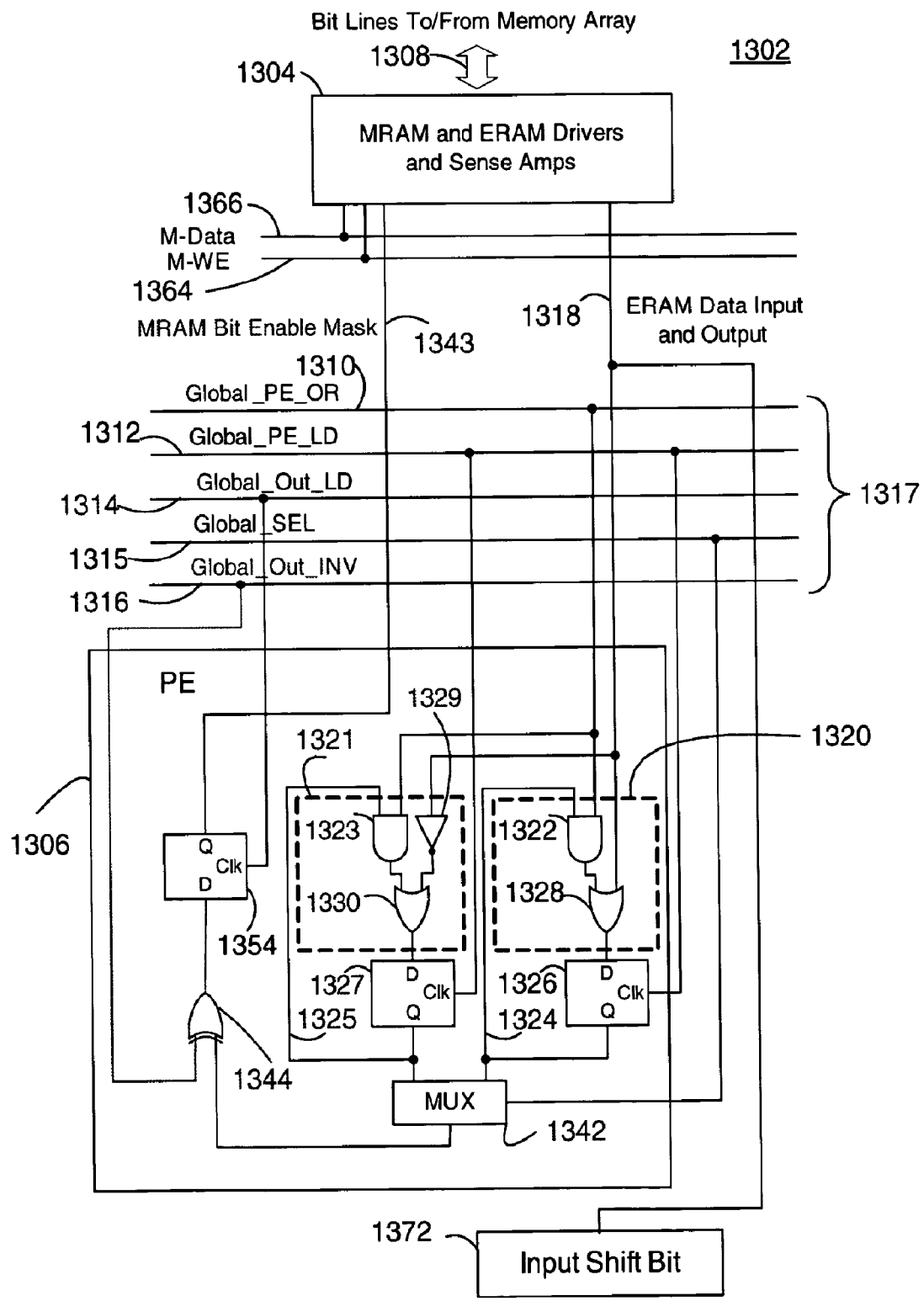
FIG. 13 illustrates in simplified form a 1-Bit wide "slice" of MRAM and ERAM input and output buffers and a processing element (PE) that supports one embodiment of the present invention.

FIG. 13 shows a 1-Bit wide "slice" 1302 of MRAM and ERAM input and output buffers 1304 and a PE (processing element) 1306 that supports another embodiment of the present invention. Bit lines 1308 indicated by a two-way arrow connect a memory array (not shown) to input and output buffers 1304 Global control signals 1310, 1312, 1314, 1315 and 1316, labeled as a group 1317 are sent to a series of PEs, of which PE 1306 is an example, to control operation of each PE. Generally all PEs along one edge of a given memory array (not shown) will receive the same global signals.

ERAM of the memory array (not shown) acts as a conventional RAM and is addressed with row and column addresses. However, the ERAM has a very wide output, nominally one bit per PE, and there may be as many as or more than one PE per vertical or horizontal line of the display. The other difference from a conventional RAM is that the ERAM may be physically built interspersed with the MRAM as shown in FIG. 11.

Data line 1318 is 1-Bit of output from the ERAM. control signal 1310, which acts as the Global PE Function control signal, selects the operation for logic blocks 1320 and 1321 as shown by the dashed boxes. If different controls for blocks 1320 and 1321 are need, then there would be multiple control signals 1310. If control signal 1310 is a zero, then the output of AND gates 1322 and 1323 are a zero regardless of the state of an output 1324 and 1325 and D-flip flop 1326 will receive bit 1318 via OR gate 1328 and D-flip flop 1327 will receive the inverse of 1318 via inverter 1329 and OR gate 1330. If signal 1310 is a 1 then the inputs of Flip flop 1326 will be the OR of it previous output with the value of bit 1318 and the input of flip flop 1327 will be the OR of the inverse of signal 1318. Signal 1312 causes the outputs of the two OR gates to be latched by flip flops 1326 and 1327. In the configuration shown, both the OR and the NOT-OR of a series of bits on line 1318 may be computed in parallel, which may be useful for some embodiments of the present invention. Multiplexer 1342 which is controlled by signal 1315 is use to select one of the two results to go to the MRAM bit mask enable bit 1343.

The output of multiplexer 1342 is sent through output XOR gate 1344 and then latched into a MRAM enable buffer. The output or XOR gate 1344 will either invert or not invert the output of multiplexer 1342 based on the control signal 1316. D-flip flop 1354 under control of a global output load signal 1314 to store the result of a series of operations. The output of storage D-flip flop 1354 may be used to control the enabling of the MRAM write process as was described was described above with respect FIG. 12.

The embodiment of the present invention illustrated in FIG. 13 supports two parallel computations using the same data coming from the ERAM. This arrangement may be used to support the MRAM arrays that don't support a direct write, but rather just setting or resetting of the MRAM bit. In particular it may be used when going from an LS-computed pulse width to the MS-computed pulse width. Specifically the parallel path may be used to conditionally Reset (turns off) the pulse if none of the MS bits is a 1 where the main path conditionally Sets (turns on) the pulse if any of the MS-bits are a 1.

The only difference parallel logic blocks 1320 and 1321 is the inverting of one of the inputs by inverter 1329 in logic block 1321. In a sequence of operations where the first step has the Global_PE_OR line, control signal 1312, off and all subsequent operations in the bit serial operation have control signal 1312 on, the output of the first D-flip flop 1326 is a 1 if data line 1318 is a 1 on any of the steps, while the output of second D-flip flop 1327 is a 1 if line 1318 has a ZERO on any of the steps. XOR gate 1344 may be used to affect output 1324 or 1325 which is sent to XOR gate 1344 via multiplexer 1342. selecting which bit serial operation is used on a given cycle is determined by the Global_Sel line 1315 controlling multiplexer 1342.

It will be understood by those skilled in the art that other functions may be added and paths to memory may be supported in ways other than the ways shown in FIG. 13 without changing the basic concept. Also, FIGS. 12 and 13 each show "bit serial" operations of one embodiment of the present invention. However, many of the features of the present invention may be employed with bit parallel operations as well.

It will be understood by those skilled in the art, that having a very wide processor connected to a memory array may be used to facilitate testing. It is anticipated that some functionality may be added to the PEs and/or their surrounding logic to support either or both test and self test. For example, it may be useful to have the PE output a pattern to save in the memory array and then perform a series of read and/or write operations and then use the PEs processing logic to see if the correct result is obtained.

Figure 14:
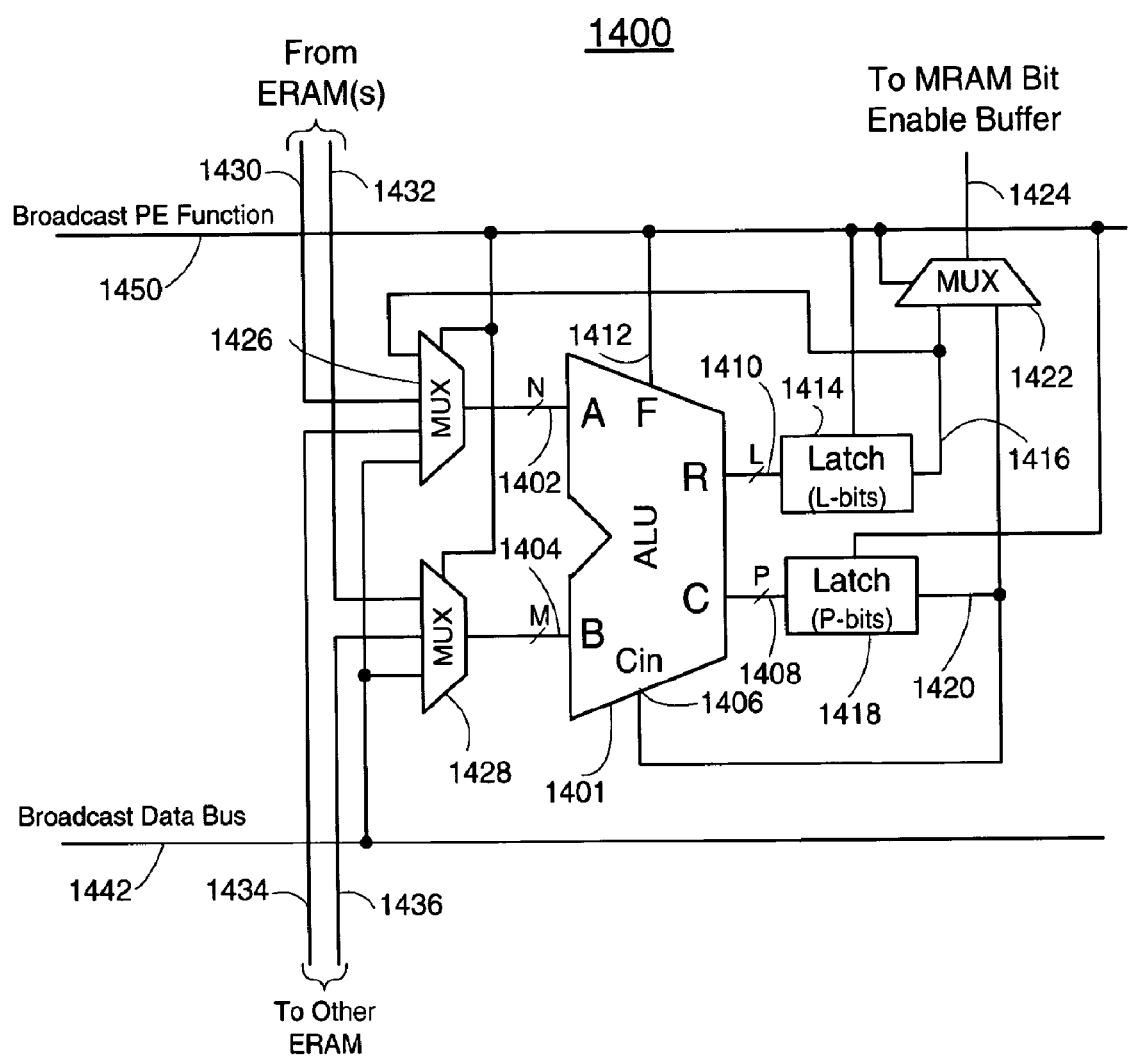
FIG. 14 is a simplified diagram of a PE functionality of the present invention.

FIG. 14 shows how a PE functionality, PE 1400, may be expanded to operate on more complex functions than that of the PE of FIG. 12. PE 1400 may be a bit serial PE or may operate on multiple parallel bits at a time. PE 1400 does not show the MRAM write back buffer bit of FIG. 12.

ALU 1401 is may be capable of doing arithmetic or logical operations with its two data inputs 1402 that may be N bits wide (were N is 1 to any integer) and 1404 that may be M bits wide (M=1 to any integer) and with the carry in input 1406.

ALU 1401 may be a single bit wide to an L bit wide (L=1 to any integer) result. For pure bit serial operation L=N=M=1. As is common with ALUs it may produce one or more "status" bits 1408. For multi-precision operation including bit serial operation, result bit(s) 1406 are saved in latch 1414 with output 1416 and status bit(s) 1408 are saved in latch 1418 with output 1420, each latch being as wide a necessary to hold the bits.

Results that would control the write enable of the MRAM or which may be used for more general-purpose operations may be selected by multiplexer 1422 to go to output lines 1424.

The output lines from the multiplexer may go directly to the MRAM, for example, as bit write enables, or the output lines may be buffered before going to the MRAM, or it may go out as data to memories other than the MRAM in a more general application of the hardware shown.

Inputs 1402 and 1404 are shown coming from input multiplexers 1426 and 1428 respectively. The inputs to the input multiplexers shown are meant to just be examples. As shown, several ERAM data lines 1430, 1432, 1434, and 1436 from one or more ERAMs are connected to the input multiplexers. It should be understood that other memory or registers may also input to the input multiplexers. Also shown going to the on of multiplexer 1426's inputs is output 1416 of result latch 1414. Shown going to input multiplexer 1428 is a broadcast data bus 1442. For bit serial operation, the broadcast data bus might be one bit and for multiple bit operation it may be more than one bit. Broadcast PE Function 1450 has one or more control signals that work to operate the ALU function, control the selection of the input by the multiplexers, and control the various latches.

The PE of FIG. 14 is intended to show how the PE function may be expanded to do operations beyond just controlling the mirrors with the methods one embodiment. It will be understood by those skilled in the art, that the functionality may be augmented in many ways.

Figure 15:
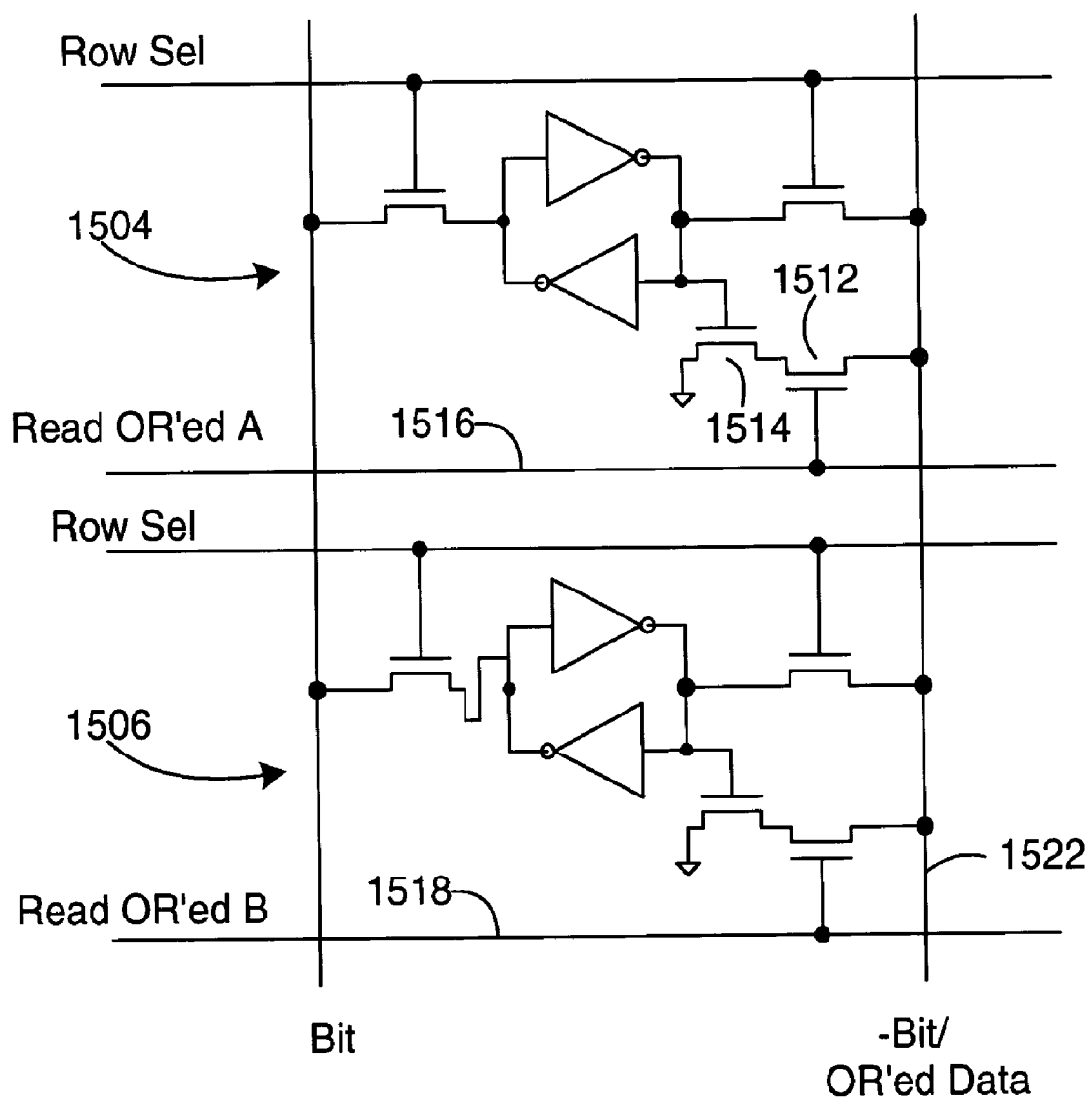
FIG. 15 shows an alternative implementation of an ERAM storage bit that supports computation within a memory in accordance with one embodiment of the present invention.

FIG. 15 shows an alternative implementation of an ERAM storage bit 1502 that supports computation within a memory in accordance with one embodiment of the present invention. The deductive counting method previously discussed only requires that various combinations of data bits be logically "OR" together which lends itself to simple logic hardware implementations. FIG. 15 shows two SRAM bits 1504 and 1506 in the same column and some transistors added to support a parallel OR operation. It should be understood that there would be many rows and columns of such bits.

In addition to a common 6 transistors SRAM bit, an extra select transistor 1512 and pull down transistor 1514 are added to both SRAM bit 1504 and SRAM bit 1506. This configuration prevents either bit 1504 or 1506 from being overwritten by the "OR" operation. In normal operation the row selects operate independently on bits 1504 and 1506. For the OR operation, OR select lines 1516 and 1518 are both turned on at the same time. It should be understood that lines 1516 and 1518 are just to of many ROWs of select lines in the memory array. If data line 1522 has been previously precharged, then line 1522 is pulled down if either bit 1504 or 1506 is a 1 and thus line 1522 will have the logical NOR (which if inverted gives the OR function) of all bits that have their read OR lines on.

Assuming all bits on a set of column bits have the OR selects, various bits as selected by the OR selects may be OR'ed together in a single cycle. This has the advantage of allowing the recursive deductive algorithm to require fewer cycles, as few as 1 cycle regardless of the count if all the bit are in this type of memory, but has the disadvantage of a more complicated ERAM storage. One embodiment of the present invention uses the multi-cycle OR approach in order to reduce the complexity of the ERAM.

It will be understood by those skilled in the art that FIG. 15 is only one example of ways to configure a wired OR function with an array of bits.

While adding the OR function into the memory array adds some transistors and/or complexity, it has the advantage of requiring only a single cycle to compute and only one discharge of the bit line which as the distinct advantage of saving the overall power required to compute one or more pulses.

Figure 16:
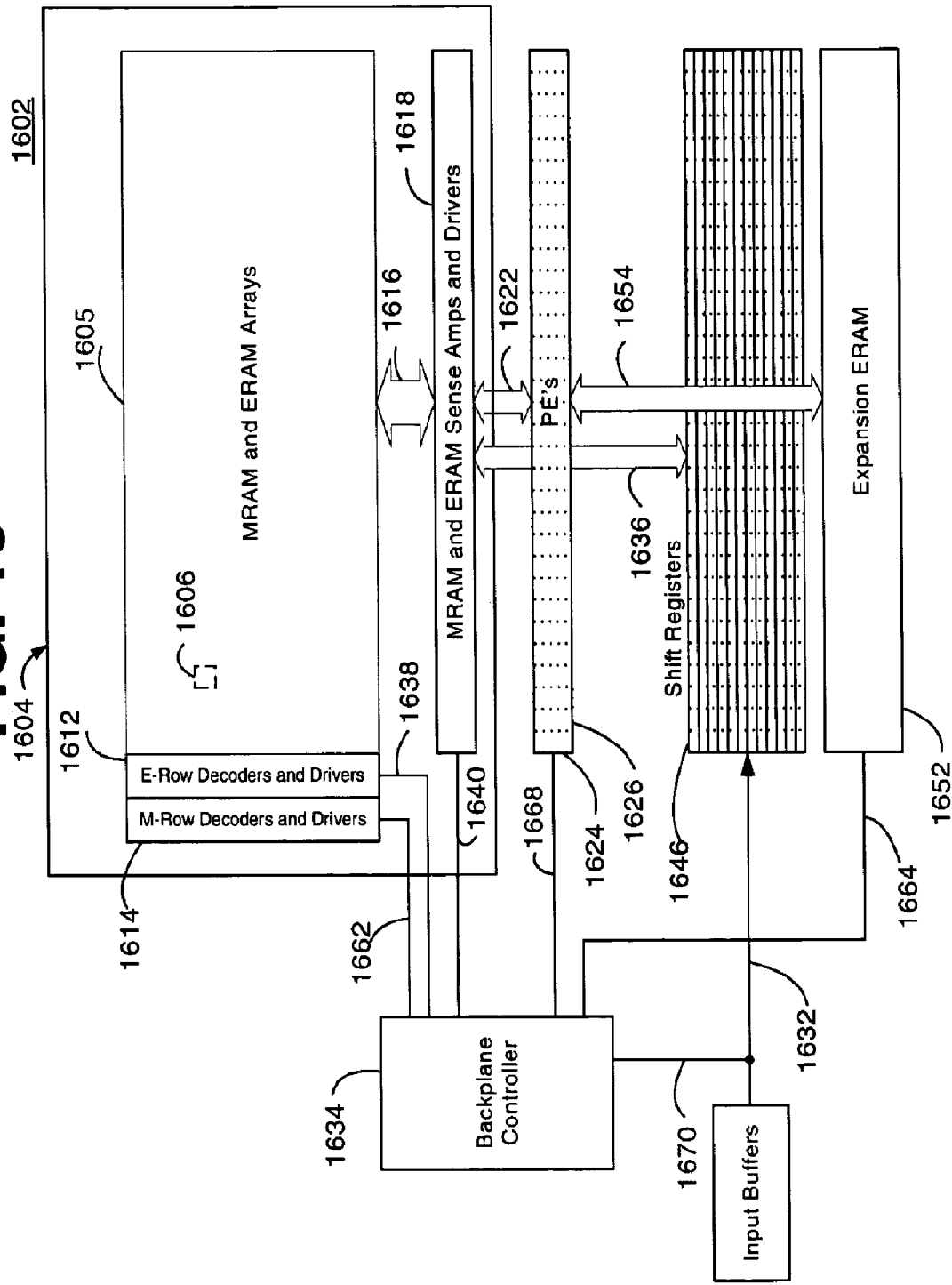
FIG. 16 is a high level block diagram of one embodiment of a digital backplane 2402 of the present invention

FIG. 16 shows a high level block diagram of an embodiment of a digital backplane 1602 of the present invention. A memory structure 1604 contains the MRAM and ERAM bits 1606 mixed together in a large array 1605, with ERAM ROW decoders and drivers 1612, MRAM ROW decoders and drivers 1614, and bit lines 1616 going to the MRAM and ERAM sense amps and drivers 1618. The ERAM data out and bit write mask to the MRAM have a wide bus 1622 connecting the ERAM data out and bit write enable mask (or in other embodiments simply data to the MRAM) to a linear PE array 1624 of PEs 1626. Bus 1622 represents a series of connections between outputs of the ERAM and MRAM 1604 and PEs 1626.

While a one for one connection is shown in FIG. 16, it will be understood by one skilled in the art that there may be multiplexers or other bus structures that may support various routings of data between memory array 1604 and linear PE array 1624.

Input line 1632 to digital backplane 1602 go to a series of 1-Bit wide serial-in, parallel out shift registers. There are a number of shift registers to support the data rate coming onto the device. The length of each shift register will typically be long enough to provide 1 bit for every input to the ERAM. Once all the bits of input line are filled with incoming data, the shifting can stop. A backplane controller 1634 will select (control lines not shown) one of the shift registers to send its data via lines 1636 to the write data input of the ERAM as controlled by the row address 1638 and control lines 1640 to memory array 1604. After the data from one shift register 1646 has been written in to, for example, one row or a part of a row in memory array 1604, another one of shift registers 1646 parallel outputs is selected on lines 1636 and written to a different location into the ERAM. For testing, lines 1636 may also be used to read out bits from the ERAM and/or MRAM to put into the shift registers 1646 and then the bits may be shifted out of shift registers 1646.

In some embodiments of the present invention, the write operations to the ERAM will be scheduled at times when ERAM is not needed for read operations. The controller can either directly schedule writes to the ERAM from the shift register or other input structure, or it may simply give an indication that there is a slot in time when write cycles are permissible.

The address for where the incoming data is written may be computed on the display backplane by controller 1634 or controller 1634 may have a value on which the write address is based computed off the back plane and sent to it via line 1670. In some of the embodiments, the computation of the write addresses will be done in a circular buffer fashion.

It will be understood by one skilled in the art that a physical serial in and parallel out shift register is only one way to take in serial data in and store it up to create a multi-bit wide write to a memory array. For example, a counter and static RAM structure is well known to provide a similar function.

Expansion ERAM 1652 may also be used for data that many not fit in the "main" ERAM array inside the combined MRAM and ERAM arrays 1605 may be added outside the arrays 1605. It may be advantageous to have data outputs 1654 of ERAM 1652 to be the same width as the output of the ERAM in memory array 1604 so as to support efficient routing to linear PE array 1624.

While the bus connecting the other ERAM to the linear PE array is shown as being physically separate in FIG. 16, it will be understood that this bus maybe a common bus with lines of bus going to the memory array 4. It is also possible that there may be no ERAM inside of the display array block of memory in the memory array and that all the ERAM may be contained in a block of memory outside of the display array.

An alternative embodiment of the digital backplane of the present invention similar to the digital backplane of FIG. 16 may have the Expansion ERAM have its own set of PEs that work in parallel with the linear PE array. In this way parallel accesses may be made to reduce the number of cycles to make computations. This second set of PEs may be able to control the MRAMs bit enable mask or writes to the MRAM. In an alternative embodiment, two sets of PEs may combine two sets of partial results to control the MRAM.

Backplane controller 1634 generates the memory addresses and other control signals for digital backplane 1602 including row address 1638 for ERAM and row address 1662 for MRAM row Decoder 1614, Other ERAM 1652 address (es) 1664, control lines 1640 for the MRAM and EMRAM sense amps and drivers as well as the broadcasted data 1606, PE control signals 1668, and controls for the transfer of data from shift registers 1646 to the ERAM(s). All or part of the data input signals 1632 may be provided to backplane controller 1634 by a data line 1670 data. These input lines 1632 may be used to load registers or memory inside the controller. Control or signals or codes within the data being received or by timing within the controller may specify when the incoming data is to be used by the controller rather than as data for display.

In a display application, a display cell will typically have at least one MRAM bit in it that drives the output. Due to the row and column nature of the MRAM memory, the display cells will be similarly organized into rows and columns. The configuration shown in FIG. 16, is designed to operate on an entire row of outputs at a time. Each time the MRAM row is accessed generally one "count stage" is performed. For a simple pulse width there are $2^M$ count stages. For example for a 3 bit pulse width control there are 8 stages from 0 to 7.

In operation of a display, the controller will interleave accesses to the various rows of the MRAM in order to control the various lines of the display. For every write to the MRAM rows there will be one or more accesses made into the ERAM to compute the next MRAM value. In one embodiment of the present invention, there is one PE for every MRAM column so that an entire ROW of the MRAM is computed at one time. It will be understood that it is possible to have more or few PEs and take fewer or more cycles for computations.

Assuming an equal number of MRAM columns, ERAM data outputs, and PEs as there are columns of outputs, the controller will have to have at least as many cycles of outputs as the number of ERAM accesses required for all the count stages for all the lines. This can result in more than one-hundred thousand cycles for a typical display, having on the order of one thousand lines of resolution.

There are thus multiple count stages that occur for multiple lines and each of these count stages will generally involve one or more reads from the ERAM, one or more cycles through the PEs, followed by a masked write (as described with respect of FIG. 12) to an entire row of the MRAM storage bits.

In many embodiments of the present invention, starting of the control of the counting process for each line is staggered so that only one line of outputs is controlled on a given cycle. For example the starting of the counting may progress from the top to the bottom of the display image, a process known as "raster scanning."

Figure 17:
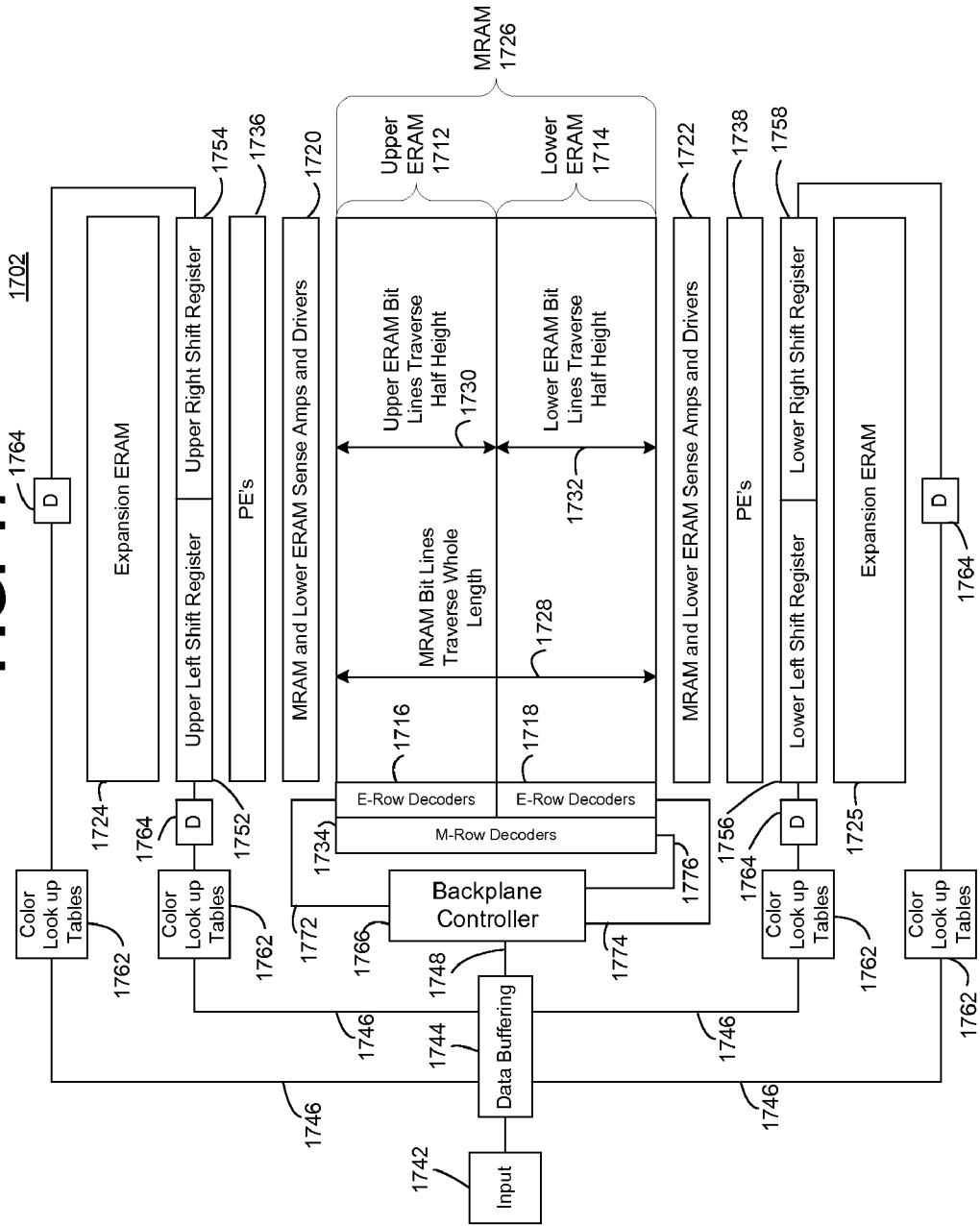
FIG. 17 is a simplified high level block diagram of a digital backplane in accordance one embodiment of the present invention.

FIG. 17 illustrates one embodiment of a digital backplane 1702 in accordance one embodiment of the present invention. In digital backplane 1702, the ERAM is split into an upper ERAM 1712 and lower ERAM 1714 by having bit lines that only traverse half the height, and having separate row decoders, upper E-row decoder 1716 and lower E-row decoder 1718, sense amps and drivers, MRAM drivers 1720 and 1722, and expansion ERAM 1724 and 1725 on the top and bottom of MRAM array 1732. The MRAM is configured as a single array 1732 with MRAM bit lines 1728 running the entire height and upper ERAM bit lines 1730 and lower ERAM bit lines 1732 running in this example, approximately half the height of the combined arrays. There is a single M-row decoder 1734. Both MRAM drivers 1720 and 1722 are capable of driving the MRAM but in operation only one is selected to drive a given MRAM bit line at a time. Digital backplane 1702 supports the ERAMs in both halves being used in conjunction with linear PE arrays 1736 and 1738 to make computations in parallel and then send their result to any row or some set or subset of rows in the MRAM.

As is common with data lines running between integrated circuits, a data input 1742 may be running at a higher data rate per pin and/or that may otherwise need some temporary buffering indicated by box 1744 to produce data input 1746 that enters digital backplane 1702. In some embodiments, buffering 1744 may also included some forms of processing that may range anywhere from simple bit inversion to more complex mathematical functions that may do color space conversion and/or image scaling. Additionally some or all of the incoming data may be sent via lines 1748 to the controller for uses similar to those for lines 1650 in FIG. 16. The buffered data in this embodiment is split into 4 data streams 1746 that will eventually go to 4 multi-bit wide serial-in by parallel out shift registers 1752, 1754, 1756 and 1758. The shift directions of the various shift registers may be different (some may shift left were others shift right toward the center of the device) and thus the data will need to be ordered properly either when sent to the device or by buffer 1744. Digital backplane 1702 includes four look-up table blocks 1762 each containing one or more color look-up tables. Timing re-synchronizing latches 1764 may be used as necessary to buffer the data and keep the data synchronized with a system clock as signals skew across the backplane. A backplane controller 1766 generates separate addresses for the Upper and Lower ERAM 1712 and 1714, Expansion ERAM 1724 and 1725 (address lines and row decoders and other buffering is not shown in FIG. 17 for simplicity), and functional control and broadcasted data for linear PE arrays 1736 and 1738 (the control signals are not shown). Backplane controller 1766 is connected to the Upper ERAM row decoder 1716 by data line 1772, is connected to row the Lower ERAM row decoder 1718 by data line 1774, and is connected to M-row decoder 1734 by data line 1776

For simplicity the various paths between the PEs and the ERAMs and MRAMs are not shown.

Each look-up table may contain one or more RAM arrays that are used to translate the data value going in to a potentially new value going out by table lookup methods that are well known in the art. The values in tables are set to adjust for various factors such as the response of the display device and the human visual response. These tables are commonly called "gamma correction tables." The time through the table lookups may take one or more clock cycles. These look-up tables are also optional features and some embodiments of the digital backplane of the present invention do not include the color look-up tables of FIG. 17.

Each block of look-up tables may contain multiple look up tables within them. There are several reasons for multiple lookup tables. One reason is that the data rate may be too high to be sustained by a single lookup table and so two or more parallel lookups may be provided. In the case were the device is being used for multiple different colors, for example Red, Green and Blue, it is common to need to have different lookup tables for each of the colors.

FIG. 17 illustrates only one of many configurations of the architecture of a digital backplane of the present invention and demonstrates a number of potential enhancements.

In a method in accordance with one embodiment of the present invention for driving output arrays with recursive feedback, there are generally more accesses needed to the ERAM array for computing the next partial result that uses a masked write to the MRAM. The digital backplane of FIG. 17 thus supports an average of 2 accesses to the ERAM for each write to the MRAM. By cutting the ERAM bit lines approximately in half will also improve their inherent electrical performance as the bit lines will have half the loading. It may be desirable to have more ERAM bits per column than MRAM bits as shown in FIGS. 11A and 11B and thus lower the loading of the bit lines relative to the loading of the MRAM bits would be advantageous. Furthermore where the MRAM read speed may be unimportant for the function operation of one embodiment of the present invention, the ERAM read speed may limit the overall performance of the device.

The digital backplane of FIG. 17 also allows data values associated with either the upper or lower part of a display to be stored in either the upper or lower ERAM regardless where in the MRAM they will affect. It some embodiments, it may be preferable to store all the bits associated with a given ROW in MRAM to be stored in the same ERAM so that they can get to the same PE array.

In some embodiments of a digital backplane of the present invention, it may be desirable to have different lookup tables at different times for the same color values. These multiple lookup tables may be stored and switched between. One use of such multiple look-up table would be to perform "temporal dithering" to break up or reduce certain types of artifacts. One type of artifact that temporal dithering may correct are the artifacts caused by lateral fields that affect LCoS devices.

It should be understood that the lookup tables used for correcting display would generally have more outputs than inputs. For example, it is common to take an 8-Bit pixel value of one of the Red, Green, or Blue components and send 8-Bits as an address in, to a memory 10 to 12 bits wide to get a 10-Bit to 12-Bit output. Thus more data bits come out of the table than go into it and so by moving the look up tables onto the backplane, the data needing to be sent to the backplane is less. In some embodiments, it may not be possible to do the table lookups on the backplane and in which case these table lookups may be done in an external device. In some embodiments of the present invention a device known as a "Panel Interface" or PIF will be used to help manage external memory, perform color table lookups, and other functions it can off-load from the panel. The PIF may also compute some or all of the addresses for the writing to the ERAM and send values for the backplane controller to base the addresses on for writing to the ERAM.

The four shift registers in FIG. 17 support a lower data rate for shifting data in. The shifting in from the left and right sides may support a more compact device layout, although it is not absolutely necessary. The data going to the shift registers from the input and the data buffering comprehend the shift direction.

The shift register may load either the ERAM mixed with the MRAM or the Expansion ERAM. In some embodiments, it would also be possible that the shift register would load the PEs directly. As has been previously mentioned, there are other alternatives for distributing the data to input of a very wide memory other than shift registers, such as using a broadcasted data bus and latches on the inputs to the wide memory such as with the ERAM.

In one embodiment, a digital backplane of the present invention controlled by a programmable program instruction sequence. This instruction sequence may be stored in RAM so that that the instruction sequence would be reprogrammable. However, the instruction sequence may be partially or totally stored in a ROM. Also, many or all of the control sequences may also be generated by dedicated hardware.

The image generation of some embodiments will be in raster fashion as is common in the display device art. A raster process generally starts at either the top or one side of the display and works it way from top to bottom. As will be understood by those skilled in the art, the direction of the raster scanning is somewhat arbitrary and may be from bottom to top, or even left to right or right to left. So for a top to bottom raster process, the processing starts with the top line and progress to the bottom. There are also raster processes, such as "interlaced displays" where there are two fields wherein the even lines are processed on one field and then the odd lines processed on the next. It will be understood that the concepts of the present invention may be applied non-sequential raster processes such at interlaced displays or even to non-raster processes as the application may require. For the purpose of simplification, a simple top to bottom sequential raster process for a single field and single color will be described below.

Also, while the processing for the first line will start first, the processing of other lines occurs concurrently, but each subsequent line of the display's processing delayed by the time between lines of the raster process. Also, in the processing of an embodiment of the present invention, many lines if not all the lines will be in some stage of processing concurrently. The issue for the instruction program and sequencing is to support the concurrent programming to perform the necessary pulse control for all the lines.

The concepts of the present invention can also be extended to support various forms of sequential color operation. It is a common practice today to use a single microdisplay and shine multiple colors of light on it in sequence at a rapid rate to generate a color image. A common form is to have a rotating color wheel with various, usually primary, colors allowed to pass through it. Between each color there is a blank/dark area or "spoke". As the color wheel rotates, a blank band caused by the spoke blocks the light, followed by a given color, then another spoke and another color and so forth as the wheel rotates. The rotation of the wheel causes a given color to sweep across the display in a raster fashion. In this case, the raster processing would follow in synchronization with the rastering of the microdisplay by the light falling on it. Field sequential color operations generally occur a much higher rates to display 3 or more colors and prevent the eye detecting the breaking up of colors so the processing much occur at a higher rate. Also, depending on the blanking/spoke time, there may be a one time a first color finishing, a spoke, and a new color starting to illuminate the display all at the same time.

In field sequential use, it is also common for the various colors to be shown for different amounts of time. This can also be supported with the concepts of the present invention, by supporting the control changes between various color fields as they occur in sequence.

A more recent form of using a single microdisplay to support more than one color is known as "color scrolling." In this form, generally 3 or more colors are scrolled across the microdisplay at the same time with blanking areas separating them. Scrolling color is also a raster process only with multiple rasters occurring simultaneously but separated in time. Scrolling color can also be supported applying the concepts of the present invention by having more pointers being kept track of simultaneously.

Both the rotating wheel sequential and scrolling sequential processes are inherently raster processes and fit well in the raster scanning processing. Another way of generating sequential color is "flashing sequential color." This form of flashing sequential color is often used with Light Emitting Diode illumination, most commonly in near eye applications but may include color light sources that are bright enough to support projection displays. The flashing sequential color illumination is not an inherently raster process as all parts of the display are illuminated or not at roughly the same time. This type of display illumination can also be supported with the concepts of the present invention by adding support to generate an "initial condition" for all the mirrors during the blanking interval and then turning off all the mirrors at blanking time. This would in effect split a single pulse for each line into two pulses. Once the initial condition is established, each line would be at a staggered starting point in their sequence. The once initially the control method may be very similar to that which will be discussed with respect to FIGS. 18, 19, 20, and 21.

To support the flashing sequential color (or flashing field), it may be desirable to have a mechanism to quickly establish the initial stage of the mirrors. One embodiment would be to have the master-slave type storage bits in the MRAM. In one embodiment the MRAM master-slave type of bit design may support the master-slave operation for quickly initializing and/or clearing the slave (which would be the drive bit) and at other times the master part of the bit may be randomly accessed and used as for other purposes such as ERAM. In this embodiment, the bit would have both random access and master-slave accesses.

In order to explain the processing, some very simplified examples are shown in FIGS. 18, 19, 20 and 21 that keep the tables manageable in size. The simple example will assume a dual pulse control with only 2 Least Significant (LS) and 2 Most Significant (MS) bits controlling a dual count, single pulse width for a single field. This would support only 16 gray scale levels in this simple example. The concepts shown here can, however, be extended to any number of bits per LS and MS bits as well as to various forms of field sequential operation. Furthermore the LS bit Times and the number of clock cycles between lines will be kept very small for this example.

In following through this very simple example, it should be realized that in a real system with over 1000 lines of display with 10-Bits per gray scale, split with 5-LS and 5-MS bits there may be over 100 processor clock cycles in the time of one LS-bit of intensity time and there will be over 100 processor clocks between line starts.

The control of one embodiment of the present invention has bit serial process for each setting or resetting step of the display mirror assuming a masked write mirror array. The process assumes that the LS bits are controlled by a delay until starting based on the LS bits and then the pulse stops based on the MS bits. This in turn means that the LS bit processing is effectively a count down process, while the MS bit processing is a count up process.

For examples of FIGS. 18, 19, 20 and 21, a roughly binary weight may be used, but, the concepts shown may be extended to any form of weighting of the bits in terms of time. With binary weighting, the "LS-bit time" is the time difference between two pulses differing in value by 1 LS-bit (bit 0). With simple binary weighting, the time between 0 and 1 is the same as between 1 and 2 or 2 and 3 or any other difference of 1.

It should be noted that FIGS. 18, 19, 20 and 21 only show up to time=63 cycles of a frame. This is only enough cycles to show the start of the process.

For the very simple examples shown in FIGS. 18, 19, 20 and 21, the LS-bit time is 4 clocks. This time is chosen to show the working of the scheduling and is very short. In a typical system the LS-Bit time would likely be over 100 clocks. Thus the time difference between processor clocks in a typical system may be less than 1% of an LS-bit time, while in the simple example with only 4 clocks between LS bit times time is 25% of that of an LS bit time. The LS bit time would be a function of the clock frequency of the processor, the number of bits of precision in the time of the pulse, and the length of time for one field.

The time between line starts in terms of processor clocks for a given field acts as a base frequency for memory events in the processing and the operations to be performed. In the first example, illustrated in tabular form in FIG. 18, the time between line starts of the raster scanning process is 17 clocks. This time is a function of the time between raster lines in a raster scanning process and the processor clock rate. There needs to be enough clock cycles between scan lines to support the, MRAM write cycles, the ERAM read cycles, and time slots to support writing new incoming data to the ERAM (for example in a circular buffer fashion). The number of clocks for the LS-bit time may be more or less than the number of clocks between lines. The more the number of time clocks cycles between lines exceeds the number needed for MRAM setting or resetting events, of ERAM read and write events, the easier and more flexible the scheduling, but also the higher the clock rate of the processing and perhaps the more program memory may be required.

There is a "process" for every time step and then each of these processes will be programmed to run concurrently but offset in time. In the simple example illustrated in FIG. 18, the LS-bit require 3 time step processes or "counts" with the two bits supporting a LS-Pulse width of form 0 to 3 time intervals wide. In this example the 2 MS-bits require 5 time step processes. There are two more steps in the MS bits, one at the start for the assumption of a memory array that can only be set or reset and one at the end to assure the pulse is turned off.

In one embodiment of the present invention a line of mirrors on a given line is processed in a single step. Note it is possible to process 2 or more lines at the same time if there is parallel hardware to support it, but the following simple example will only discuss a single line being operated on at a time. The process described works in a raster fashion working from the top line to the bottom. Other processes may also be supported with different programming.

Figure 18:
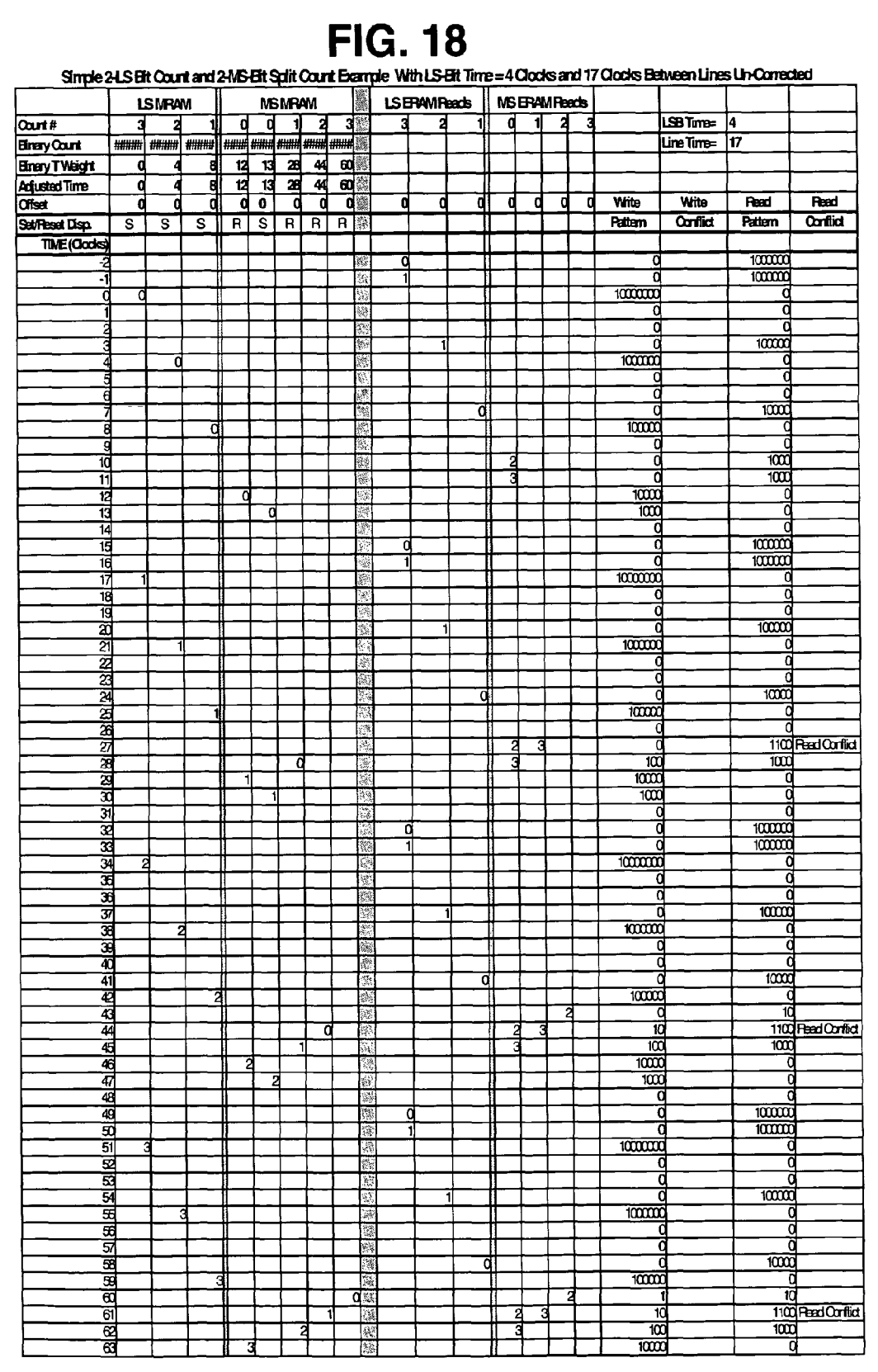

The table of FIG. 18 shows the time intervals for a 2-LS and 2-MS bit dual count with a single pulse algorithm with a LSB time of 5 clocks and a line time of 17 clocks. Under the LS MRAM heading are the 3 time steps for the LS Counting and under the MS MRAM heading are the 5 time steps for the MS pulse width control. For each process that controls the MRAM there are zero to 2 bits that must be read from the ERAM per the deductive compare algorithm that is another aspect of the present invention. The LS ERAM read and MS ERAM read heading and the columns underneath them, correspond to the columns under the LS MRAM and MS MRAM respectively.

Where the MS process steps/counts uses a series of "count up deductive compares" as was previously described with respect to FIGS. 3 and 4, the LS process will use a variation of that process, with "count down deductive compare" to delay the start of the pulse. Where the count up deductive compare process looks for bits corresponding to the 0's in the "current count," the count down process looks at bits corresponding to 1's in the current count and instead of OR'ing together the values fetched, it logically ANDs the bits together to determine whether to write (control the bit write enables or other process to selectively update drive bit). A logical AND is the same as inverting all the Inputs and inverting the output of an OR or by some other logical equivalent.

It should be understood that the descriptions will assume that a "1" written to a drive bit turns a pulse "on" and that a "0" to a drive bit turns the pulse off. It will be understood by those skilled in the art that with various display devices or even the same display devices, such as LCoS devices requiring "DC restoration," that the logical sense of what logic level turns a light modulating element "On" and "Off" may be inverted. These well known necessary inversions of the data to maintain the proper drive orientation are assumed to be done by hardware or software programming.

The ERAM bit numbers given in the table of FIG. 18 correspond to the bit position (0 to 3 in this case) of the given read that is associated with a given mirror. Also, that, for example, line 1, a given bit number will be stored in a different memory location than that same bit position for line 2. In one embodiment of the present invention, the bits are stored in memory so that all the bits corresponding to one bit position for every mirror in a line of the display are fetched in a single access. In one embodiment of the present invention, the ERAM bits corresponding to a given bit position will be stored in circular buffers rather than at constant or fixed memory address. In one embodiment of the present invention, each bit position will have its own circular buffer and the length of each buffer will be long enough to hold the bits for all lined needing those bits. Conceptually with circular buffering, the bit position will specify which circular buffer and the Line Count for the MRAM (the number in each time clock under the LS MRAM or MS MRAM columns) would in effect index into each buffer. The Count number heading is the value of the current "count." Note that there is no physical count that is being compared against, this is just the time interval. Also, that the LS count down from 3 to 1 where the MS count up from 0 (two zero "counts" as will be explained) to 3.

The Binary T Weight row shows the time value for perfectly binary weighted pulses, in this case of time equal to 4 clocks. The "Adjusted Time" row is the time value that is actually used. In this first example illustrated in FIG. 18, the adjusted time will be the same as perfectly binary weighted time. The Offset row will show the number of clock cycles that a set or reset interval is delayed relative to perfectly binary weighted time in the case of MRAM setting or resetting, or the number of cycles a ERAM read process is scheduled ahead of the write process.

In the simple example of FIG. 18, it is assumed that the MRAM may be set or reset on the clock cycle immediately following the last ERAM read that is necessary. In a practical system it may be necessary to schedule the read process further ahead depending on the relative times of the read and write processes and the time of the bit serial processing and other hardware considerations.

The row in the heading of the table in FIG. 18 labeled "Set/Reset Disp." has and "S" for if the process will set (turn on) the display or an "R" to reset (turn off) the display. NOTE: It is assumed that the previous field has ended with a step that assures that the mirrors are turned off and thus their state is known.

The far left column after the headings in the tables corresponds to a given clock time of the processing. In this example, Time=0 is arbitrarily set to be when the first conditional set of the zero'th (top) line occurs. For the subsequent descriptions, the time in the left hand column will be used in referring to a given row in the table.

In the upper right side of the table of FIG. 18, the LSB Time corresponds to the number of clocks in a binary weighted time (in this case 4) and the Line time corresponds to the number of clocks in a line time (in this case 17).

The four right hand most columns are used to track which processes are potentially writing or reading for each cycle and to show if there is a conflict. Each "digit" in the multi-digit numbers may be a 1 or 0 in the write Pattern or the read Pattern and corresponds to the processes step columns in order from left to right. If the whole value is "0" then there is no operation going on in that cycle. If there is more than a single "1" set in the pattern, then there is a conflict as indicated by the respective write conflict and read conflict. For the first example of FIG. 18, there are no "write conflicts" but there will be as discussed a read conflict for every line interval.

Sometime before time=0, the all the mirrors on line 0 are assumed to be off (for the purposes of this description writing a logical 0 to the mirror is assumed to turn it "off"). For a 2 bit LS bit count process of the start of the pulse will be delayed from 0 to 3 LS-time intervals. In performing LS Count Step 3 (the first count step in the LS count down process), if and only if both LS-bits corresponding to a given mirror are 1, will a given mirror be SET (turned on), this corresponds to logically ANDing bits 0 and 1 associated with a given drive bit in a given line of spatial light modulating elements. Using a deductive compare count down process, both bits 0 and bit 1 corresponding to the pixel of a given mirror must be fetch as shown in the LS ERAM reads Count 3 column in the table. With the bit serial processing, it will take 2 cycles to read both LS bits at time=−2 and time=−1 as shown. The "SET" condition is the logical AND of the two bits as may be done by the logic shown in FIG. 12.

In subsequent count processes, one or more ERAM bits read and processed by the PEs before the conditional setting of the mirror may be performed. In FIGS. 18, 19, 20, and 21, the LS and MS MRAM write columns show the Line that is being written and the LS and MS ERAM reads columns show the bit locations that are read out of buffers preceding the MRAM condition set or reset process.

Since there are 17 clock cycles between line starts in the example of FIG. 18, the processing of LS RAM Count 3 for line 1 occurs 17 cycles after the same process occurs for Line 0. All other line count processes for Line 0 of the output will also occur 17 clock cycles later in this example.

In these examples the same bit position are fetch but for different line numbers separated by the Line Start Time rate (17 cycles for FIG. 18). The process shown is "deterministic" (occur at regular intervals) but other well known processes may be used that are less deterministic, such as methods based on keeping a buffer full.

In some embodiments, the ERAM bits will be constantly reallocated such as with a circular buffer reallocation method. Thus the memory allocation process is constantly computing the physical address of where the ERAM bits are stored and so bit numbers under the LS and MS ERAM read columns give the bit position and may not be directly used as an address in some embodiments.

The time of an LS bit time interval is given as being 4 Clocks. It will be noted that at LS Count step 2 the mirror bits on line 0 are going to be conditionally set at time=4 or 4 clock cycles after the conditional setting process at time=0. Thus if the pulse is not set at time=0 and is set at time=4, the pulse will be 4 clocks narrower, the LS-bit time. Using the deductive compare of the present invention, on bit 1 of the two bits needs to be read as show at time 4 under the ERAM reads. If this bit is a 1, then the corresponding MRAM bit is set (turned on). Note that is might be a redundant setting of the bit depending of the state of bit 0 of the corresponding MRAM bit in a process similar to that shown in FIG. 4. It will be noted that this same count step process for count 2 repeats for Line 117 clock cycles later.

Furthermore, after LS count step 2 when bit position 1 of line 0 is read at time=3 bit position 1 of line 0 is never read again. Thus the memory associated with this location may be reallocated. Subsequently after time=7, bit 0 of line 0 is never read again and may be reallocated.

On LS time step 1, line 0 is conditionally set at time=8 or 4 counts after it is conditionally set at time 4. In this case bit 0 corresponding to a given mirror is read at time=9 and if it is a 1, then the corresponding mirror will be set. If the mirror is already set, a redundant setting will have no effect on the mirror output.

The beginning of the MS control controls the end of the LS pulse in this example. In the example of FIG. 18, it is assumed that the MRAM array supports only setting or resetting and cannot be directly written. If it may be directly written with a value, then this two step process described below may be done in one step. At time=12, or 4 clocks after the LS time step 1, the mirror is conditionally RESET (turned off). The reset condition will be if all MS-bits are zero (in this case, the 2 MS of 4 bits being bits 2 and 3) in which case there will be no MS pulse width. While for a true "single" pulse, this the conditional resetting is necessary, in practical terms, this resetting may also be done unconditionally since it would be a very narrow pulse (for example, a clock cycle or two later) followed by a conditional setting of the bit as in a real system the time between writes may be so fast as to cause an insignificant visual effect (and thus may be considered to be "substantially a single pulse.") As shown at time=13 the mirrors for line zero are conditionally set if ANY of the MS bits (bits 2 or 3) corresponding to a given mirror are a 1. This conditional setting make sure that if the pulse is not turned on by the LS-bits if, for example, all the LS-bits corresponding to a mirror is zero, or if the pulse is unconditionally turned off at the end of LS-bit time, that the mirror will start Set (ON) if any of the MS bits are a 1.

The MS ERAM reads bit 2 of line 0 at time=10 and bit 3 at time=1 in time for the conditional reset of the bits on line 0 at time=12. If an unconditional reset method is used, then these bits may be read one clock cycle later. In the conditional reset of this example, it is assumed that the PE has the ability to process the effective AND and OR of the bit serial operations in parallel as shown FIG. 13 so that the bits only need to be read once which produces the control for the conditional reset and set.

For binary weighting with 2 LS bits (bits 0 and 1), each MS time step will be 4 times the LS bit time or in this case 16 (4×4) cycles. Thus MS bit time step 1 for line 0 occurs at t=12+16=28. It will be noticed that if all of the LS-bits (bits 0 and 1) are all zero, the pulse will go up at T=13 and thus the first MS count will be one "short," but in a real system with on the order of 100 cycles per LS-bit time, this would be an insignificant time and visual difference (less than 1% of an LS bit).

At MS time step 1 only bit 3 is needed due to the deductive compare method. But it will be noted on the "uncorrected" timing chart that there is a read conflict between this read and the read for step 0 of bits 2 and 3 associated with line 1.

Referring now to the Corrected time chart in the table of FIG. 19, it will be noticed that read of bit 3 for process for the MS processing step 1 is move back from time=27 in FIG. 18 to time=26 in FIG. 19. But this would have conflicted with MS Step 2 read of bit 2 in later operation (for example the MS read in time step 3 that occurs first at time=43 in FIG. 18), so MS Step 3's bit 2 read will also be moved back in time by 1 cycle. The changing in the timing from binary weighting is shown on the Line "Offet" in FIG. 19. This is the reason for the for the write back buffer that has been shown associated with the various PEs. The reads and processing may be performed earlier and stored in the write back buffers. There may be more than one write back buffer bit allowing even more freedom of the placement of the reads relative to the set/resets. The set and reset operation controls the mirror's on and off time. The ERAM reads just need to be performed enough in advance to have processing completed before it is needed for the set/reset process. The simplistic method shown in the uncorrected tables is to schedule the ERAM reads immediately before the writes, an alternative method would be to schedule the reads in the order they are required until the buffer going back to the MRAM will be full or in other words schedule the ERAM reads and the PE processing as soon as possible without to the limits of the write back storage.

Continuing on with the "corrected" timing for the conditional resetting of MRAM bits on Line 0 at MS Count Step 1 in the table of FIG. 19, if bit 3 for the corresponding MRAM bit on line 0 is a zero, then the pulse is reset. After bit 3 for line 0 is read in the MS processing step 1 at time=26, it is never used again and thus physical memory associated with that bit position storage buffer may be reallocated.

Going on to MS count step 2 for line 0 at time=42, bit 2 is read and if this bit is a 0, then the corresponding mirror is reset at time=44. The buffer for bit 2 for all the mirrors on line 0 is no longer needed after time=42 and therefore can thus be reallocated.

In FIG. 19, MS processing count step 3 simple resets the pulse to off regardless of the ERAM bits. In this case the pulse would only be on if both bits 2 and 3 were both 1 thus causing the pulse to not be reset before the end. This is the last step in processing a given line of mirrors. This time may or may not be near the end of the display time depending on the number of lines, the number bit counts, the number of clocks per Line Start, and other variables associate with the light modulation. In some cases, particularly for (non-flashing) field sequential and scrolling color operation, there will be a blanking time between fields. For a 3 panel system with a constant light source or light modulating elements not needing a blanking time (such as DLP™), there may be very little time between the end of one field and the beginning of the next. At the top of the timing table, there is relatively little activity in the MS bits. If in fact this is a display device and there is little or no blanking time, the end of the previous field would be processed in these "empty" slots as the process is continuous.

While the time steps for the MS process is different than the LS process, the time between lines is a constant, that being the clock cycles between line starts which in this example is 17 cycles. Thus there is a periodicity or repeating pattern at the rate of the number of clocks between lines. Thus for example the condition reset of line 1 occurs exactly 17 cycles after the conditional reset for line 0 and 17 cycles before the conditional reset for line 2. In fact all the reads and sets/reset follow a constant pattern. This fact may be used to greatly simplify the control process. Conceptually the program for the "line time" will be the "inner loop" of the control.

Figure 20:
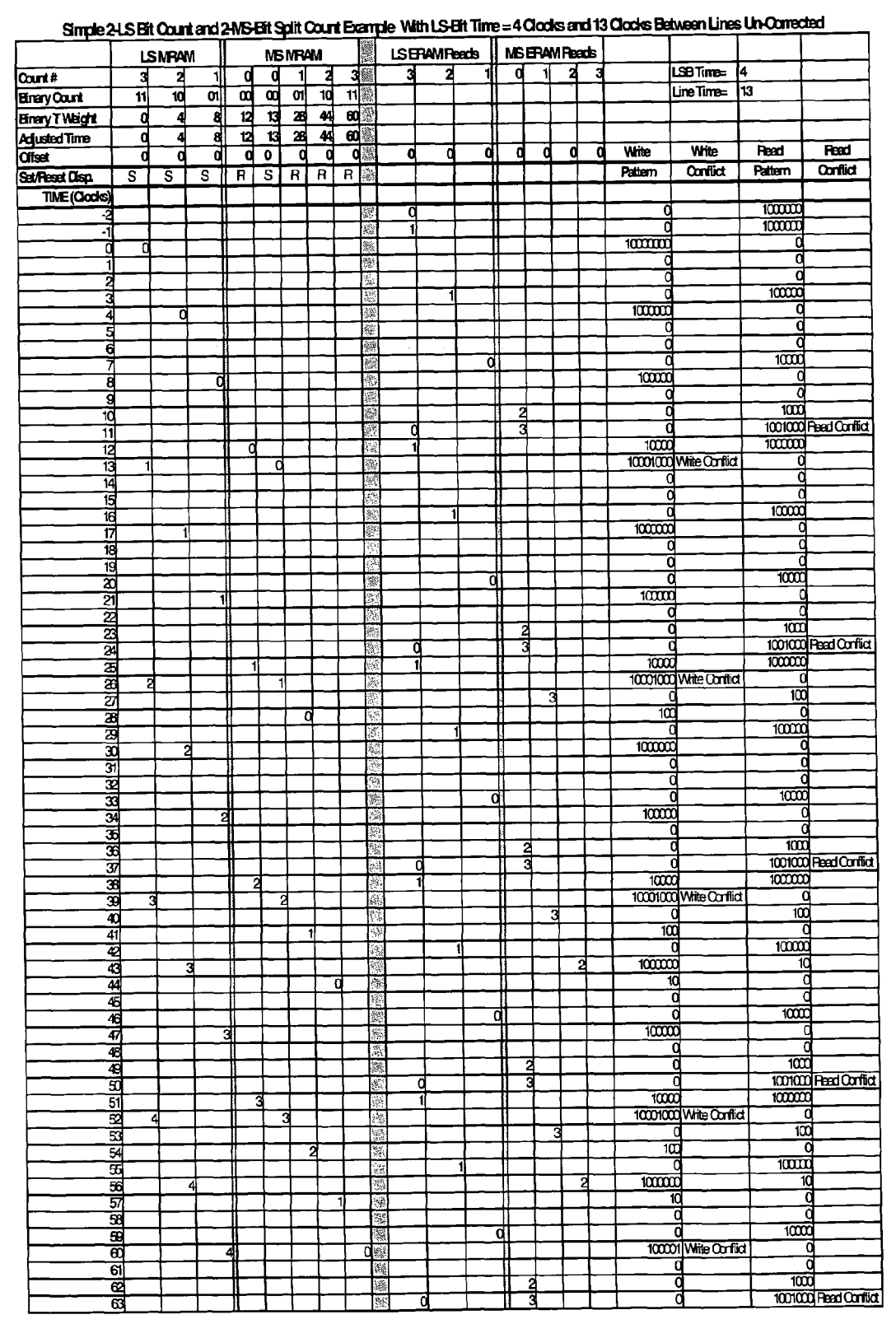

The table of FIG. 20 shows an uncorrected example for an LS bit time of 4 clocks and a line to line spacing of 13 clocks. Uncorrected, there are periodic conflicts with some of the reads and some of the writes. Looking at the corrected table of FIG. 21 the write conflicts have been resolved by delaying the MS step 0 setting by 1 clock and subsequently delaying MS steps 1, 2, and 3 by 1 as well. In a real design with 100's of clock cycles, the slight delays to avoid conflicts will be insignificant.

In a more realistic system with, for example, a single field (for example a 3 panel system) with 10-Bits split into 5-LS and 5-MS bits, there will be 31 LS program steps and 32 MS processing steps (counting "step 0" as one step). With the deductive counting method, there will be the need to read half of 5 bits, 32 times for each of the LS and MS processing. This would be 2.5×32=80 LS ERAM read cycles and 2.5×32=80 MS ERAM read cycles plus cycles to allow for writing if the ERAM is single ported. Assuming a single ERAM structure that reads one line of ERAM bits per cycle, there would need to be at least 80+80=160 clock cycles between lines and preferably more than that to support flexibly addressing access conflicts and writing to the ERAM. In this example, there would be about 64 conditional sets or resets to the MRAM or more than 2.5 Cycles per set/reset thus allowing for flexibly avoiding write conflicts.

In the examples described above, it has been attempted to approximate a binary weighted timing for the various counting steps. In one embodiment of the present invention, the various steps will be a sequence of reads from a memory array. The time between steps can thus be programmed to any amount and not necessarily binary weighted in time.

In the examples described above, the ERAM read process is fixed/determinist. It will be understood by those skilled in the art that it is only necessary that the ERAM read cycles be completed in time to complete the PE computations before the corresponding MRAM cycles occur. Thus it would be possible rather than to have a fixed program process for accessing the ERAM to have a process where ERAM cycles are scheduled to keep a MRAM updating buffer full. It is also possible that the write process may be non-deterministic so long as it meets a certain tolerance. Even if the processes are non-deterministic, they will tend to have a periodicity related to the line start rate.

It will also be understood by those skilled in the art that while a process that is repeated one per number of line counts is shown, the sequencing may be related to some multiple or sub-multiple of the line start rate.

There are cycles where there is no ERAM reads. Assuming the ERAM is a single ported RAM structure, these would be times in which write cycles to the ERAM may be performed in order to update them with new incoming data memory locations that have been reallocated.

Figure 22:
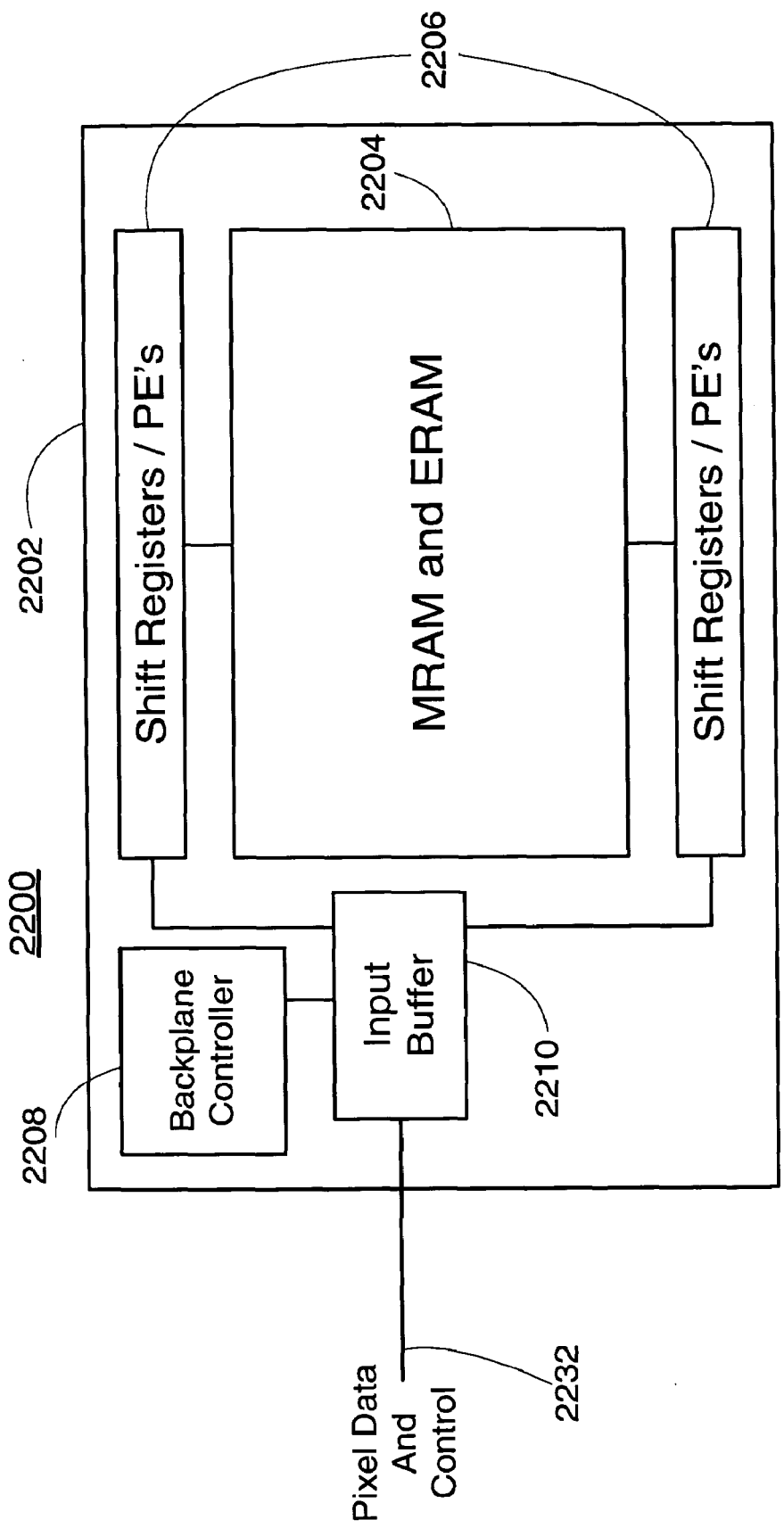
FIG. 22 is a high level block diagram showing a system employing a panel backplane in accordance with one embodiment of the present invention.

FIG. 22 shows a system 2200 with a panel backplane 2202 of one embodiment of the present invention. Only some high level blocks for some of the function blocks of backplane 2202 are shown, including the MRAM and ERAM array 2204, two blocks with a shift registers and a linear array of PEs 2206, the backplane controller 2208, an input buffer 2210, that receives input pixel data and control signals 2232 to the system. The backplane 2202 may have any of the features of the previously described embodiment including but not limited to additional ERAM, Color Lookup Tables, and processing in the Input Buffer. Only some of the data pathways are shown in FIG. 22 including the data pathways between the shift registers and PEs and the MRAM, the pixel data Input to the input buffering, from the Input Buffering to the backplane controller, and from the input buffering to the PEs and shift registers.

Figure 23:
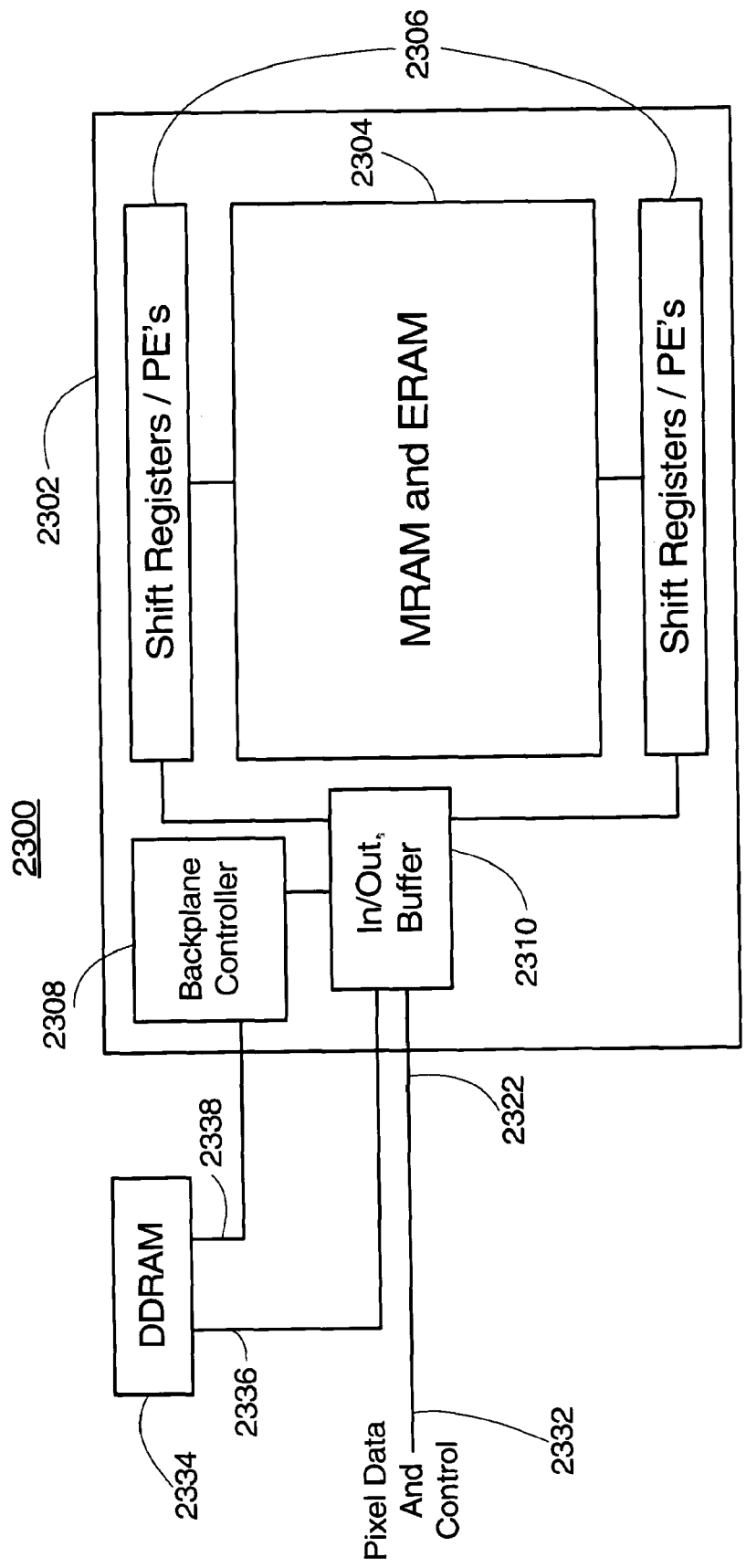
FIG. 23 is a high level block diagram showing another system employing a panel backplane in accordance with one embodiment of the present invention.

FIG. 22 shows a system where the panel accepts the pixel data without the need for extra external data storage. The pixel data in its original format is processed on the display. There may be table lookups, color space conversion or other processing done to the incoming data in the input buffer and/or the PEs or other hardware present on the backplane including plane splitting or other reformatting of the incoming data. The pixel control signals may be used to synchronize the display. Instructions and other data and control information may be sent to the backplane and the backplane controller FIG. 23 shows a system 2300 with a high level block diagram of the panel backplane 2302 of one embodiment of the present invention. Only some high level blocks for some of the function blocks of backplane 2302 are shown, including the MRAM and ERAM array 2304, two blocks with a shift registers and a linear array of PEs 2306, the backplane controller 2308, an input and output buffer 2310, and Input pixel data and control signals 2332 to the system. Included in FIG. 23 is an external memory 2334 which may be a DDRAM or other suitable memory and may be one or more physical device, with its data bus 2334 and address and control signals 2338.

The backplane of FIG. 23 may have any of the features of the previously described embodiments including but not limited to additional ERAM, color lookup tables, and processing in the input buffer. Only some of the data pathways are shown in FIG. 23 including the data pathways between the shift registers and PEs and the MRAM, the pixel data Input to the input buffering, from the Input Buffering to the backplane controller, and from the input buffering to the PEs and shift registers.

The system of FIG. 23 differs from the system of FIG. 22 in that there is external memory storage used. Generally the bandwidth over data bus 2336 will be substantially less than that which is available between the MRAM or ERAM and the PEs on the backplane and this may be a significant consideration in storing data off the backplane in memory 2334. The backplane controller in addition to controlling the backplane itself, also controls, including generating address for the external memory. The system of FIG. 23 may be advantageous to take advantage of the relatively low cost of memory devices versus the cost, including testing, of memory on the backplane. The backplane's controller and input/output buffer will likely do some form of reformatting the data including "plane splitting."

Figure 24:
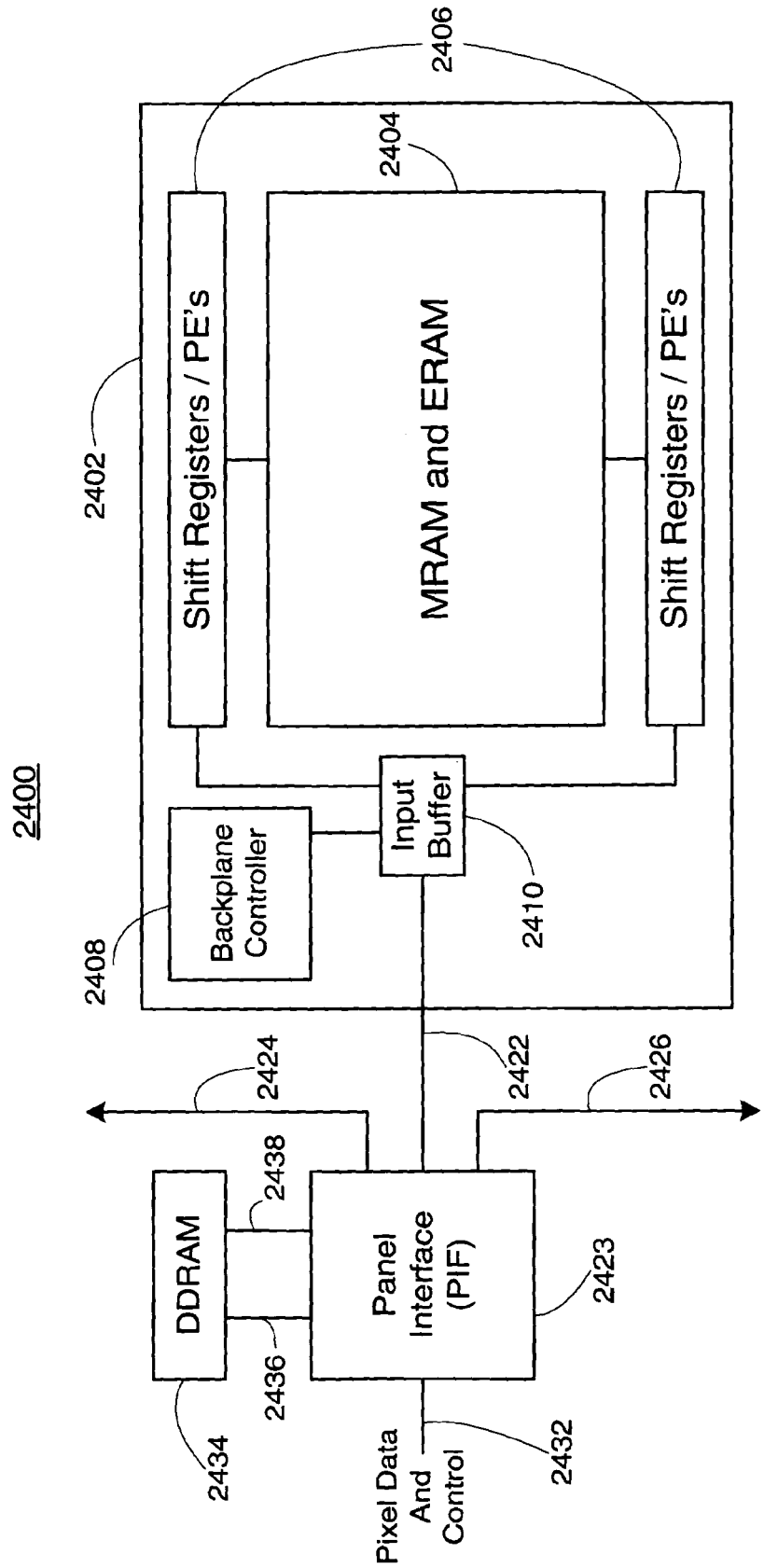
FIG. 24 is a high level block diagram showing another system employing a panel backplane in accordance with one embodiment of the present invention.

FIG. 24 shows a system 2400 with a high level block diagram of the panel backplane 2402 of one embodiment of the present invention. Only some high level blocks for some of the function blocks of backplane 2402 are shown, including the MRAM and ERAM array 2404, two blocks with a shift registers and a linear array of PEs 2406, the backplane controller 2408, an input and output buffer 2410, and data and control signals 2422 from a panel interface 2423. Panel interface 2423 may also send data and control signals 2424 and 2426 to other backplanes, for example in a 3 Panel system panel interface 2423 may send data and control to 3 backplanes that have be made into display panels. The panel interface takes incoming pixel data and control 2432 from the rest of the systems, and sends some or all of the pixel data, perhaps reformatted, to the external memory 2434 via data lines 2436 and the PIF generates control signals and addresses 2438 for the memory 2434. It will be understood that the memory 2434 along with its controls, addresses and data lines may in some embodiments of the present invention be integrated into the Panel Interface 2423. The panel interface may include data buffer/memory and control logic to reformat or otherwise manipulate the data.

Included in FIG. 24 is an External memory 2434 which may be a DDRAM or other suitable memory and may be one or more physical device, with its data bus 2434 and address and control signals 2438. The backplane 2402 may have any of the features of the previously described embodiment including but not limited to additional ERAM, Color Lookup Tables, and processing in the Input Buffer. Only some of the data pathways are shown in FIG. 24 including the data pathways between the shift registers and PEs and the MRAM, the pixel data Input to the input buffering, from the Input Buffering to the backplane controller, and from the input buffering to the PEs and shift registers.

The PIF can also handle many of the processing tasks that would otherwise need to be performed on the backplane. The PIF controls the external memory and may perform reformatting including plane splitting of the pixel or other data. The PIF may manage the write buffering process including generating circular buffer addressing of where to store incoming data. The PIF may generate and send to the backplane other control information. The PIF may also download new instructions/programs or other control information for the backplane controller to use. The PIF may be implements in many ways including a custom ASIC or FPGA has are common today. There may be internal or external non-volatile storage such as an EEPROM that can hold the data that programs and FPGA, data for color lookup tables and can hold the programs or other control information that may be sent to the backplane and its controller.

Color scrolling sequential requires tracking each color field simultaneously. The starting time of each field will be offset so that the various fields are working in a different part of their display processing. Thus there would need to be a set of control steps for each field. Thus for a 3 field scrolling color system, number of read and conditional write cycles would triple. The timing for the various fields may be interwoven into a single program flow. The various fields may have differing timing (clock cycles between time steps), to, for example, compensate for a color spectral light deficiencies in a particular light source. In order to keep the ERAM access requirement and thus the processing clock, from going too high, the ERAM may be split in two with two sets of PEs. This would halve the ERAM access rate. In one embodiment of the present invention with a split ERAM, the MRAM would still be accessed as a whole and written. In order to keep the processing load from being too high side of the ERAM or the other, it might be desirable to stripe the processing so one ERAM and set of PEs processes the even lines and the other ERAM on set of PEs process the odd lines. It is also possible that the MRAM array may be split in some manner such as being split into top and bottom arrays or "striped" with every other line in a different array.

In the deterministic methods shown, the number of clock cycles between lines is the same for the various fields in field sequential programming, even if the various fields last for different amounts of time. Conceptually with multiple fields there are multiple pointers to the "first line" (at the end of blanking between each field) that are spaced differently but progressing at the same rate past each line. If a color field is shorter, then the time between the time steps will be shorter, but the clocks between lines stays the same. What changes between fields that each field working on a different line of the display at a given time, and optionally, the weighting of time between time steps for the various fields. Because the time between lines stays the same, the pattern of the reads and Conditional setting and resetting remains the same.

For field sequential color with a rotating color wheel with all the color segments equal, it would simply be a matter of running the single field mode at the faster field/line rate by running the process at a higher frequency.

With color Field Sequential the "line time" for the programming is the number of clocks it take the "spoke" to pass a given line. With a rotating color wheel with multiple color segments, with the width of the color segments varying to create color fields of unequal time, the rate at which each spoke (change in color field) passes a given line on the display is a constant set by the rotation of the color wheel. Because the time between line starts is a constant, the pattern of MRAM and ERAM cycles may be a constant thus simplifying the programming.

One straightforward method to program the color sequential fields of unequal time duration would be to have at least a many program steps as there are total fields times the number of ERAM reads per each field. While this would work and may be practical in some cases, it would mean requiring a higher clock rate than would otherwise be necessary. Because the fields occur sequentially it would be possible to reduce the number of program steps between lines and thus reduce the clock rate of the program.

In color Field Sequential with the raster processing the processing is scheduled to spread out the processing of the various lines and the various count steps for the various weighting of time don't all start and stop at the same time. The later time steps of the later lines will often overlap in time with the time steps in the beginning lines in the next field. With some display technologies such as LCoS, there will be a "blanking time" between fields that would allow at least some of the time steps, particularly the LS Time steps and the lower ordered MS Time Steps to be completed before the next field begins. What is key is that the time slot is no longer needed by the previous field before the next field "reuses" it. In effect a ERAM read or MRAM update cycle may be programmed to two or more different fields to occur at the same time, and other hardware selects between the which operation is performed based on which field will be active at that point in time. By sharing time slots, the number of clock cycles and program or other control storage may be reduced.

In the previous discussion, the assumption is that the various bits stored in the memory represent the actual pixel bit value that will control the mirrors. It will be noted that the deductive compare process simply logically ORs selected bits together. A logical OR is a commutative process and the order of operations has no effect on the result. In order to save on-backplane memory, it may be desirable for given periods of time to logically OR together one or more MS-Bits and send the result, known as a summary bits of this OR of some or all of the MS bits to one or more ERAM buffers (for example, circular buffers) on the backplane. The panel processing would simply OR (or whatever other operation it would have done) this Summary bit instead of needing to OR in one or more MS bits.

With the dual count and deductive compare methods, the MS bits need to be stored the longest and thus need the most storage on the backplane. In some embodiments of the present invention, it will be desirable to reduce the memory on the backplane. This method reduces the storage by having the panel interface controller (PIF) if there is an external controller or by the backplane itself if it is directly connected to external memory store data.

The deductive compare method does a logical OR of selected bits of the pixel's value and that a logical OR is commutative in that the result does not depend on the order of operations. It should also be noted that the MS-bits change at a slower rate than the LS-bits in a compare to a count type of process.

An example with a 10 bit count process, either single field, scrolling color, or field sequential with a dual count method split 5-MS and 5-LS bits is described below assuming no blanking time (blanking time reduces the storage need as more lines are not needing any bits). Assuming binary time weighting, each the 5-LS bits will require storage for less than $\frac{1}{32}^{nd}$ of the time using the deductive counting methods or about $\frac{4}{32}^{nds}$ of a bit for all 5 bits assuming reallocation as each bit frees up. The 5 MS bits taken together require about 4 bits of storage assuming reallocation of the bits.

FIG. 25 is a table providing an example of how summary bits are produced. The 4 Most Significant bits, the 4 MS bits numbered 9 to 5 will be kept off the backplane in external memory. These bits will be read and then "summarized" into a single bit that would be in this example, the logical OR of whichever bits are needed by the deductive count method. The MS compare process is thus be broken into 16 groups by corresponding to the 4 MS bit values (0 to 15). This summary bit would then be ORs with the one MS-bit (bit 5) that is stored in a buffer on the display.

In the deductive compare method using recursive feedback for the MS bits, the only bits that are looked at are those that would are a zero in the current compare value. This means that for the count compare case were all 4 MS bits are one in the 4 MS bits stored off the display, there will be no need to send or save the MS summary bit. Thus the storage for the summary bits in the ERAM is roughly $\frac{15}{16}^{th}$ of a bit or less if there is blanking time factored in. Also it is only necessary to send the summary bit 15 times per field (and not 16).

The summary bit process while reducing storage increases the bandwidth to the panel device. In the example of 4 MS bits being saved off the display, instead of sending 4 bits once at the beginning, 15 summary bits will be sent when needed. Thus for a 10-Bit pixel value process, instead of sending 10 bits to the device, 6+15=21 bits are sent or slightly over double the total bandwidth is required. This process of summarizing the 4 MS bits, however, can save up to about 2.5 bits of ERAM storage per mirror on the display device.

In a split counting and deductive compare process with 5 MS bits, without the summary bit, there would need to be initially 5 bits stored in the ERAM per mirror as the MS processing starts. There would be 32 steps (2**5=32). With the 4 MS bits of the 5MS bits stored off the display, there would initially only are 2 bits, 1 Summary bit and the 1 least significant of the 5 MS bits. On the zero'th step, the summary bit would be a 0 if all 4 MS bits are zero or a 1 if any of the bits is a 1. This summary bit would OR with the 1 least significant bit of the 4MS bits to decide on the control of the mirror, to reset if all the bits are 0.

On the next step ("count"=1) the same summary bit would be used and the least significant bit of the 5 MS bits that is saved on the display would not be looked at. As soon as the summary bit is looked used, in this step, it is not needed again. It will be understood by those skilled in the art, that the MS processing is happening at a much lower rate than LS processing, so there will be time to either bring in and overwrite this location before it is needed for the next step, or using circular buffering methods the processor may wait until more near the time the Summary bit is next needed and on average reduce the total storage needed for the summary bit by about half, since the bit would only need to be on the backplane from the start of the even state until the start of the odd state.

On the next step ("count"=1) the same summary bit would be used and the least significant bit of the 5 MS bits that is saved on the display would not be looked at. As soon as the summary bit is looked used, in this step, it is not needed again. It will be understood by those skilled in the art, that the MS processing is happening at a much lower rate than LS processing, so there will be time to either bring in and overwrite this location before it is needed for the next step, or using circular buffering methods the processor may wait until more near the time the Summary bit is next needed and on average reduce the total storage needed for the summary bit by about half, since the bit would only need to be on the backplane from the start of the even state until the start of the odd state.

In typical signal processing the entries in a circular buffer are data samples representing a value. In the case of one embodiment of the present invention an "entry" in the circular buffer will be one bit of the pixel value for a whole line of pixels. Thus a single "entry" in the circular buffer is in bits the width of the mirror array but only 1 bit "deep". This is in contrast to the common use of circular buffers where there is generally 1 entry of n-bits "deep." For example, a 1920×1080 mirror display with the memory rows going in the long direction, there will be 1920 bits in one entry of the circular buffer.

Circular buffering is one of many methods for reallocating memory in a relatively continuous process and is used in one embodiment of the present invention. Methods of reallocation of memory other than circular buffers may be used that would still use other aspects of the present invention.

Generally, a simple circular buffer requires the following information, however it will be understood by those skilled in the art that the various values may be "factored" or computed in various ways:

1. A pointer to the current writing location
2. A pointer to the current reading location
3. A start of buffer address
4. An end of buffer address A more detailed description of a circular buffer is provided below with respect to FIG. 32.

Often as is the case, and in one embodiment of the present invention, circular buffers are written to/filled by one process, and are then read from by a separate process. The write and read processes have to be coordinated to proceed at the same overall rate and the buffer is large enough to allow for the read process to be safely behind the write process and the write process cannot overwrite data before the data is finished being used or is moved somewhere else. The length of the buffers for each bit position can vary according to the length of time the bits are stored on the device. Bit positions that "live longer" will require larger (longer) circular buffers. Thus as a minimum, the buffer will generally be long enough hold all the bits that are "live" plus some amount of extra buffer space (buffer slack) to allow for some variability between by either the read and write processes to the circular buffer.

Sometimes the numbers controlling the pointers to the circular buffer are factored in different ways, such as having the pointer index off of the start of buffer address. The end of buffer address may be given by the start of buffer address plus the length of the buffer. Some circular buffering methods put power of two or other boundary restrictions the start of buffer address and/or the end of buffer address and/or the buffer length, and as a group any restrictions on a length or address location will be call granularity restrictions. Granularity restrictions often result in needing extra memory to meet the restriction, and are avoided by methods of one embodiment of the present invention in order to reduce the memory requirements.

The addressing of memory in such a way as to create a circular buffer will be referred to as circular addressing. It is the control of the read and write addressing that in effect turns a linear memory into a circular buffer.

Circular addressing is often supported in Digital Signal Processor (DSP) in hardware. In the common use there are only a few circular buffers supported (usually 8 or less). The circular buffers are treated as an addressing mode of the processor and the number of circular buffers is limited both due to the cost of supporting circular buffering and by the needs of the DSP applications. In contrast, in one embodiment of the present invention there may be a large number of circular buffers being managed (in some embodiments it may be hundreds of buffers). Thus an efficient method of managing the buffers is required.

In a typical programmable processor such as a digital signal processors that are well known for supporting circular buffer in their addressing, when using circular buffers, the instruction points to address registers and index registers and often have other registers that control the circular buffering that are either pointed to separately or are implied by the registers that are being used. There is thus a series of pointers to other pointers. This indexing process to access the pointer and the circular buffer control registers may become cumbersome as the number of circular buffers becomes large. In one embodiment of the present invention, the program and associated circular buffer pointers and buffer control values will be kept in a "flat" structure whereby each instruction has associated with it the pointer into the circular buffer, the start of buffer value, and the end of buffer value. While there is some redundant information inherent in the flat data structure it greatly simplifies the overall control processes and the control hardware while at the same time being more flexible in some aspects.

In a simple circular buffer, a given data value is written once data and often only read once. In the case of one embodiment of the present invention, the bit values are read multiple times and multiple different points in the same circular buffer will be accessed contemporaneously.

In one embodiment of the present invention, keep multiple read pointers are kept, one read pointer for each time a data value is to be read for a given comparison. Also in one embodiment of the present invention, the indexing will be "flattened/removed" so that each instruction has associated with it the pointers and the circular buffer control values. Flattening the indexing will result in more memory bits being required but will simplify the hardware and support more flexible control, particularly considering the requirement to track multiple values in the same circular buffer and making multiple accesses into the same circular buffer contemporaneously.

It should be understood that that alternative implementations of the present invention may employ indexing to reduce the amount of memory necessary to store the circular buffer pointers and control registers.

Backplane controller buffer read and MRAM write control will be discussed below. In one embodiment of the present invention, the buffer write (filling) and buffer read processes along with its associated processing and MRAM write process are implemented largely separately with some synchronization.

In one flat instruction control embodiment of the present invention, each instruction has a "fixed" instruction in the Program control RAM (PCRAM) and a location in a "variable" control ram (VCRAM). It will be understood that some level of indexing may also be used to save on some of the control memory.

The circular buffers are filled by a separate control process. This control process may be external to the device in a panel interface (PIF) controller. The PIF or the backplane itself may control data sent into the backplane for the buffers and specify where in the buffer that they go. The write process does what is necessary to add data to the buffer. The write process may be controlled by the same controller as the read process and use the same instruction field or more commonly, it may be more loosely tied with some form of synchronization signals to keep the read and write processing sufficiently synchronized so that the circular buffers are have the data available when needed without overwriting data too early.

For the rest of the description below of the read process control, the write or buffer fill process will be assume to be doing whatever is necessary to keep the right data in the circular buffers As has been discussed above with respect to panel control timing of the present invention, the panel effectively has an "inner loop" of the control sequencing or patterns that is determined by the "time between line starts." With a 3-color scrolling display, there are conceptually 3 lines starting every so many cycles as the color scrolls across the display. Note a Red, Green, and Blue line all "start" at the same time but were they start on the display may not be uniform (for example, if Red is longer than Blue or Green). For the case of the 540 fields per second display there are 3 fields starting 180 times a second.

With a 1080 line display and 5% overscan (scrolling image optically extends beyond the display as it raps around from right to left or left to right) there will be 1080×1.05=1134 line starts. The line start rate is 180 (fields per second)×1134 (lines/field)=204, 120 lines per second. Assuming a 10-Bit dual count split 5MS and 5LS bits there will be about 160 ERAM bit line reads per each field and with 3 Colors there will thus be about 160×3=480 ERAM reads per field. If we assume a split ERAM so that 2 ERAM accesses may be made per cycle, then there will need to be a minimum of 480/2=240 cycles per line. To give some leeway for scheduling on the order of 300 cycles per line would be desirable. Thus the program memory should be on the order of 300 instructions long. Multiplying the 204, 120 lines per second by the 300 cycles per line provides a clock frequency for the processing of about 61 Million instructions per second.

To give some leeway for different clock rates and other variables, the Program RAM length might be rounded to 320 states.

In a traditional stored program processor, the inner and outer loop control would be handled by instructions. In a traditional hardwired controller a series of counters, decoders, and other hardware control everything. In the processor of one embodiment of the present invention, there may be effectively only and "inner loop" that repeats indefinitely.

The "outer loops" of operation are kept track of by the Variable control RAM (VCRAM). This RAM is essentially a series of pointers into either ERAM data Queues or to write Pointers to the Display mirrors. The "State" of the Panel Device is the combination of the Address Counter that sequences the PCRAM and the whole contents of the VCRAM. The controller supports the entire state of the controller being loaded while continuing to operate.

Figure 26:
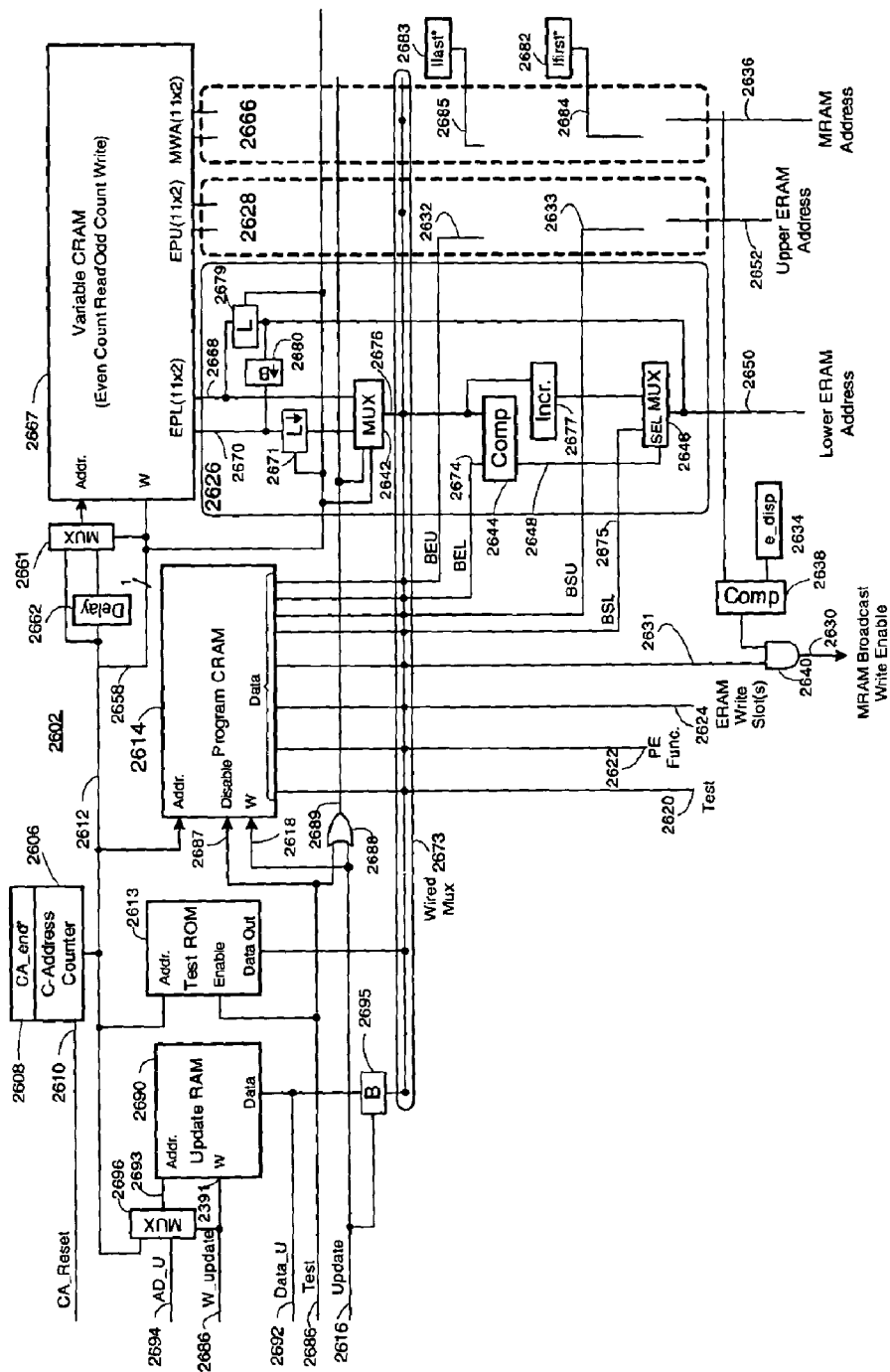
FIG. 26 is a simplified diagram of a backplane controller according to one embodiment of the present invention.

FIG. 26 illustrates a BCP (backplane control processor) 2602 of the present invention, including an address counter 2606 that is used to generate addresses that sequence the instructions in PCP 2602. In the embodiment of FIG. 26, address counter 2606 is a simple counter that when the count reaches predetermined value held in CA end register 2608 is reset to its start value. A CA_Reset signal 2610 may be used to force CA_Counter 2606 to a known value, for example, to make sure the backplane is in Sync with data input. A current counter value is output on address lines 2612 and goes to various RAMs and/or ROMs including the Test ROM 2613.

A program CRAM, PCRAM 2614, generally contains the instructions and parameters that don't change with each complete cycle of the program loop. An update signal 2616 connects to a write input 2618 of PCRAM 2614.

The program CRAM in one embodiment reads except when it is being loaded/updated with the instructions. One of the features of this embodiment is the support for writing to the PCRAM while instructions continue to be executed. In a display application, in normal use signals may become interrupted by, for example, a user plugging and unplugging cables. A feature of the embodiment of FIG. 26 is support for the reloading of the instructions at a periodic or other rate in case there is some loss of synchronization. The data output of the PCRAM are the instructions that control the backplane. There will be various fields in the instructions for controlling various functions of the backplane. These fields may be 1 or more bits wide as necessary.

Control signals for test 2620 which may either be enabled by some test state of the machine or may be downloaded to the PCRAM as part of a test procedure. A PE Function Code field 2622 is used to tell one or more arrays of processing elements (or PEs which are not shown in FIG. 26) what function to perform.

In the case of controlling two or more linear array of PEs there may be different PE signals for each of the PE arrays so that they may perform different functions. These function control signals may include signals that control functions related to the PEs including the DATA value(s) that are written to the MRAM, signals that control any registers/latches/buffers associated with the PEs, and whether the output(s) of the PE are to be used to control the MRAM writes/conditional writes (setting/resetting of the MRAM). It is also anticipated that in other embodiments that the PEs may be used to compute values that are written to the ERAM.

ERAM write slot signal(s) 2624 are used to indicate when a given ERAM is not being needed for a READ operation. If there is more than one physical ERAM may be more than one ERAM write slot signal. If this signal is active, the address pointers pointer generated by data paths one or both of data paths 2626 or 2628 may be ignored.

The primary purpose of the ERAM write slot signal(s) is to communicate to other logic on the backplane when it is permissible to update/write to the ERAM with new data (for example, the write process of the circular buffering embodiment). There should be enough of these write slot times to support the write process without there being a loss of data. In one embodiment, it is assumed that incoming data will be stored in the incoming shift registers to wait for one of the write slot signal(s) to select the write address and data (from, for example, a serial-in/parallel-out shift register) for a circular buffer write process.

In the embodiment of FIG. 26, MRAM write output(s) 2630 which are enabled versions of the Program CRAM output 2631 gives a broadcasted write enable to the MRAM (in the embodiment shown, there is only one MRAM array being controlled by a single data path). The program CRAM 2614 has Upper ERAM Buffer Start (BSU) 2633 and End (BEU) 2632 multi-bit outputs. An end of display value in register 2634 and MRAM address 2636 go to a comparator 2638 and if the MRAM address 2636 is beyond the display, display write output 2630 will be inhibited by AND gate 2640. This comparison and gating of the Display write is one way to support over-scanning.

The MRAM WE signal in some embodiments enables the bit masked write to the MRAM.

FIG. 26 shows a Low ERAM previous buffer pointer address coming out of multiplexer 2642 which is compared against the end of buffer for the lower ERAM (BEL) in greater than or equal to comparator 2644. If the pointer is greater than or equal to the BEL, the multiplexer 2646 is controlled by a select signal 2648 so as to output the Buffer Start Address for the Lower ERAM (BSL) as the Lower ERAM address 2650. A similar set of hardware inside data path 2628 may be used to compute can the Upper ERAM address 2652 using end of buffer for the lower ERAM (BEL) and the Buffer Start Address for the Upper ERAM (BSU) signals.

A least significant bit 2658 of counter address lines 2612 goes to the write input of the VCRAM. The rest of the address bits 2660 are shifted right one and used either immediately via multiplexer 2661 or are delayed by a series of latches 2662 by the amount of time necessary to compute the updated values for writing back to the same addresses on a later odd address counter state through multiplexer 2661. The output of VCRAM address multiplexer 2661 is used as an address 2665 into the VCRAM. In this way on the even cycles, bits are read and on odd cycles, bits are written.

FIG. 26 shows data paths 2626, 2628 and 2666 for computing the address pointers based on a combination of PCRAM 2614 and VCRAM 2667 signals and other data/control storage. Also, there may be nearly identical sets of hardware that control the various pointers. Part of a data path 2626 for the "Lower ERAM address" will be described below in some detail.

Even cycle address pointer 2668 and odd cycle address pointer 2670 for the Lower ERAM Address (EPL) are fetched at the same time. The latch 2671 is updated on every other cycle with the odd value 2670 to hold it for an extra cycle. Multiplexer 2642 is used to select between even value 2668 on one cycle and odd value 2670 on the next cycle under control of the LS Address counter bit 2658. Not shown, but used for the "test and update" operation of the controller would be the option to put the output of a multiplexer 2672 in the high impedance state if the Test or Update functions are used to support the "wired multiplexer" 2673.

Comparator 2644 checks if the pointer less than the corresponding BEL, buffer end value 2674. If the pointer is equal or greater than buffer end value 2674, then the comparator 2644 outputs a select signal on line 2648 which goes to the select line input on multiplexer 2646 to select a buffer start value 2675 or previous value 2676 after being incremented by an incrementor 2677. The output of multiplexer 2646 is a next Lower ERAM address 2650.

A latch 2679 is controlled by a signal, least significant bit 2658, to save the result, next Lower ERAM address 2650, of the odd locations on every other cycle. A buffer 2680 is used to isolate the output, lower ERAM address 2650 from the ERAM data coming out on read cycles or to drive the new value in on write cycles. On write cycles, buffer 2680 and latch 2679 provide the two updated pointer values.

The Upper ERAM address and MRAM addresses are similarly computed using data paths 2626 and 2628, respectively. The Upper ERAM data path take the BEU 2632 and BSU 2631 outputs of PCRAM 2614 to set the limits on the buffer range. One difference in the MRAM address control path beginning and ending of MRAM values stored in latches

2682 and 2683, respectively, connected to the MRAM address control path by respective data lines 2684 and 2685, whereas the Upper and Lower ERAM have a separate beginning and ending buffer limits provided by the Instruction memory on each access of a pointer.

FIG. 26 shows one of many possible embodiments for the Variable CRAM (VCRAM). In this embodiment a single ported RAM is used to store the variable bits. An alternative embodiment would be to use a dual ported RAM. In the embodiment shown, the memory reads and writes on every other address cycle from the control address counter. The LS bit of the control address is split off from the rest of the control address bits and used as a control signal. It will be understood by those skilled in the art that this signal may be combined with clocking signals and may be inverted, buffered, or time delayed to cause the operation of the circuitry shown.

In the example of FIG. 26, the start value of program address counter 2606 may be assumed to be zero but it may be another value that is stored in a register. While a simple counter method is shown, it should be understood that a generation of a sequence of instruction addresses may be performed by other means such as are found on common microprocessors.

Also the address counter of FIG. 26 is effectively a program counter of a stored program computer and the control and sequencing of this counter may be extended to do more complex instruction control including operations such as a conditional branches as are found on stored program computers. The instruction address sequencing may be performed in other ways as are common to stored program computers.

For each read cycle, the bits for controlling two cycles are read and for each write cycle, the bits for two cycles are written. This dual read and dual write process allows a single ported RAM to be used while maintaining a average of one read and one write per cycle. This is only one of many ways of obtaining this capability.

While there may be other variables contained in the VCRAM, a major function of the VCRAM is to hold the address pointer(s) into the MRAM and the ERAM(s).

FIG. 26 shows one way to implement a control processor, according to one embodiment of the present invention, that supports up to two ERAM reads and up to one MRAM writes. In other implementations there may be one or more than two ERAM reads and any number of MRAM writes supported. The two ERAM addresses are labeled "Lower" and "Upper" implying that the ROWs of memory go in the horizontal direction of the display. In alternative embodiments, the ROWs of memory may run in the display's vertical direction so that the ERAM would be left and right.

It should be understood that FIG. 26 is only a figurative representation of the control and latching. In actual practice, there will be additional buffering of signals and data as will be understood by those skilled in the art.

FIG. 26 shows physically Separate PCRAM and VCRAM arrays, but it will be understood by those skilled in the art that this is only one of many ways to accomplish the same or similar functionality.

FIG. 26 shows an architecture for a panel with one MRAM array and two ERAM arrays of one embodiment, but it will be understood that the concepts shown may be used to control any number of MRAM and ERAM arrays. This embodiment shows a circular buffer control mechanism where there is no indexing mechanism between the program instructions and the pointers so that there are one or more pointer values directly associated with each instruction. It will be understood by those skilled in the art, that an alternative implementation would be to have an index value (often called "register number") in each instruction that points to one or more pointers.

In the embodiment shown in FIG. 26, the pointers are simply incremented by one each time. It will be understood that the pointers may be adjusted by values other than one. It should also be understood that this is just one of many ways to generate and control a series of circular buffers. It should also be understood that while the addresses may increment by one each time that the physical location or decodes may be such that the rows of memory may be physically separate.

The reason for reading pairs of values (in this case addresses) is to support an average of one read plus one write cycle on every cycle with a single access per cycle to the memory. It would be possible to use other arrangements of hardware to achieve a similar result such as a dual access memory or accessing the VCRAM at twice the rate. The double access with alternating read and write approach would not generally work well with an "indexed" method of accessing pointers, since this mechanism relies on the pointers for sequential instructions to be located sequentially in the VCRAM.

An alternative single access per cycle VCRAM implementation would be to have two VCRAMs, one of which would be read on every other cycle and one of which would be written on other cycle wherein the pair of VCRAMs would read on alternate cycles. This approach may also support indexed access to the pointers providing that pointers are restricted to being used on odd or even instructions or in cases were this is not possible, that some pointers are duplicated.

It will be understood by those skilled in the art, that there are many ways to support on average a read plus a write cycle in a single cycle both with single ported memories and multi-ported memories.

Also shown in FIG. 26 is a Test ROM 2613 structure. This ROM may be used to effectively force its values to be the control signals. As is common when connecting multiple memories to a common bus, there is effectively a wire'ed OR Multiplexer 2673. With a bus structure acting as a multiplexer, generally only one of the available inputs to the bus is enabled at one time, while the other inputs to the bus are disabled (are generally in a high impedance state). In addition to test, it is possible that there may be one or more ROMs used to store fixed programs and initial values to load into the VCRAM or other Pointer Storage structure. A test signal 2686 enables the output of the Test ROM while at the same time disables PCRAMs outputs via its disable input 2687. Test signal 2686 may also disable (high impedance) the outputs of multiplexer 2642 through OR gate 2688 which controls the Multiplexer disable signal 2689.

It should be understood by those skilled in art that there may be other signals including timing delays of the test signal to affect the proper operation of the circuits involved. While in this example the Test ROM drives all the signals, in alternative embodiments, the Test ROM may only control some of the signals with the PCRAM and VCRAM driving other signals with selective disables of various data outputs.

An advantage of having a Test ROM on the device is that it can support some forms of test with minimal control or signaling and thus not requiring extensive external test hardware. This may be particularly useful in early stages of device testing.

An alternative test method to using a dedicated ROM would be to load the PCRAM and VCRAM with a test pattern that has a test procedure in it. Once loaded the device would then go through a procedure that would either self test or work in conjunction with an external testing system.

An "on the fly" loading of the program and variable RAM supports loading the contents of the RAMs while still generating valid control signals to the rest of the device.

Also shown in FIG. 26 is a method for "on the fly" loading of the Program RAM and/or Variable RAM. In a visual display system it is common for the video display signals to be interrupted temporarily such as when channels are changed or in the case of an external display monitor if the video cables are unplugged and then re-plugged. This interruption of signal may cause the display device either get out of synchronization and/or to loose parts of its control memory. In a totally hardwired system of an alternative embodiment of the control, one or more synchronization signals would get the control back in synchronization with the source data, but in the case of this embodiment with an all or partially RAM program and variable RAM system, a single signal would not get everything in the proper state (set the data in the RAM to the starting condition). In a typical programmable system, the device is stopped while program and initial data values are loaded, but this may cause problem in a video system.

The on the fly loading of the Program RAM is accomplished in the embodiment of FIG. 26 by sending the update data out as the signals while and writing the data, perhaps after going through other hardware in the system, back into the PCRAM and VCRAM. If the system is in synchronization and the data being output is correct, then the updating should produce the same results on the address and control signal outputs as would occur without the updating process and thus the updating may be done "transparently" as often as necessary without causing any change in the visual effect. If the PCRAM and VCRAM has been corrupted or has gotten out of sync, or perhaps the display parameters have changed necessitating an update of either or both the PCRAM and VCRAM, then the updated values are written.

The update process would generally start by writing to some or all of the registers on a device including the CA end register 2608, llast latch 2683, lfirst latch 2682 and e_disp register 2634, shown in FIG. 26. The CA_Address counter, CA reset signal 2610, is then reset to a known count, generally either zero or to, for example, a register specified start value (not shown) by reset signal 2610.

An update RAM 2690 contents may be loaded by the memory write signal, test signal 2686, going to the write input control 2691 and update data 2692. When being updated, address input 2693 for the Update RAM 2694 is selected by the write signal, test signal 2686, to be the Update Address 2694 provided by update logic. Some form of control and data buffering would send data to the backplane for the update process and subsequently be sent to Update RAM 2694. For example the update data may be send in spare time period where there is no need to send the pixel data.

Update signal 2616 causes the PCRAM 2614 to be written rather than being read. This write mode causes the data lines of PCRAM 2614 to go to be in an input (write) mode. The update signal 2616 through OR gate 2688 and signal 2689 also disables the outputs of the multiplexer 2642 in data paths 2626, 2628 and 2666. With the PCRAM 2614 being written to and multiplexer 2642 disabled, the update signal turns buffer 2695 which is normally disabled to turn on and drive some or all of the lines in wired multiplexer 2673. In this way, the update RAM 2690 values can substitute its values for those that would come from the PCRAM 2614 and VCRAM 2667.

When the update signal 2615 is active, W_Update signal, test signal 2686, will be inactive thereby causing multiplexer 2696 to send some or all of the C_Address Counter's output, address lines 2612, to be used as address input 2693 to Update RAM 2694.

It will be understood by those skilled in the art that by only using some of the bits (or a logical or arithmetic combination of the bits) of the address output that a partial update of the PCRAM and VCRAM may be accomplished. This would allow the update RAM to have fewer address locations than the PCRAM or VCRAM. In the case of a partial update, the update signal would only be active during the time that the C-Address count would be at the points in count were the update is to occur.

In some embodiments the controller may make no distinction about colors in hardware and may no color specific control signals even in the case of a sequential color application. It simply executes a program stored in it PCRAM and VCRAM.

The backplane that is the subject of the present invention may be programmed to handle time bases other than binary weighting as was discussed above in reference to FIGS. 18, 19, 20, and 21. It is also possible to change the time base from between various fields of the same or different colors or to have different time bases for different locations on the display of the same field.

With the dual pulse method as shown in FIG. 10 and in other methods there is a tendency to have a phase jitter on certain transitions where a step of a binary value of causes pulses that have a small difference in time weighting to have a significant difference in phase. In some light modulating technologies, this phase difference may be undesirable. The following will discuss how the backplane can use its ability to flexibly use different time bases to reduce the average phase jitter.

In some embodiments of the invention, there will be lookup tables that map input pixel values into output pixel values that are used by the backplane to generate the pulses. If a time base is changed in the way the backplane is programmed, the entries in the lookup tables may be changed to give almost the same pulse widths after the output pixel values are used with the different time base. Or in other words, by using a different time base, input pixel values will be mapped into different output pixel values. As will be discussed below, by using two or more time bases and two or more sets of input pixel to output pixel mapping, the average worse case phase jitter for the pulse waveforms between steps of 1-Bit in the input pixel value may be reduced. The issues with phase difference is well know to be a problem in the case of a smoothly shaded object with some light modulating technologies such as some LCoS technologies. This technique may be most effective the field rate is higher than the rate at which the image data changes.

Figure 28:
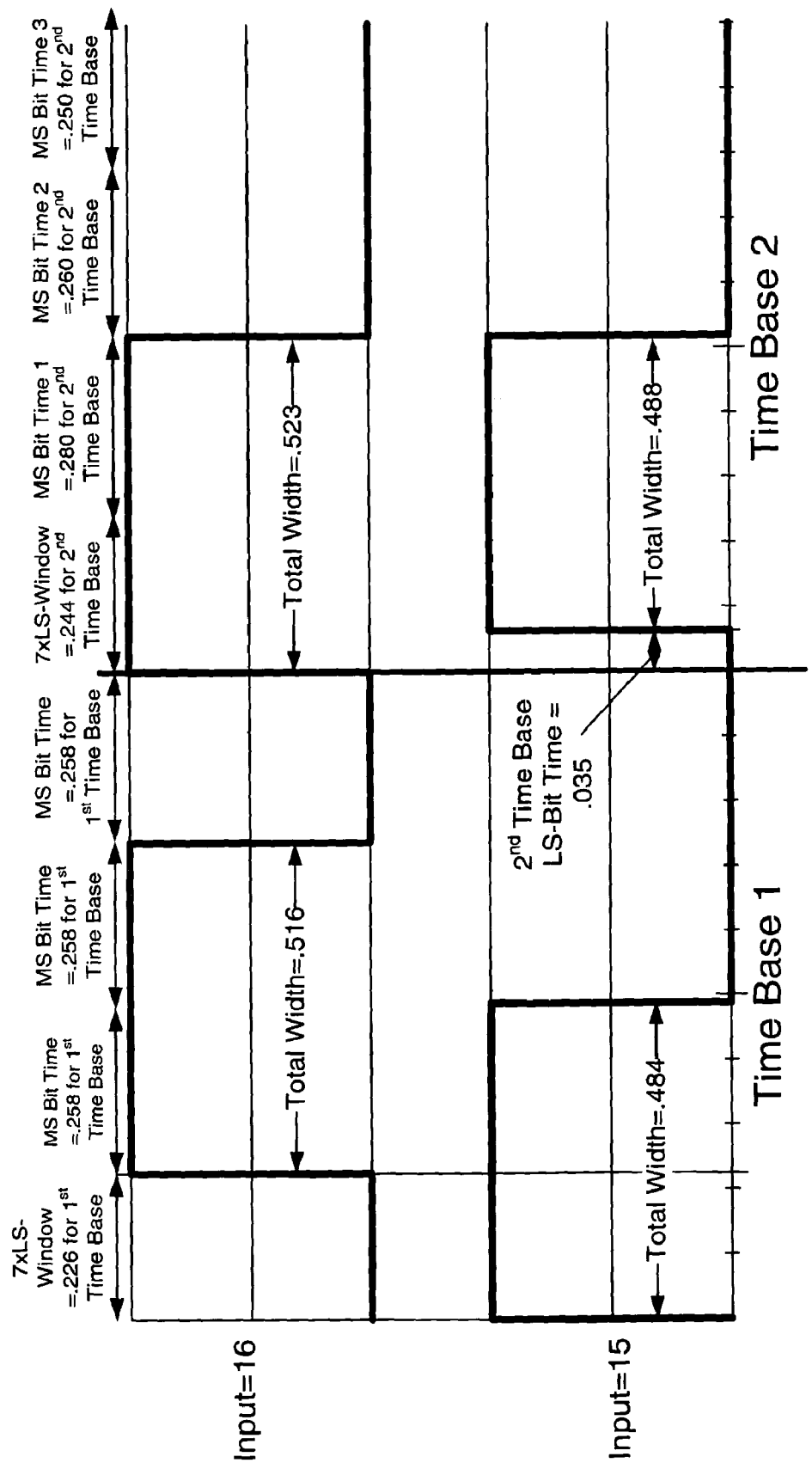
FIG. 28 is a timing diagram illustrating the phase differences between using two different time bases combined with two different table lookup re-mappings of the input pixel values.

The table of FIG. 27 is a simplified example of a method to change the time base between fields and/or between display elements of the same field to break up transitions that cause the worst case "out of phase" lateral fields in a smoothly ramping (stepping by 1) image. FIG. 28 is compares how a pulse of input values 16 and 15 would map into time weighted pulse using time base 1 and time base 2 of FIG. 24.

In the digital backplane of the present invention, the "time base" for controlling the pulse widths in some embodiments is fully programmable and adds no complication to the design. The time base between any LS bit step or MS bit step does not have to be binary weighted but are instead controlled by the "order of operations" as was discussed above with respect to FIGS. 18, 19, 20, and 21, and have little or no affect the speed of operation. Supporting more than one time base at the same time adds only a little to the control logic and memory (which is a very small part of the total device).

The example given in the table of FIG. 27 is for a small/simple case of 5-Bit total count split into 3-LS and 2-MS bits.

In a real system with gamma correction there will be more output bits than the input bits, but to keep the example simple, gamma correction is not shown. Note that the "gamma correction," correction for the LC response, and the correction for the change in the time base (of this method) may be factored together into a single "gamma correction" operation per pixel input, but there would need to be two different correction tables based on which time based is used for a given field.

For this example, the first time base is assumed to be simply binary weighted into 32 equal intervals (0 to 31) as shown on the left hand side of the table. Thus the MS bits are "weighted" to be 8 times (23) the LS bit time for the first time base.

The second time base shown in the far right two columns is "distorted" slightly relative to the first time base. The LS-bits times are equally weighted in this example (they may be other than binary weighted) but slightly longer. The MS bit weightings are not uniform and are picked to control the transition points and to limit the difference in the time weighting of the pulses with respect to the first time base. Using the second time base, there will be some "redundant mapping" of the 31 Input values since this is an N to N mapping. This will not be an issue with a system with gamma correction using a mapping from smaller to a larger number of bits (for example, from 8 to 10 bits).

The "Time" shown in the columns in each time base are in terms of fraction of one field's on time (a fraction between 0 and 1).

The MS and LS columns under the second time base show how the MS and LS bits would be mapped for the second time base. The time under the second time base shows the resultant time, and the "Delta" has columns that show the difference and the percentage error with respect to the first time base. The goal is to keep the "Delta" to about ½ of an LS-bit time (note this will be LS-bits AFTER the input is mapped up to more bits).

In a simple 3 LS and 2 MS split count case, the worst case phase difference occurs between the LS bits=7 and the next MS-Bit value with the LS-bits=0. In the Example below, for the first/binary time base, this worse case condition would happen between Inputs 7 and 8; 15 and 16; and 23 and 24.

The second time base is slightly longer and thus changes on which counts where the worse case transitions occur. For example the Transition from Input=7 to Input=8 which is a worse case for the First time base, will map to stepping only in the LS-bits in the Second time base (from MS=0 and stepping from 5 to 6 in the LS-bits).

In the Second time base, the worse case phase error occurs between steps 8 and 9, 16 and 17, and 24 and 25, which are all low phase difference cases for the First time base. Thus in a double field rate operation, if the different time bases are used for each field, the worse case phase difference between two single steps will only occur in one of the two fields and thus the overall worst case effect should be roughly halved.

For the digital backplane of the present invention, time is controlled by simple program sequencing. The time between any LS step and/or any MS step may be essentially any amount. Thus time may be "distorted" in an essentially infinite number of ways including ways that may be useful to compensate for the LC response. The First Time Base may be also slightly distorted from a simple binary weighting as well (for example, made slightly shorter).

FIG. 28 shows graphically the phased difference between an in put value of 15 and an output value of 16 for the two time bases of FIG. 27.

Currently with spatial light modulators, compensation tables known as "gamma" tables are used to control the output pulse weighting using a fixed time base. In some embodiments of the present invention, using a non-binary weighted time base may be used to obtain the benefits of these tables without the cost associated with lookup tables and perhaps more importantly the usual increase in data from the input pixel to output pixel mapping. In addition to eliminating the cost of the tables, there is the issue that gamma tables generally map to more output bits than input bits. Thus the amount of data that has to be moved, stored, and processed after the mapping is increased. By manipulating the time base in a non-binary weighted method, the benefits of a table lookup may be achieved without requiring the physical lookup table. The ease with which some embodiments such as that of FIG. 26 may be programmed can facilitate the use of time bases. In effect the programming can have the "gamma" (or other weighting table) programmed into it and thus eliminate the need for mapping the input pixel values.

In some embodiments of the present invention, there may be a single count method (equivalent to the dual pulse method where all the bits are treaded as MS Bits) employed for controlling the pulse while obtaining other benefits from other features of the present invention such as the reduction in data and bandwidth from deductive counts. With a single count pulse width control, it becomes relatively easy map input pixel values into any desired pulse width time weighting by the methods discussed for FIGS. 18, 19, 20, and 21. With some embodiments where there is a RAM based program store such as with FIG. 26, the mappings of input pixel values to time weighted pulses may be as flexible or more flexible than it would be for the table lookup approach.

In embodiments such as that of FIG. 26, extremely fine control of the time base may be achieved such that what would require mappings of a large number of output pixel values with the lookup table approach may be achieved at little or no additional cost, particularly relative to the cost of dealing with the additions bits of data after a remapping to input pixel to output pixels with more bits in the output pixels. In effect the time based is remapped.

The previously mentioned U.S. Patent Application Document No. 2003/0160803 to Willis (hereafter referred to as the '803 application), the entire contents and disclosure of which is hereby incorporated by reference demonstrates in FIG. 10 several aspects of the prior art that are solve by one or more embodiments of the hardware and methods of the present invention including the use of adjusting the time base rather than using table look-ups for weighting the time value of input pixels just described. The '803 application, in FIG. 10, shows an m-bit counter driving at $2^m$ by n-bit lookup table were n is usually greater than m. FIG. 10 of the '803 application shows the need for storing n-bits for every pixel in the in the display. By just using the time base adjustment method of mapping just described only m-bits (where m is less than n) would need to be stored. Then by further improvements of the deductive compare and using a "single count method" to generate the pulse with recursive feedback the same pulse waveform may be effectively generated with significantly less than even m-bits per pixel. Furthermore, the deductive compare hardware and methods would reduce the number of bits of data that would be required to be fetched using the bit serial techniques taught by some embodiments of the present invention. As an example, for m=8 and n=12, there may be a reduction on the order of 32× fewer bits to be accessed and processed combining the time based mapping and deductive bit serial compares.

One of the issues that might otherwise occur with time base remapping, particularly if it is done in hardware, is the problem of scheduling all the reads (for example, from ERAM) and writes (for example, to MRAM). As was discussed above with respect to FIGS. 18, 19, 20, and 21, and with an embodiment such as is shown in FIG. 26, the scheduling process of the present invention allows a high degree of flexibility in scheduling.

In some embodiments of a system with the present invention, the time based remapping "program" may be pre-computed and saved in memory (ROM or RAM) either on the backplane or in memory external to the backplane. In other embodiments the time based remapping may be computed by hardware either on the backplane or off the backplane to support a wide range of remapping values, including those based on user controls.

The dual count approach may also time based remapping. With dual counts, time based remapping may be used to expand the range of intensities but there may be large "gaps" in the intensity ranges unless there is some overlap in the pulse widths possible with the LS and MS bit time controls. Some remapping of the input pixels by table lookups may be used to prevent large gaps in intensity when combined with the time based remapping with using dual pulse.

In FIG. 7 there is a block called "DC balancing" and the following will describe some new and useful circuits for supporting the "DC balancing" in hardware that can also support level shifting. The circuits described below will be used to drive an electrical signal on an electrode that may also act as a mirror function, thus this electrode is commonly called a "mirror." Each mirror will use the charge on that mirror to control LC material on top of it. Also in one embodiment of the present invention, there may be an N by M array of such mirrors and drive circuits so as to form a two-dimensional array of picture elements known as Pixels.

In LCoS, LC material will generally be sandwiched between a semiconductor device and a glass lid with a very thin coating of a conductor that is thin enough that most light will pass through it. A voltage potential is applied to the coating on the glass and on each individual mirror will cause the optical characteristics of the LC material over each mirror to change. Usually it is the way the LC material changes the polarization of light that is affected, and by using a combination of polarized light and optical surfaces that only pass light of a given polarization the light intensity may be controlled. More information displays of this type are given in U.S. Pat. No. 5,959,598 to McKnight and U.S. Pat. No. 6,005,558 to Hudson, the entire contents and disclosure of which are hereby included by reference.

With advances in semiconductor processes transistors are being made smaller, but higher voltages may damage smaller transistors. In order to handle higher voltages larger and often slower transistors may be integrated on the same device. LC materials generally require higher voltages to provide the best voltage potential for their optical switching characteristics. In order to integrate more transistors onto the display device while still providing the drive voltages required by the LC material, it will be advantageous to have most of the circuitry using smaller transistors, while only a portion of the transistors operate at the higher voltages. In order to accomplish this, there will have to be some form of "level shifting" for the lower voltage logic to drive the higher voltage logic.

The paper "Level Shifting Interfaces for Low Voltage Logic" to K. Joe Hass and David F. Cox gives an overview of some known level shifting techniques and the entire disclosure and contents of this article is hereby incorporated by reference. As the paper points out, level shifting downward is relatively simple, but level shifting upward is more difficult. The paper in its FIG. 6 shows a well known method of cross coupling two P-Channel pull up devices.

The circuits described below will incorporate both the level shifting and the ability to selectable hold and/or invert the output.

Most LC material require a that they have an average over time DC drive of approximately zero volts. This requirement is well known to those skilled in the art and is referred to by various names including "DC Balancing" (which will be used in the remainder of this document), "DC Restoration", and "Debiasing." U.S. Pat. No. 5,959,598 to McKnight and U.S. Pat. No. 6,005,558 to Hudson discuss this requirement and the entire contents and disclosures of these patent are hereby incorporated by reference.

U.S. Pat. No. 5,959,598 (hereafter the '598 patent) to McKnight shows an "XOR" gate driven by a "global signal" to invert the voltage on a display mirror. U.S. Pat. No. 6,005,558 (hereafter the '558 patent) "Display with multiplexed pixels" to Hudson et al shows an "multiplexer" that selectively connects one of two voltages to the a display mirror. U.S. Published Patent Application Document No. 20030038651 (hereafter the '651 application) "Display device test procedure" to Zuravleff shows in FIG. 4 a transistor level implementation of a multiplexer (labeled 42 in FIG. 4) driving a display mirror as described in the '558 patent.

The '598 patent shows an XOR gate with a global signal going to all nodes. An XOR gate can take a number of transistors to implement. Furthermore an XOR gate would not generally support changing the voltage level of the inputs to the outputs.

As discussed in the '558 patent and hereby incorporated by reference, due to the voltage drive requirements of the LC materials, it may be desirable to have a different voltage on the mirrors than that which drives the rest of the circuitry. The '558 patent and the '651 application describe level shifting, but in order to perform the DC Balancing function requires that the both of the voltages supply terminals have their voltages changed. This means that a large amount of current will have to move through the device in order to accomplish the DC balance function, since not only will the voltage on the mirrors change, but that voltages on all lines carrying the voltage supplies to the mirrors have to move.

While the '558 patent says that analog multiplexer may support voltages higher or lower than the selection signal on the multiplexer, the circuitry to support it are not show. Support for multiplexing a voltage higher than the gate voltage controlling the multiplexing is significantly more complex than for a voltage at or lower than the multiplexer's control voltage. The '651 application, for example shows, an analog multiplexer, but it is questionable how well the circuit would work if the voltages were significantly higher than the gate voltage on the P-Channel gates of the multiplexer. One of the objects of the present invention is to provide a circuit that can work with mirror voltages higher or lower than the rest of the circuitry of the device.

Having a digital circuit that drives different voltage output levels is commonly known as "level shifting. The inverting level shifter that is the subject of the present invention accomplishes both a voltage level shift as well as being able to selectively invert the voltage shifted output. Furthermore, it has the advantage of accomplishing this without requiring that the input voltage levels to the circuit be changed.

Figure 29:
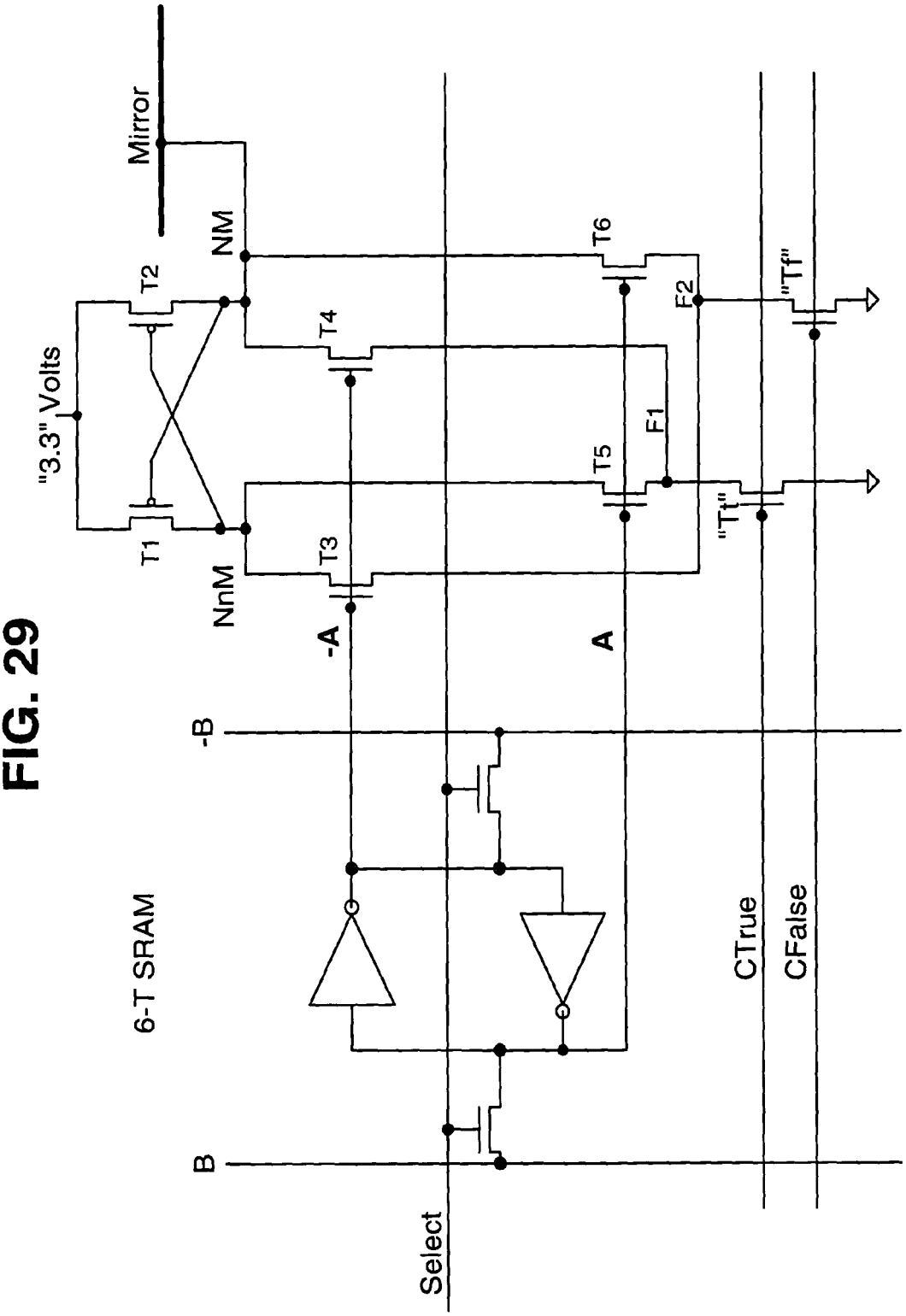
FIG. 29 is a diagram showing a bit cell with inverting level shifter in accordance with an embodiment of the present invention.

FIG. 29 is a diagram showing a bit cell with inverting level shifter in accordance with an embodiment of the present invention. A minus "−" sign will be used to indicate logical False signal. Also for the purposes of this description, a voltage near 0 volts will be considered to be a logical 0 and a Voltage nearer one of the supply voltages will be considered a logical 1.

On the left side of FIG. 29 is a conventional 6 Transistor (6-T) static RAM (SRAM) bit. There are two inverters (of two transistors each) that are cross-coupled to each other to form a storage bit. There are two bit Lines Labeled Bit and –Bit that serve to write and/or read bits as in a typical SRAM. Unlike a typical SRAM bit, the inverters are used to drive some additional circuitry, namely transistors labeled T3, T4, T5, and TC. The transistors on the left side, particularly the two inverters may be driven by a voltage that is less than Voltage that will be used to drive the mirror. For example the Vcc for the inverters might be 2.5 Volts.

The two cross-coupled P-MOS transistors T1 and T2 act as the pull up part of a level shifter to the higher voltage than that of the inverters, for example 3.3 Volts.

There are two control signals, CTrue and CFalse, that are used control the inversion function of the circuit. Nominally, these signals may be the same voltage as that of the inverters.

If CTrue is on (logical 1) and CFalse is off (logical 0), then if A=1 Node NnM will be pulled down via the transistor T5 and transistor Tt connect to C-True. This will also cause the PMOS transistor connected to NM to turn on thus driving the mirror to the High Value, or 3.3 Volts in this example. With C-False OFF, the node F2 will be driven by T6 to about a Vtn below the Gate voltage on A through transistor T6.

If CTrue is once again on but A=0 so that –A=1, then –A will pull down node NM through T4. This will in turn cause T1 to pull up node NnM. Node F2 will then be pulled up to about a Vtn below the gate voltage on T3. Thus F2 will always be about a Vtn below the value of the Vcc of the lower/normal voltage of the bit cell driving the level shifter, IFF C-True is ON and C-False is OFF.

If CTrue is OFF and CFalse is ON and if A=1 then node NM will be pulled down through T6 and Tf. With NM driven to 0, it will turn P-Channel transistor T1 on thus pulling up node NnM. Node F1 will pulled up about one Vtn below the voltage on the gate of T4.

If CTrue is OFF and CFalse is ON and if A=0 so –A=1, then node NnM will be pulled down via T3 and Tf. With T6 turned off by A=0 and node NnM pulled down to 0, the P-channel transistor T2 will pull node NM to the 3.3 Volt high level. The Node F1 will follow node NM but will be lower by about a Vtn of the gate voltage on T4.

If both CTrue and CFalse are off then there is no path to ground for the level shifter. Given time the output on the nodes NnM or NM may drift upward if they were in a low state, but for a period of time nodes will remain in their state before both lines were driven off due to the self loading of the circuit. This function of control lines CTrue and CFalse both being high, may be used to control when a change on nodes A and –A will cause the mirror connected to node NM to change.

A requirement is that control lines C-False and C-True must not both be on at the same time or there will be a short circuit. But it is OK for them both to be OFF at the same time and may provide added functionality which may be useful during transitioning the output. For electrical reasons, particularly if the transition of signals CTrue and CFalse may be slow, it may be preferred turn one off before the other is turned on to insure that there are no power surges.

Figure 30:
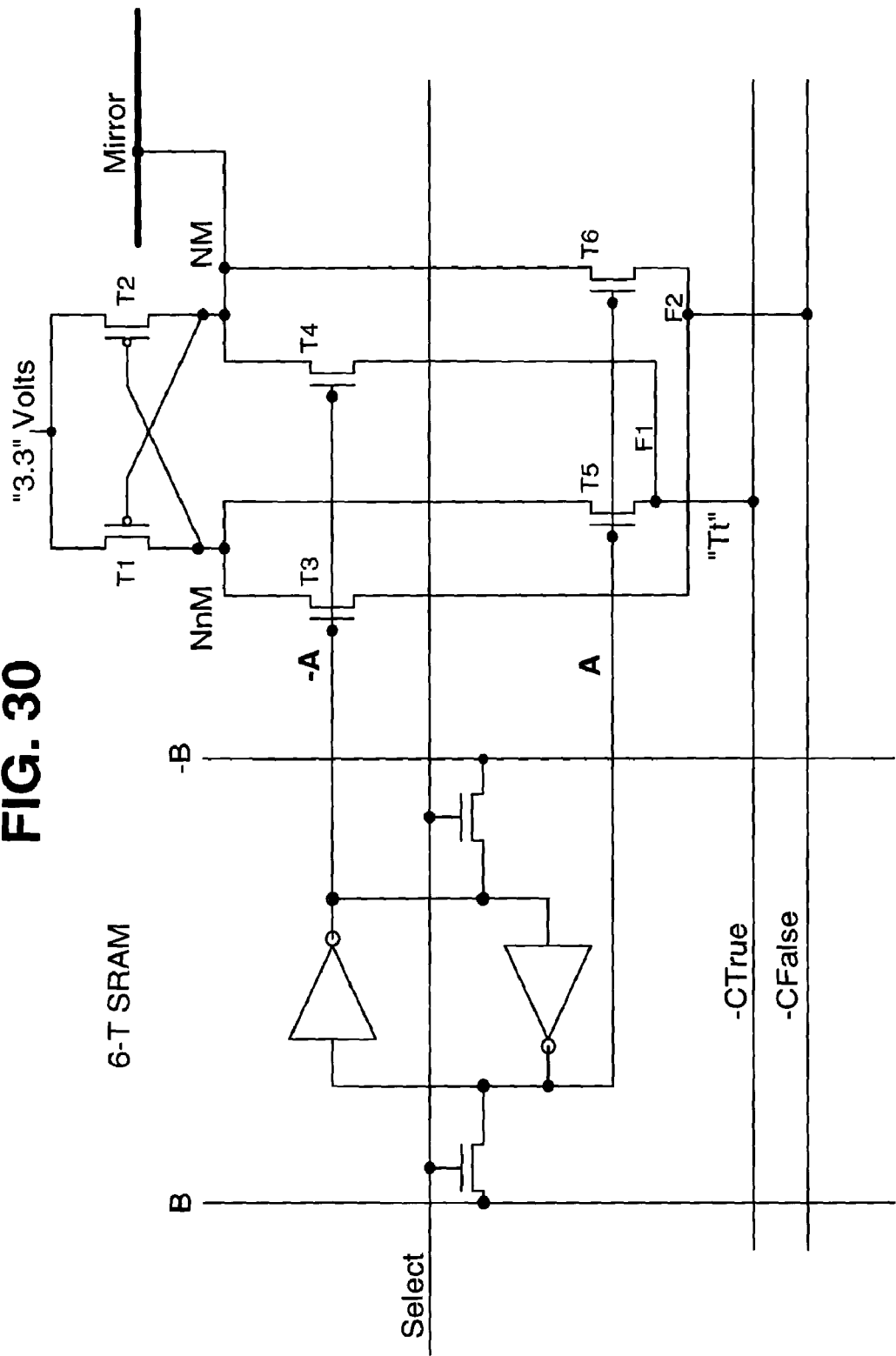
FIG. 30 is a diagram showing an another bit cell with inverting level shifter in accordance with an embodiment of the present invention.

FIG. 29 shows "explicit" control pull down transistors Tt and Tf But it should be noted that the nodes F1 and F2 either are driven to ground by their respective control lines or are driven to about a Vtn lower than the bit cell's Vtn. Thus these nodes may be shared between multiple bit cells OR just a line that is driven to ground or "floats" and is pulled up by multiple cells. Thus transistors Tt and Tf may be eliminated in some implementations as shown in FIG. 30. Note that –CTrue when driven to ground will have the same logical function as CTrue of FIG. 29 had when driving Tt with a logic one. Similarly, –CFalse in FIG. 30 when driven to ground will have the same function as CFalse had when driving Tf in FIG. 29 with a logical 1. When –CTrue is driven and –CFalse is "floating," –CFalse will tend to be driven to about a Vtn down from the N-channel transistor gate voltage. There may be some driving circuits external to the mirror that drive this node to about a Vtn down from Vcc as well. –CTrue floats and –CFalse is driven to ground, –CTrue will tend to be driven to about a Vtn down from the N-channel transistor gate voltage through transistors in the level shifting and inverting circuit. There may also be some driving circuits external to the mirror array that drive the control signal to about a Vtn down from Vcc as well.

It is well understood that it is important to be able to test as much of the circuitry of a device as possible. U.S. Pat. No. 6,650,138 shows adding additional circuitry to a display cell to just to support test. It is a further improvement of this invention that the circuitry can be tested without additional special test circuitry within to the display cell or extra control signals to the display cell as will be described.

One embodiment of the invention shown in FIG. 30 supports test without addition circuitry on a per mirror/cell basis. The control lines –True and –CFalse can be connected to say either one row or one column of cells in the array. In FIG. 30 they are shown running perpendicular to the bit lines and parallel to the select line, but they may instead run parallel to the bit lines.

In the test mode of operation, the logic level store on the SRAM bit at points A and –A can be used to effectively test both the level shifting logic and the SRAM bit itself. In one method of test, only one cell is tested for every bit connected to a given –CTrue and –CFalse. There can be multiple sets of the control lines –CTrue and –CFalse in the device so that multiple cells can be tested in parallel.

In test operation the fact that performing a series of operations and sensing Nodes F1 and F2 can be used to test the cell's functionality. To test the cell may require a multiple step process, but since this is only done for testing, it may preferable to adding special transistors just for test. An example procedure for testing both the level shifter and the an the memory bit is described below:

1. In the first step of the test process, all the bits sharing a common set of control signals have their SRAM bit set to A=0 (and thus –A=1) with an SRAM write process via lines B and –B.
2. Line –CFalse is driven low which will in turn drive node F2 low and if Transistor T3 is not open, it will put node NnM low through T3 which in turn pulls NM high through T2. Note this will also cause line –CTrue connect to node F1 to be pulled upward via transistors T3 on all the bits sharing this control line to a voltage level that is something lower than the Gate voltage on transistor T5.
3. Line –CFalse is allowed to "float" and it is then checked with circuitry external to the array of bits to see if it is pulled upwards, if it is pulled upward, then there is a short or open someplace in the in that group of bits sharing the control line and the device has failed the test. And that fact will be noted by the test logic external to the bit array.
4. Only the bit under test is set to A=1 while all other bits remain at A=0. Note control lines –CTrue and –CFalse are both floating. If the transistors are acting properly in the bit, the line –CFalse will be pulled high via transistor T6. It will be noted that the mid level on node F1 will go to node NnM that goes to the gate of T2. While this mid level voltage will reduce the drive of T2, it should leave P-channel transistor T2 sufficiently turned on and thus node F2 and –CFalse will be pulled up. The result of these first steps verifies that the mirror can be driven to logical 1. It also tests the function operation of multiple transistors.

5. Line –CFalse is first driven to zero and allowed to then float. If –CFalse is pulled up, then there is something wrong with the zero function of the Bit under test and it has failed and will be noted by the test logic.
6. All the bits connected to the –CFalse line are set to 1. The –CFalse line is driven low and then allowed to float. If the –CFalse line is pulled high, then there is problem in one of the bits and the test fails and that fact is noted by the test logic.
7. Only the bit under test is set to a "0" and line –CFalse should be driven up via T3 by the bit under test. As similar to in step 5 there will be a "mid level" on the gate of T1. This test verifies being able to pull down through T6, pulling up by T1, and that transistor T3 can be turned on. If line –CFalse is not pulled up, then there is a problem with the bit under test and the test logic will not it.
8. Next the set of steps 1 to 7 are performed but this time using line –CTrue to be driven and floated while line –CFalse remains floating.
9. This test verifies being able to pull down through T6, pulling up by T1, and that Transistor T3 can be turned on.
10. The procedure outlined above can be repeated for all the bits connecting to a set of control lines. Many bits can be tested in parallel if there are multiple sets of control lines. It is also anticipated that more than one bit on a set of control lines may be tested at the same time rather than each bit individually as outlined above but it may require more elaborate circuitry to "sense" the state of the control lines.

If at any time in the procedure outlined above an error is found, it may be either saved in the test logic for later use or immediately communicated to a testing as is common in test procedures.

With the procedure outlined above or ones similar to it, the functionality of the transistors that drive the mirror can be verified. In fact a subset of the procedures outlined above may be sufficient to give a reasonable confidence as to the functionality of the circuitry. More combinations of bits being set and/or changed along with the driving and/or un-driving of the control lines may be used to increase the confidence of the testing.

It will be understood that there are many analogous procedures that combine setting SRAM bits and or changing SRAM while the control lines are either the driven or un-driven by the drivers outside the bits that may be used.

Figure 31:
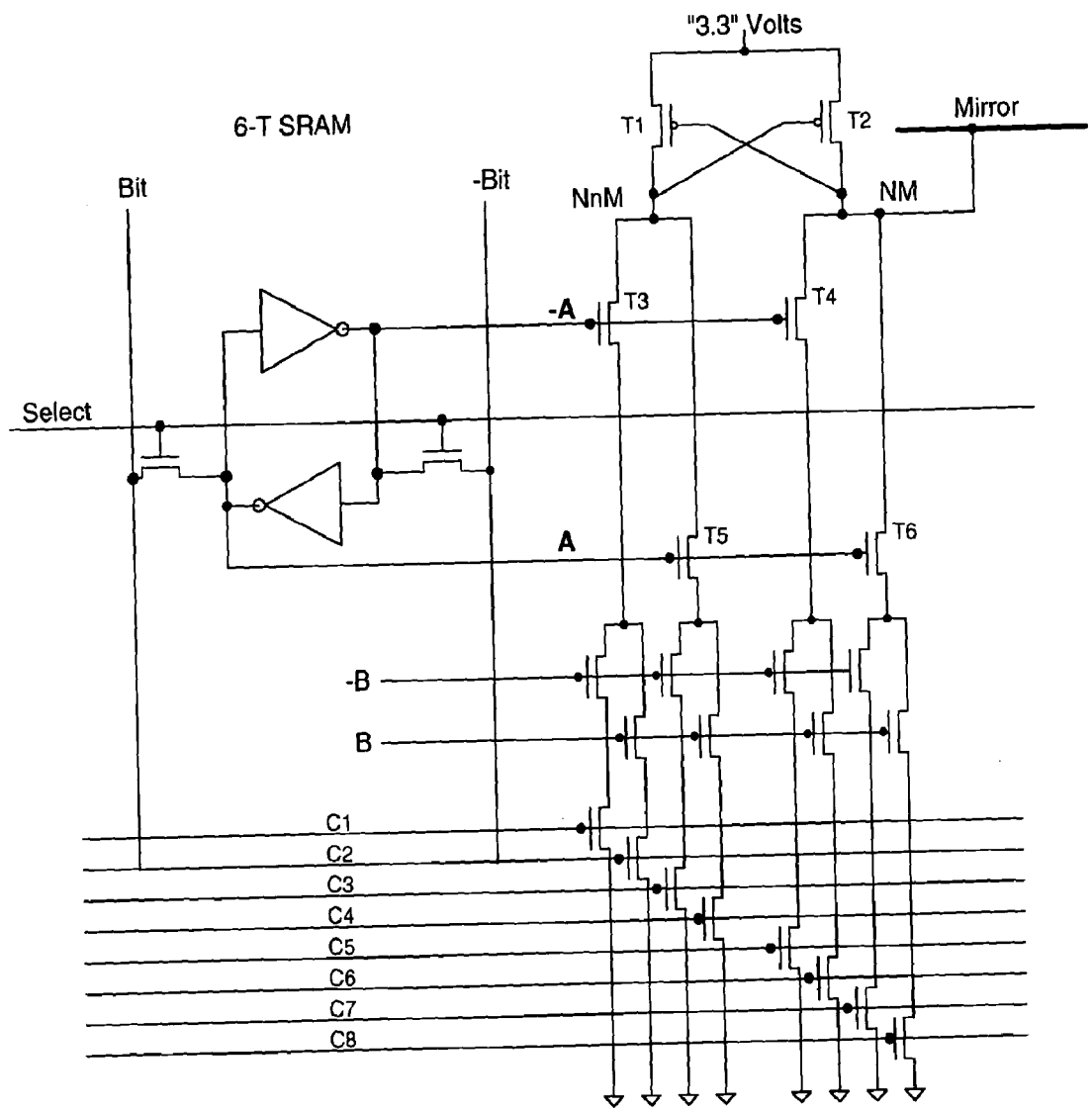
FIG. 31 is a diagram showing a bit cell that supports both level shifting and a multiple logic functions in accordance with an embodiment of the present invention.

FIG. 31 shows that the concept may be extended to two or more input logical functions rather than simply inversion. FIG. 31 shows a circuit that would support a fully general logical combination of two inputs A and B (with their logical inversions –A and –B).

The control lines C1 through C4 are used to pull down node NnM and then control lines C5 through C6 will be used to pull down node NM if the logical compliment of the function that pulls down NnM is true.

Consider the simple case of putting a logical 1 on the node NnM; in this case C1=C2=C3=C4=1 and C5=C6=C7=C8=0. This will force node NnM down regardless of the state of A and B.

As another example, consider the case of putting logical A ANDNOT B on the mirror. In this case, control line lines C3, C5, C6, and C8 will be on and the other control lines off. C3 will cause node NnM to be pulled down in the case of A AND –B=1 and lines C5, C6, and C8 will pull down node NM in all other cases.

The inversion operation one embodiment is supported by turning on control signals C3, C4, C1, and C2 to output the logical value of A but at a higher voltage or C1,C2, C3, and C4 to output –A. In fact, the logic of FIG. 29 may be seen as a reduction of the unnecessary transistors and control lines from FIG. 31 when only supporting the function of A and –A are required.

It should be understood by one skilled in the art that the control lines with a transistor pull down in FIG. 31 are only one way of implementing the logic function and may also be reduced to nodes that either float or are driven to 0 as is shown in FIG. 30 for the simpler case of A and –A.

This concept may be extended to support the logical combination of more than 2 inputs or to support a subset of logical combination other than A and –A by one skilled in the art.

Figure 32:
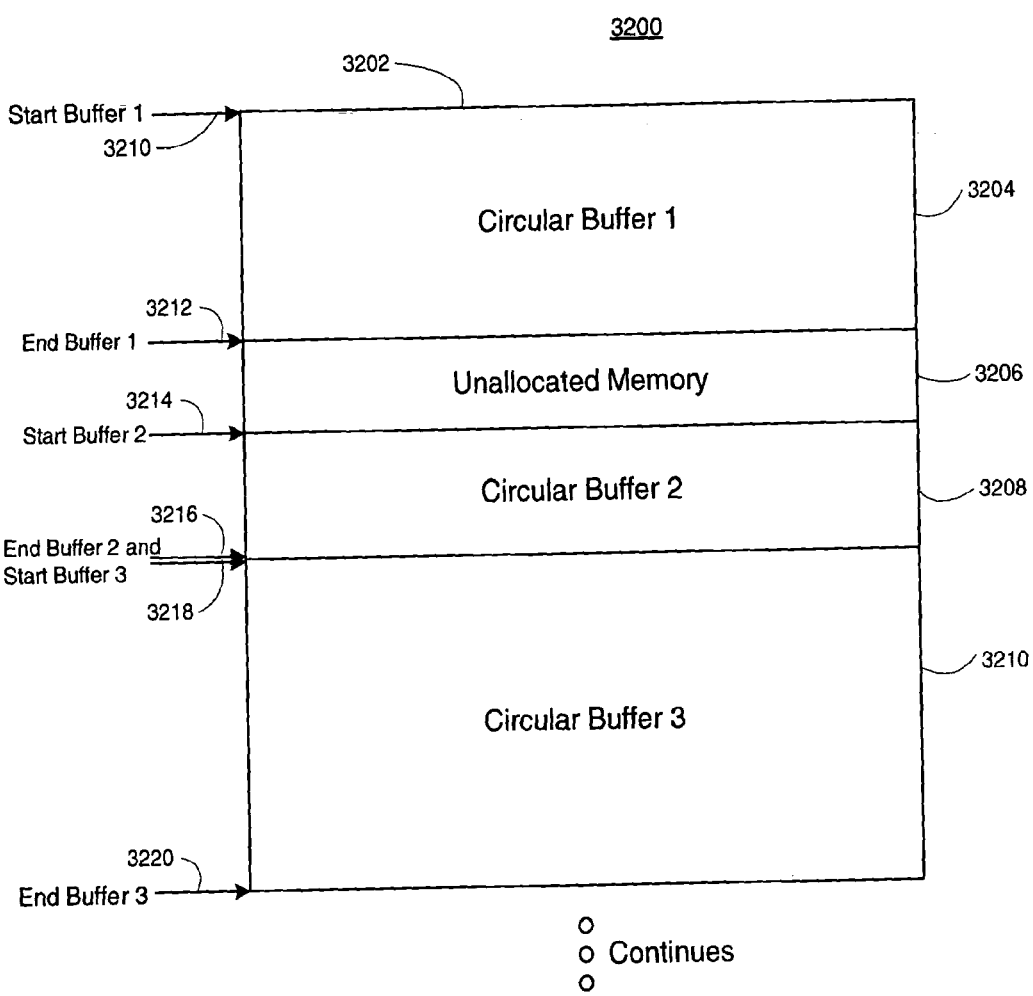
FIG. 32 is a memory map illustrating multiple circular buffers for use with a digital backplane of the present invention.

FIG. 32 shows a simple figurative example of a portion of a memory map 3200 that has multiple circular buffers in it. Each circular buffer is simply a range of memory addresses that has memory address pointers that are managed, often at least in part by hardware comparisons to one or more limits, that when a memory access exceeds the end of the buffer the address will rap around, modulo the size of the circular buffer, to the top or start of the buffer. With the circular buffering method used by some embodiments of this invention, the address pointer will only be incrementing by one address location at a time, which makes the circular buffer address management process simpler since it can be controlled by simply setting the address pointer to the start of a given buffer if the next address will exceed the value for the end of the buffer. The size of the circular buffer is then simply the difference between the start address of the buffer and the end address of the buffer.

Shown in FIG. 32 shows a memory array 3202 with circular buffer 1 3204, a portion of memory that is unallocated 3206 for circular buffering and may be used for some other use, circular buffer 2 3208, and circular buffer 3 3210 in it. Only a portion of the memory 3202 is shown and there may be more circular buffers and in some embodiments of this invention, there may be over 100 circular buffers in use at one time. Circular buffer 1 has a start of buffer address 3210 and an end of buffer address 3212, circular buffer. Circular buffer 2 has a start of buffer address 3214 and an end buffer address 3216. Circular buffer 3 is shown having a start of buffer address 3218 immediately following circular buffer 2's end of buffer address 3126 and has an end of buffer address 3220. The size and location of the circular buffers can be set independently, but generally they will be set to not overlap. The circular buffers in some embodiments will be stored in one or more ERAMs.

It will be understood that the memory map shown is only figurative. The actual physical memory locations for sequential addresses may be spread out through the physical memory array. For a display device where some of this memory might be under display elements that may be affected power surges caused by the accesses to the memory, it may even be functionally desirable to spread out the physical location of sequential memory addresses in order to spread to result in a more uniform power requirement across the array.

As is common with conventional uses of circular buffers, each circular buffer may be filled by a write process that in one or more cycles fills each entry of the circular buffer. The buffer needs to be long enough so that the write process will not overwrite that same data before a read process has finished needing to access that data.

In some embodiments of the present invention, the circular buffers will be "bit plane buffers." The size of the various circular buffers require in some embodiments will be related to how long a time certain bit positions within a pixel or summary bits for a pixel are needed. In some embodiments access to the memory 3202 read or write as many bits as there are light modulating elements in one direction of a spatial light modulator, but it will be understood that the concepts of this invention may be applied with more or less bits in one access. Having the circular buffers be bit plane buffers has advantages for certain aspects of various embodiments of this invention; specifically, it can lead to needing fewer total bit accesses to do the processing necessary to control the light modulating elements and because in some embodiments the length of time and thus the size of the buffer may vary by the bit position within the pixels, it can lead to more efficient packing of the circular buffers into available memory.

In one embodiment, the present invention provides an array of circuits that supports: voltage level shifting, a selectable logic function between one or more input to generate the output, and using constant voltage sources for the circuits. Such an array may be used to provide a viewable image on a visual display device.

The array of circuits may support level shifting higher than the incoming voltage and may be used to control the voltage on an electrode that controls some output. The electrode may form a mirror or an array of mirrors of a display device.

The selectable logic function of the array of circuits may invert or not invert the input and may perform a number of different logical functions.

The array of circuits may use 2 or more cross-coupled P-channel transistors to pull up the circuit to a logical high level such that one P-channel device is fully off when the other device is fully on. The array of circuits may also include is a series N channel devices connected to each of the P-Channel devices. The purpose of these N-channel devices is to optionally pull down one of the P-channel gates and thus turn on exactly one of the cross-coupled P-channel devices. If the Gate of the connected P-Channel device is not pulled down, then it may be optionally pulled up and thus turned off by the other P-Channel gate.

The array of circuits may include two or more nodes that are either driven or allowed to float and in which at most one node is driven at given time. The may be separate floating nodes in each circuit and the floating nodes are shared between multiple circuits and wherein the act of driving the node or allowing it to float controls the local function of the circuit. Common floating nodes of may be sensed in order to determine the functionality of the circuitry.

The array of circuits may support inversion of the logical value store in a display cell that may be tested without adding additions dedicated test circuitry on a per cell basis.

In one embodiment, the present invention provides a visual display device with an array of MRAM storage bits that are used to control an array of electrodes wherein there are column drivers on both sides of the memory so that some or all of the rows of memory bits may be driven from either side of the array. The storage bits may or may not be connected to other circuitry in order to facilitate driving the electrode. The visual display may be an LCoS, DLP™, OLED microdisplay or any other type of visual display.

In the visual display device, ERAM memory bits may be used to compute the values for driving the MRAM memory bits that go to computation logic on either side of the MRAM array. At least part of the ERAM memory bits may be interdisposed with MRAM memory bits but where in the columns of the ERAM memory bits are such as to form two arrays where the sense amps and buffers are on opposite sides of the memory array.

In one embodiment of the present invention, the present invention provides an array of storage bits used to control an array of electrodes wherein the array supports the operation of controlling the setting or clearing of selected bits rather than or in addition to the normal memory operation of writing to a bit. The control of the setting or clearing of the memory bits may be with a masked write function. A dummy read is done on bits that are not set or cleared. Also, the bit itself may have separate set and clear inputs.

In one embodiment, the present invention uses bit serial processing to compute the pulse width for an array of pulses. The pulses may used to control the intensity of a visual display device. There may be one or more sets of bit serial data processing elements and the one or more sets of bit serial processing elements may on one or both sides of one or more MRAM type memory arrays. Each MRAM array may perform the same operation or different operations. The results of each operation may go to a MRAM driver on its corresponding side of the MRAM array. The MRAM may support driving MRAM bits on only part of the array or on the entire array.

The processing elements used in bit serial processing may compute the pulse widths using a sticky logical OR or a sticky logical AND or only logical operations and latch may be used to determine the pulse width in each processing element. The processing elements may also compute the pulse widths using an arithmetic compare. Also only one subset of the bits corresponding to a pixel value may be used to determine the control of a pulse width.

In one embodiment, the present invention provides a digital display backplane that can accept partially or fully encode partially encoded values for an array of electrodes using purely digital processing to convert the encoded data to pulse widths by the backplane and wherein the control of multiple electrodes is performed by programmable shared control with and multiple data path processing elements. Some of the processing involves operations on varying numbers of bit to be required for each stage of the pulse width determination. Also, where a recursive feedback method may employed. The recursive feedback method may employ: deductive comparisons, dual count method, and/or a bit serial operation. Memory addressing is used fetch fewer than all the bits of a pixel's value when making a determination of the next state of a pulse width.

In one embodiment, the present invention provides a display backplane with an array of processing elements using bit sequential operations to general generate an output that controls a display element. The processing elements may be capable of performing logical or arithmetic operations on multiple bits with sequential operation to form a result. The accumulated operations result may be controllably inverted and one or more results may latched for writing at a later time.

In one embodiment, the present invention provides a method for controlling an array of pulse widths that drive electrodes using recursive feedback of the current state of the output. The electrodes may control picture elements of a display device and may be an array of electrodes in on a single silicon backplane. The recursive feedback may explicit such as with a separate feedback signal or with a memory read operation. or the recursive feedback may be the recursive feedback is implicit with a masked write operation or a set-reset type of storage function.

Not all of the bits that control the value of the pulse width are used at each stage that determines the pulse width. An array of output pulses may be generated from binary values for an array of outputs where less than all the bits that determine the width of each pulse are used in more than half the stages of the pulse width determination. At any given stage only the bit locations corresponding to the zeros in the value associated with the current stage are used. Also, at any given stage only the bit locations corresponding to the ones in the value associated with the current stage are used.

In one embodiment of the present invention, recursive feedback and bit serial processing may be combined to control an array of electrodes and the array of electrodes may be used to controls the intensity of picture elements of a visual display device.

In one embodiment, the present invention provides display process for a visual display device were the memory available on the display device for storing pixel values is reallocated and some bit positions of the pixel values requires less storage than other bit positions. The reallocation method may be programmable. The data may be stored in queues and the queues may be circular buffers. The number of storage bits required for each bit position in a pixel value varies based on the time the given bit position needs to stay resident in memory for use by the processing.

In one embodiment, the present invention provides a display process with a display device were multiple bit pixel values are stored on the display device and where in storage location of the bit values may be programmed. The memory locations may not be dedicated to a given binary weighting and thus memory locations may be allocated to different binary weightings. Also, one or more of the buffers may be a different size based on the need to keep the data resident on the display device.

In one embodiment, the present invention provides a method for generating a single pulse by sending the pixel values in a binary encoded form to a visual display device. The visual display device treats some of the bits as LS-group of bits and some of the bits MS group of bits and one of the group of bits in controls the time at which a pulse starts and the other group of bits will control when the group of bits stop and in so doing will create a single pulse. Once any of the bits are no longer needed for controlling their pulse width, the memory storing those bits may be reallocated for storing other bits and such a reallocation may result in less storage.

In one embodiment, the present invention provides a method for generating a single pulse on a visual display device by sending fully encoded data values while requiring less storage on the visual display device than 1 bit of storage required on the display device for every bit sent. There may be less than ½ bit of storage on the display device for every bit sent and recursive feedback may be used to control the pulses.

In one embodiment, the present invention provides a visual display system were some of the bits values of the pixel are sent to a visual display device as binary encoded values and stored on the display and other bits are selectively sent and used but not stored and are resent as needed. In the visual display system, some of the bits values of the pixel may be sent to the visual display device as binary encoded values and stored on the display, and the logical combination of other bit values is selectively sent to the visual display device. Selective bits may be logically OR'ed together and/or logically AND'ed together. Bits may be selected are based on zero in the current count and/or bits may be selected based on ones in the current count.

In one embodiment, the present invention provides a digital backplane that controls an array of processing elements where in the programmed sequence of operations is stored in memory. The locations in that memory define the sequence operations to be performed by the backplane. The sequence of operations may include controlling multiple memory pointers. The memory pointers may point at circular buffers and may share common processing logic for modifying the values in the pointers. There may also be a set of readable and writable storage location that contain the pointers The program control may include values that define either directly or by computation, the starting address of one or more circular buffers, the ending address of one or more circular buffers. Hardware may be used with the digital backplane or the backplane may include hardware to modify the current value of each pointer either before or after it is used and before it is stored back in the pointer memory. The modification of a pointer may include incrementing to the next location and resetting the pointer to it starting value if the value exceeds the bounds of the circular buffer. There may be redundant pointers to one or more of the circular buffers. Also, every time a pulse width is computer, there separate buffer pointers for each bit that is to be accessed.

The sequence of operations may also repeat periodically at a rate that is related to the line scanning rate of the display.

In the digital backplane, the process for computing the pulse width may be changed, and the number of bits per pixel may be changed.

The digital backplane may employ a dual count process and the split between which bits are treated as part of the MS-count and which bits are treated as part of the LS-count may be changed.

In the digital backplane, data may fetched from an external memory and sends data to a display backplane in coordination with the with the queue management on the backplane.

The controller may be on the backplane or may be external to the backplane. The controller may do may do some processing of the data before sending it to the backplane and the controller may perform a logical combination of bits from pixel values and then send a summary bit to be stored on the backplane. The controller may also send the address of where the data is to be stored on the backplane.

The control process on the backplane may also determine where the incoming data is to be stored on the backplane.

In one embodiment, the present invention provides a display processing method involving reading data stored on a visual display device and enabling write operations at a rate that is periodic to a multiple or sub multiple of the display refresh line rate. The sequence of operations may be a program stored in memory. The memory may be RAM and the RAM may be reprogrammed. The RAM may also be reloaded while the device continues to operate (on-the-fly processing).

The state of processing the display processing method may include the pointer to the program location in the RAM and a variable memory that contains pointers to the memory buffers on the display backplane. The time weighting of the control pulse widths may be controlled by the relative positions of the write enable pointers. The time weighting may be binary weighted and the time weighting may be weighted to compensate for various desired response characteristics that may include gamma correction and LC response. In some variations, the weighting may not require compensation table for the pixel values. The weighting may be done in conjunction with compensation table(s) for the pixel values.

The bits used to compute whether or not to turn on or off a series of pixels in a line of a visual display device may be held memory that is treated as a circular buffer. There may also be a variable number of reads of bits required to determine the value of pixels and the sequence of operations may reads those bits and adjusts the various pointers.

Embodiments of the present invention employ gamma correction, and multiple time bases.

In one embodiment of the present invention, there is provided a system for indicating that liquid crystal materials used in the visual display devices, such as the visual display devices used in other embodiments of the present invention, have deteriorated. In many applications, such liquid crystal materials are enclosed in a vacuum to prevent deterioration of the liquid crystal materials.

Many of the liquid crystal materials that may be used in the visual display devices of the present invention include one or more ester linkages. Examples of such liquid crystal materials are described in U.S. Pat. No. 4,695,650 and U.S. Pat. No. 5,673,028, the entire disclosure and contents of which are hereby incorporated by reference. When such liquid crystal materials are exposed to moisture due to the vacuum environment in which they are enclosed being ruptured, hydrolysis may occur in these materials resulting in the formation of carboxylic acid groups. To detect the hydrolysis of the liquid crystal materials, various pH indicators may be used to detect the change in pH caused by the increased presence of carboxylic acid groups.

For example, a color pH indicator may used to indicate that the liquid crystal material has begun to deteriorate. Examples, of suitable color pH indicators include litmus, alzarin yellow, bromcresol purple, bromocresol green, bromphenol blue, bromphenol red, bromthymol blue, cresol red, malachite green, metacresol purple, methyl orange, methyl orange, methyl red, methyl-violet, orthocresol phthalein, phenolphthalein, phenol red, thymol blue, thymol phthalein, etc. Other suitable color pH indicators are set forth in The Merck Index, 11$^{th}$ edition, pages MISC 110-112, in The Merck Index 12$^{th}$ edition, pages MISC 58-60, and in U.S. Pat. No. 5,851,611 and the entire disclosure and contents of these documents and this patent are hereby incorporated by reference. The change in color may be from one color to another, from a color to colorless or from colorless to a color. For example, p-nitrophenol changes from yellow to colorless in the acid range and phenolphthalein changes from pink to colorless in the acid range. Also, various mixtures of color pH indicators may be used to indicate that a liquid crystal has begun to deteriorate and such mixtures allow for the use of a spectrum of colors indicate small changes in pH.

The color pH indicator may be included in a substrate on which a liquid crystal material is mounted, in a material protecting the liquid crystal material or a material protecting the environment surrounding the liquid crystal material. The color indicator may also be included in a strip of material that is mounted on or near the surface of the liquid crystal material.

In addition to color pH indicators, the present invention may also employ an electrical pH indicator. The hydrolysis of a liquid crystal material may be indicated by a change in an electric current, because the presence of an acid will result in electricity being conducted better in the hydrolyzed liquid crystal material than in the unhydrolyzed liquid crystal material. Similarly, the presence of an acid as a decomposition product may be detected by a change in current.

An example of a suitable electrical pH indicator of the type that may be adapted for use in the present invention is described in U.S. Pat. No. 4,618,929. Such an electrical pH indicator may include a monitoring transducer that may be any transducer which furnishes a signal one of whose electrical characteristics, such as voltage, is proportional to the measured pH. When monitoring the pH of a liquid crystal material, the transducer may include a testing pH electrode and a reference pH electrode. The testing pH electrode may be an electrode of glass, antimony or other known type. The reference pH electrode may be any suitable calibration electrode.

The electrical pH indicator may include an indicator visual display device for providing a visual readout, such as a number or color change indicating a pH change. The indicator display device may be mounted on the surface of the visual display device including the liquid crystal material being monitored or may be part of a monitoring system connected to the visual display device being monitored. The electrical indicator may also include a device for emitting a sound in the event that deterioration of the liquid crystal material has been detected.

The pH indicators of the present invention may be used to show any change in the environment of the liquid crystal material that is caused by a pH change. For example, if a polymeric material is used to enclose or protect a liquid crystal material and the polymeric material decomposes to form an acid, such as HCl from a vinyl chloride polymer or a vinylidene chloride polymer, the pH indicator would alert the user to the change in environment.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A device comprising:
    a mirror RAM array of mirror RAM storage bits for a spatial light modulator, said mirror RAM storage bits being arranged in mirror RAM columns;
    a first driver and a second driver; and
    one or more bit lines for each of said mirror RAM columns, wherein said one or more bit lines support said first and said second driver on opposite sides of said array, wherein said mirror RAM storage bits are for a spatial light modulator and wherein said first driver and said second driver each include means for masked writing to said mirror RAM storage bits.

2. The device of claim 1, further comprising a first processing means and a second processing means for writing to said mirror RAM storage bits, wherein said first processing means and said second processing means are located on opposite sides of said mirror RAM array and wherein either said first processing means or said second processing means is capable of writing to said mirror RAM storage bits on either side of said mirror RAM array.

3. The device of claim 1, further comprising ERAM storage bits interposed between said mirror RAM storage bits of said mirror RAM array.

4. The device of claim 3, wherein said ERAM storage bits are arranged in ERAM columns, wherein said ERAM columns form two separate ERAM memory arrays, and wherein each of said ERAM memory arrays includes inputs and outputs on opposite sides thereof.

* * * * *